(12) United States Patent
Zhou et al.

(10) Patent No.: US 6,370,130 B1
(45) Date of Patent: Apr. 9, 2002

(54) SPREAD SPECTRUM COMMUNICATION SYSTEM

(75) Inventors: Changming Zhou; Guoliang Shou; Xuping Zhou; Kunihiko Suzuki; Makoto Yamamoto, all of Tokyo (JP)

(73) Assignee: Yozan, Inc., tokyo (JP)

( * ) Notice: Subject to any disclaimer, the term of this patent is extended or adjusted under 35 U.S.C. 154(b) by 0 days.

(21) Appl. No.: 09/092,914

(22) Filed: Jun. 8, 1998

(30) Foreign Application Priority Data

| Jun. 9, 1997 | (JP) | 9-164919 |
| Jun. 26, 1997 | (JP) | 9-184641 |
| Sep. 18, 1997 | (JP) | 9-272251 |
| Oct. 16, 1997 | (JP) | 9-299377 |
| Oct. 23, 1997 | (JP) | 9-308096 |
| Nov. 14, 1997 | (JP) | 9-329646 |
| Dec. 5, 1997 | (JP) | 9-352472 |

(51) Int. Cl.$^7$ .............................................. H04B 7/216
(52) U.S. Cl. ...................... 370/335; 370/342; 375/143; 375/152
(58) Field of Search ................................ 370/342, 335; 375/140, 143, 152, 145, 146, 148

(56) References Cited

U.S. PATENT DOCUMENTS 5,790,588 A * 8/1998 Fukawa et al.
6,038,250 A * 3/2000 Shou et al.
6,128,332 A * 10/2000 Fukawa et al.

OTHER PUBLICATIONS

Hinderling, et al., "CDMA Mobile Station Modem ASIC", IEEE Journal of Solid–State Circuits, vol. 28, No. 3, Mar. 1993, pp. 253–260.

Higuchi, et al., "Fast Cell Search Algorithm In DS–CDMA Mobile Radio Using Long Spreading Codes". 1997 IEEE Vehicular Technology Conference.

Ohta, et al., "A Study on A Method of Digitalized Semi–Direct Conversion Receiving with Applying Complex Coefficiencies Filters", The Institute of Electronics Information and Communication Engineers, 1997, pp. 89–96.

* cited by examiner

Primary Examiner—William Luther
(74) Attorney, Agent, or Firm—Pillsbury WInthrop LLP

(57) ABSTRACT

A receiver for spread spectrum communication system receives a traffic channel and common control channel by a plurality of matched filters at least one of which is selectively available for the traffic or the common control channel. At the initial acquisition, a plurality of matched filters are used for receiving the common control channel. At the hand-over, a plurality of matched filters are used to receive traffic channels of the current base station and the base stations in the adjacent cells.

25 Claims, 37 Drawing Sheets

Fig.31
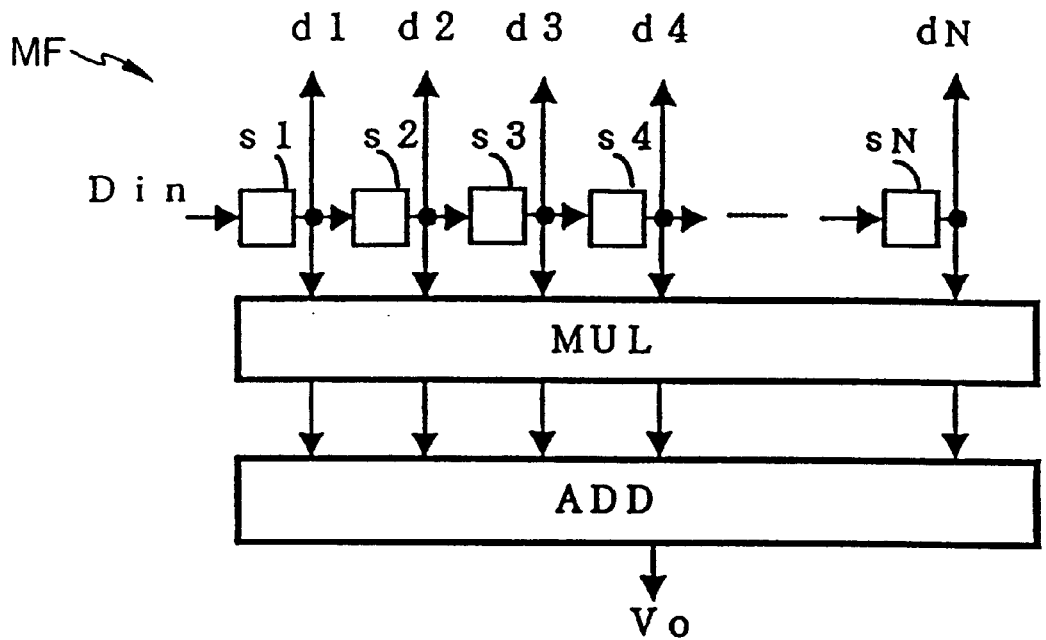
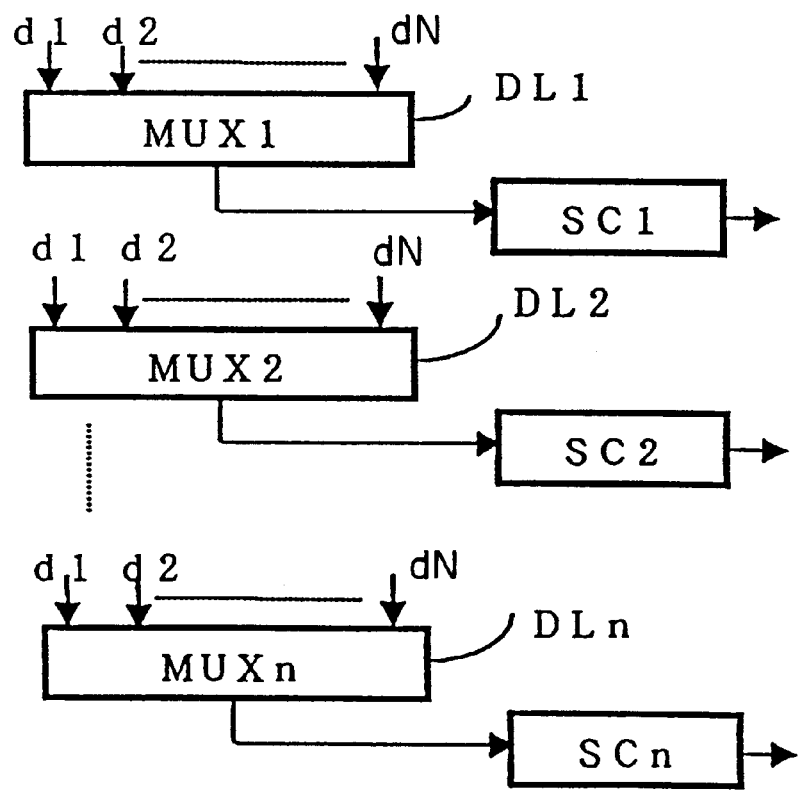

Fig.32
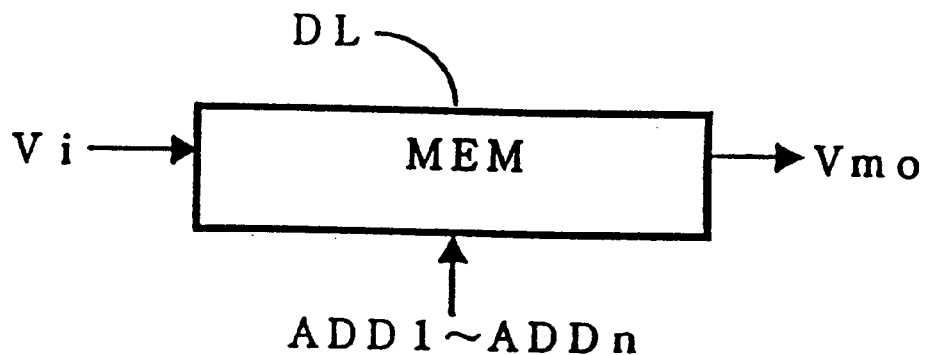
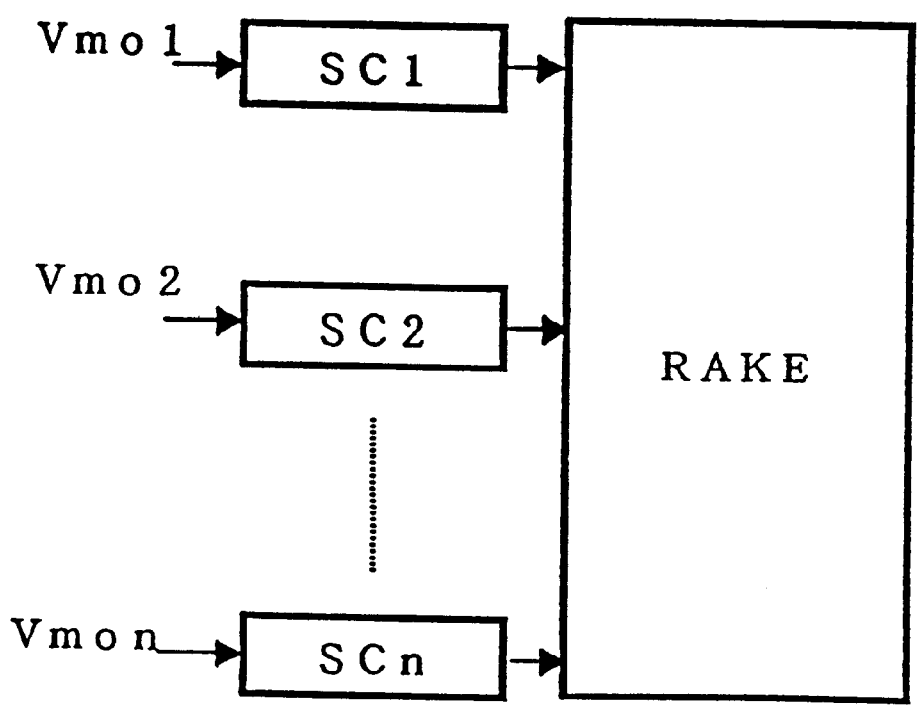

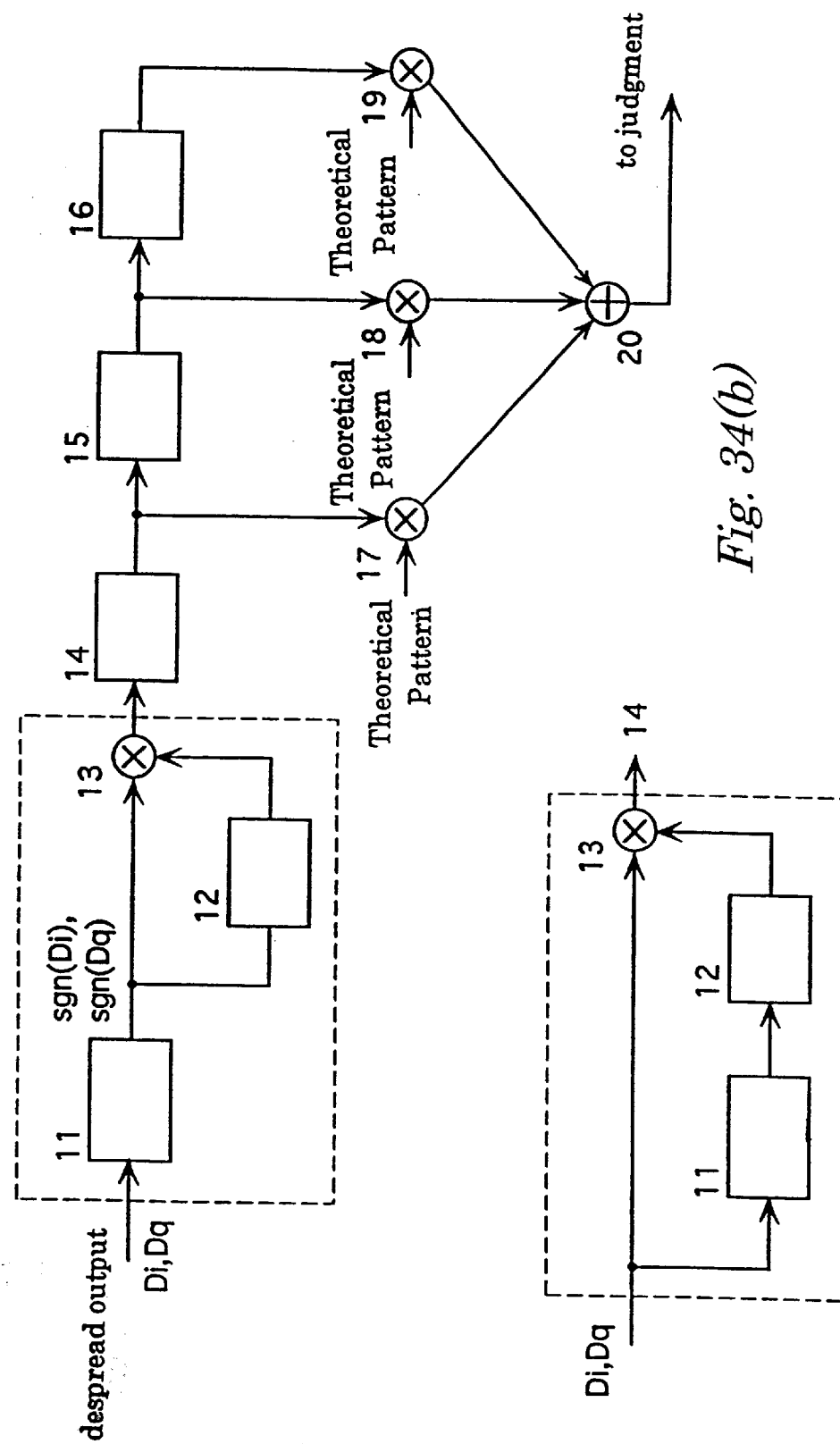

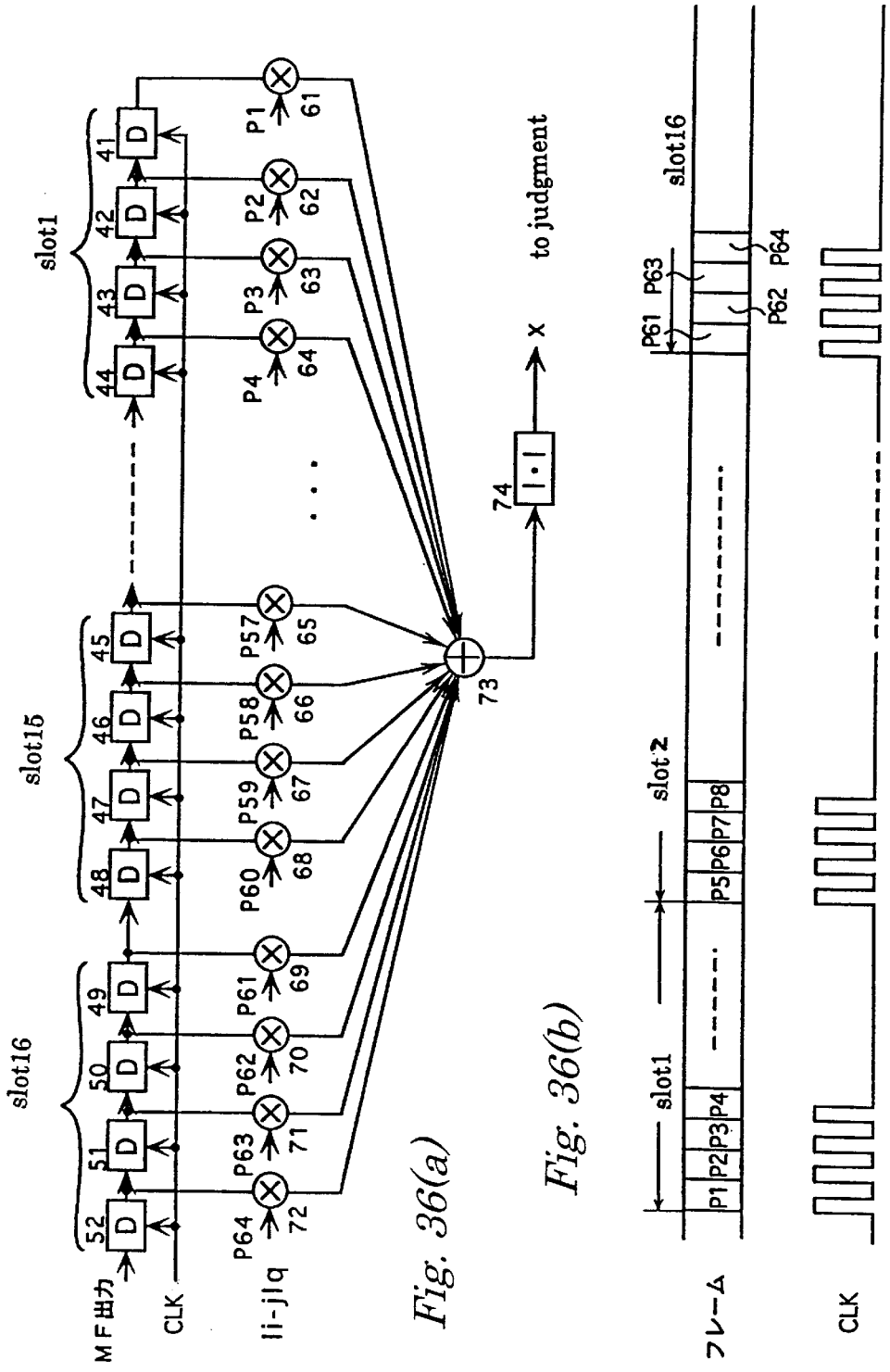

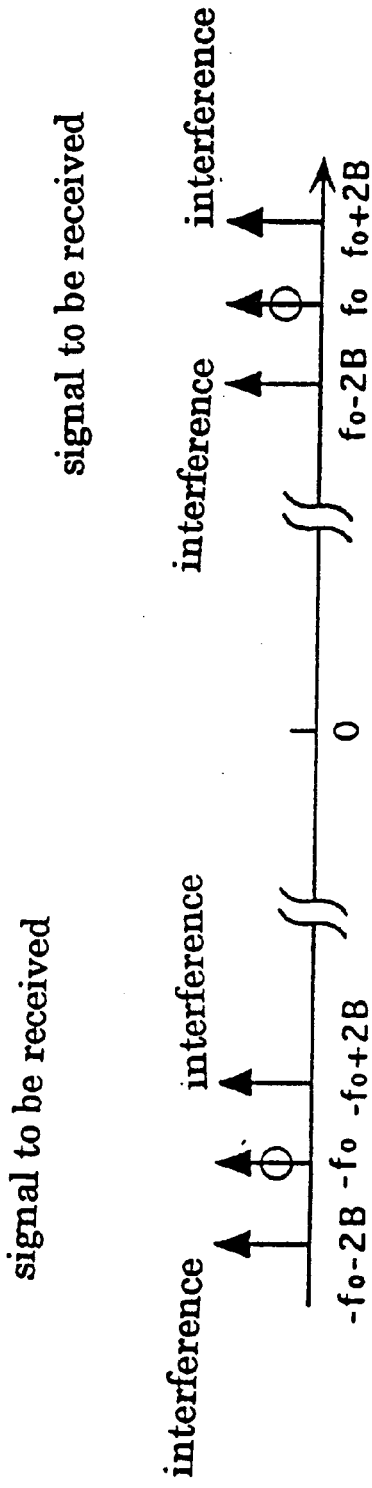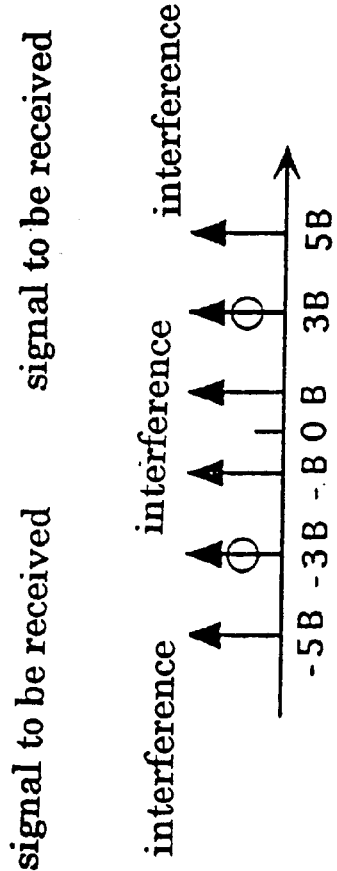
Fig. 39(a)
Fig. 39(b)

signal to be received

SPREAD SPECTRUM COMMUNICATION SYSTEM

DETAILED DESCRIPTION OF THE INVENTION

1. Field of the Invention

The present invention relates to a spread spectrum communication system.

2. Background of the Invention

Spread spectrum communication systems have received attention due to their high frequency efficiency as the number of users of the land mobile communication steeply increases. Among various types of spread spectrum communication, the DS-CDMA cellular system is going to be standardized by an international committee on communication.

The DS-CDMA system is classified into two types: strictly synchronous base stations and asynchronous base stations. The global positioning system (GPS) or other systems are used in the synchronous system for synchronization. The acquisition is easy for the synchronous system only by a synchronization of a long code which is common to every base station. Each base station has a delay time of the long code different from the delay times of other base stations. The peripheral cell search for the hand-over is quick because a mobile station receives a delay information from base stations.

In the asynchronous system, different spreading code sequences are allocated to the base stations from one another. The initial cell (sector) search takes a longer time for the mobile station because it is necessary to identify a spreading code sequence. It takes a lot of time when the spreading code is long. However, the search time may be decreased by information on the spreading code from base stations of adjacent cells, and it is advantageous that synchronization by signals from satellites is unnecessary.

A cell search method for quick acquisition in the asynchronous system is proposed in "Two-stage Rapid Long Code Acquisition Scheme in DS-CDMA Asynchronous Cellular System" by Kenichi HIGUCHI, Mamoru SAWAHASHI and Fumiyuki ADACHI, Technical Report of IEICE, CS96-19, RCS96-12(1996-05). Composite codes are generated by corresponding long codes LC0 to LCX for identifying base stations and short codes SC0 to SCY for identifying channels. The short codes are common in all the cells and the code SC0 is allocated to common control channel (perch channel). The mobile station despreads a first short code SC0 by a matched filter that detects the timing of the long code. Then, the long codes are identified by the matched filter or a sliding correlator. The number of cells search is decreased to be (Length and Phase of spreading code) compared to the number of (Number of spread code length×Number of spread code phases) in the asynchronous system above.

Multi-media communication is required for transmitting a plurality of signals of different transmission rates. In the DS-CDMA cellular system, a type of variable spread ratio and a parallel multi-code type are proposed. Fading compensation is indispensable for these systems for high quality service.

FIG. 47 shows a conventional receiver of a DS-CDMA system having a receiver antenna 101 for receiving a spread spectrum signal, a high frequency receiving portion 102 for converting the spread spectrum signal into an intermediate frequency signal, a divider 103 for dividing the intermediate frequency signal into two signals which are input to multipliers 106 and 107. A signal (cos ωt) of the intermediate frequency is generated by an oscillator 104 to be input to the multiplier 106. A signal from the oscillator 104 is shifted by π/2 by a phase shifter 105 and is input to the multiplier 107. The multipliers 106 and 107 multiply the divided signals by the signal from 104 and 105, respectively. The outputs from the multipliers 106 and 107 are passed through low-pass filters 108 and 109 so that the base band signal of an in-phase component (I-component) and a quadrature component (Q-component) is extracted.

The I- and Q-components are multiplied at a complex matched filter 110 by PN code sequence supplied from a EN generator 111 so as to be despread. In the multi-path environment, the despread components have a plurality of peaks. The despread I- and Q-components are processed successively by a delay detection circuit 112, a signal level detector 114 and a phase correction portion 116.

The delay detection circuit 112 detects a signal of one path, for example the first path, of a plurality of paths and inputs the signal to a frame synchronization detector 113. The received signal has a pilot symbol already-known and four symbols are included in a slot. The frame synchronization detector 113 judges whether the four symbols are identical to a predetermined delay pattern so as to detect the frame synchronization. The detector outputs a frame synchronization signal to the phase correction portion 116. The level detection portion 114 detects the signal level of the I- and Q-components. The multi-path selection portion 115 selects a plurality of paths with higher power from the maximum power and outputs a signal to the phase correction portion.

The phase correction portion 116 has a plurality of phase correction means corresponding to the number of multi-paths and a selector for inputting the despread I- and Q-components according to the signal from the portions 113 and 115. The despread signal of the matched filter 110 is input through the selector at timing of the phase correction means so that the phase correction means performs fading compensation of the despread signal.

It is necessary in frame synchronization that a multiplication of analog signals is implemented by a large circuit. Accordingly, a lot of electrical power is consumed.

FIG. 48 shows a receiver for a semi-direct conversion for a spread spectrum communication. The receiver has an antenna 200 for receiving a signal of a band-pass filter (BPF) 211, a low noise amplifier (LNA) 212 and a frequency converter 213 for outputting a signal of intermediate frequency, fc, by mixing a local oscillation signal of frequency fL. The frequency fL, is for example, a boundary frequency of a frequency band of the received signal. In the final output, a DC offset is reduced but a frequency offset remains. When the received signal is a spread spectrum signal, despreading is performed after the direct conversion. The direct conversion is more useful for other systems such as PHS than spread spectrum communication systems.

The output of the frequency conversion is in the frequency domain at the positive and negative side on the frequency coordinate. A channel of a frequency exists in the negative domain equal to the frequency of the signal to be received. These two signals are separated by a channel filter having a complex coefficient. The output of the converter 213 is quadrature detected and over-sampled, then transformed by a Hirbert transformation portion 215.

The output of I- and Q-components of the portion 215 is input to the channel filter 216 so that signals of adjacent channels are reduced and input to a demodulator 217. The demodulated signal is reproduced to the data transmitted by a data decision portion 218.

The Hirbert transformation needs rather complicated circuit.

SUMMARY OF THE INVENTION

The present invention solves the above-discussed conventional problems and has an object to provide a spread spectrum communication system capable of high speed cell search.

The present invention has another object to provide a spread spectrum communication system applicable to multi-media communication.

The present invention has another object to provide a spread spectrum communication system of high reception quality even during multi-path fading.

The present invention has another object to provide a spread spectrum communication system capable of high speed frame synchronization.

The present invention has another object to provide a semi-direct conversion receiver of a simple and small scale circuit.

According to the present invention, a receiver for receiving a traffic channel and a common control channel has a plurality of matched filters at least one of which is selectively available for the traffic or the common control channel. At acquisition, a plurality of matched filters are used for receiving the common control channel. At the hand-over, a plurality of matched filters are used to receive traffic channels of both the current base station and the base stations in the adjacent cells.

According to the present invention, a quantizing circuit is provided for quantizing an output of a matched filter, and a delay detection circuit is provided for performing the delay detection using the output of the quantizing circuit. An output of the delay detection circuit is successively stored in a plurality of delay circuits so as to be compared.

According to the present invention for the semi-direct conversion, an interference reduction circuit has a real input and imaginary input for receiving an output of a frequency conversion circuit and for receiving a "0" input, respectively.

BRIEF DESCRIPTION OF DRAWINGS

FIG. 31 is a block diagram of a delay circuit in the matched filter shown in FIG. 29.

FIG. 32 shows a variation of the circuit in FIG. 31.

FIG. 34(a) is a block diagram showing the first embodiment of a frame synchronization detection circuit.

FIG. 34(b) is a block diagram showing the second embodiment of a frame synchronization detection circuit.

FIG. 36 is a block diagram showing the fifth embodiment of a frame synchronization detection circuit.

FIG. 39 shows a wave form of a spectrum of signals, showing an input signal in FIG. 39(a) and an intermediate signal in FIG. 39(b).

PREFERRED EMBODIMENT OF THE PRESENT INVENTION

Figure 1:
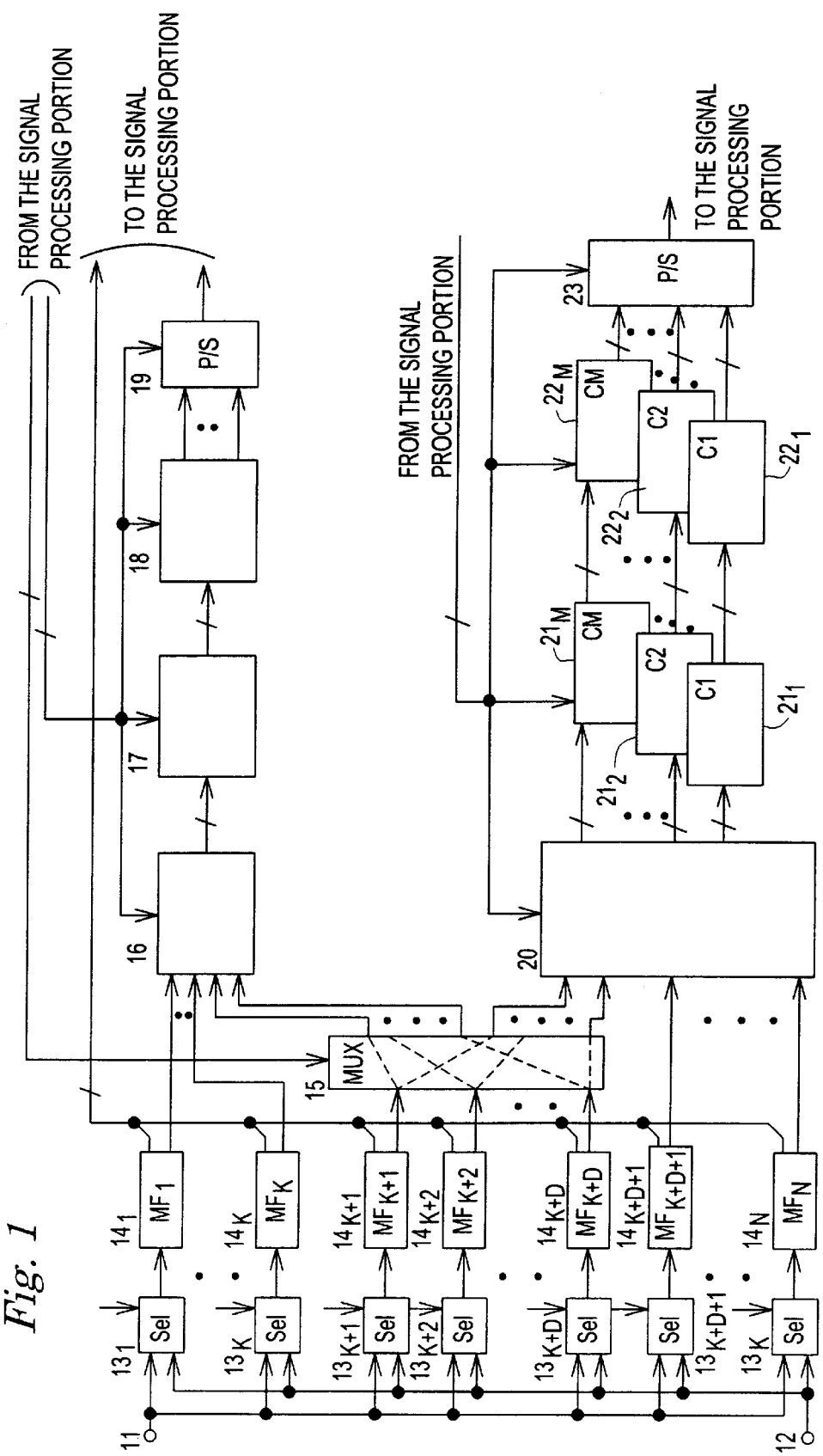
FIG. 1 is a block diagram of the first embodiment of a receiver for a D-CDMA cellular system.

FIG. 1 is a block diagram of the first embodiment of a receiver for a D-CDMA cellular system. The reference 11 designates a signal input terminal for receiving the first branch base band signal generated by a quadrature detection from a spread spectrum signal received by a receiver antenna for the first branch (not shown), the reference 12 designates an input signal terminal for receiving the second branch base band signal generated by a quadrature detection from the spread spectrum signal received by a receiver antenna for the second branch (not shown). An in-phase component (I-component) and a quadrature component (Q-component) of the base band signals of first and second branches are input from the input terminals 11 and 12, respectively.

The base band signals are selected by a plurality of selectors 131 to 13N parallelly connected to the terminals 11 and 12 for alternatively selecting the first or second branch. The selected signal is input to matched filters 141 to 14N corresponding to the selectors 131 to 13N. Matched filters 141 to 14N are complex matched filters for calculating correlation between the base band signal and a replica of a spreading code sequence so as to despread the base band signal. The replica is selected corresponding to the signal to be received from a list (not shown) of spreading code sequences, and set to a spread code register. The matched filters are of double sampling and have a variable a number of taps. The number is from 8 to 1024. Any matched filter of CCD type, SAW filter type or digital IC type are applicable, however an analog matched filter proposed by the present inventors is advantageous in electrical power consumption and calculation accuracy.

Electrical power is output together with the correlation from the matched filter 141 to 14N. A signal processing portion (not shown) generates a long code timing signal for the cell search and path selection signal for the rake combining. The matched filters 141 to 14K are connected to a path selection portion 16 for the common control channel, matched filters 14K+1 to 14K+D are connected to a multiplexer 15, and matched filters 14K+D+1 to 14N are connected to a path selection portion 20 for the traffic channel.

The multiplexer 15 selectively passes the outputs of matched filters 14K+1 to 14K+D to the path selection portions 16 or 20 according to a control signal from the signal processing portion. At the initial cell search, the outputs from 14K+1 to 14K+D are input to the selection portion 16, and otherwise to the selection portion 20.

The path selection portion 16 receives outputs from the matched filters 141 to 14K and outputs from matched filters 14K+1 to 14K+D through the multiplexer 15. The portion selects one or more paths according to a path selection signal generated from the signal processing portion above. The signal processing portion calculates the power of the correlation outputs from 141 to 14K+D and selects A (integer not less than 1) of higher power for each base station from the received signals. The path selection portion 16 selects the outputs from 141 to 14K+D to input the phase correction portion 17 according to the path selection signal.

The phase correction portion 17 performs fading correction of the output of a plurality of paths from the path selection portion 16 according to the phase error signal detected in the received signal of the pilot channel.

There is provided a rake combiner 18 for maximal ratio combining of the received signal of the paths corrected in phase by the phase correction portion 17 at the timing of the corresonding path. The combining is performed for the signals of each base station. The output of the rake combiner 18 is input through a parallel/serial converter (P/S converter) 19 to a signal processing portion (not shown) for a soft decision, a de-interleaving and error correction coding.

The path selection portion 20 for the traffic channel receives the correlation outputs of the matched filters 14K+1 to 14K+D and 14K+D+1 to 14N, and outputs the selected signals to the phase correction portions 211 to 21M. The portions 211 to 21M correspond to codes C1 to CM of multi-code. The signal corrected by the portions 211 to 21M are input to the rake combiners 221 to 22M. The rake combiners 221 to 22M perform maximal ratio combining of the received signal of the paths corrected in phase by the phase correction portions 211 to 21M at the timing of the corresponding path. The combining is performed for the signals of each base station. The output of the rake combiners 221 to 22M are input through a parallel/serial converter (P/S converter) 23 to a signal processing portion (not shown) for a soft decision, a de-interleaving and error correction coding.

Figure 2:
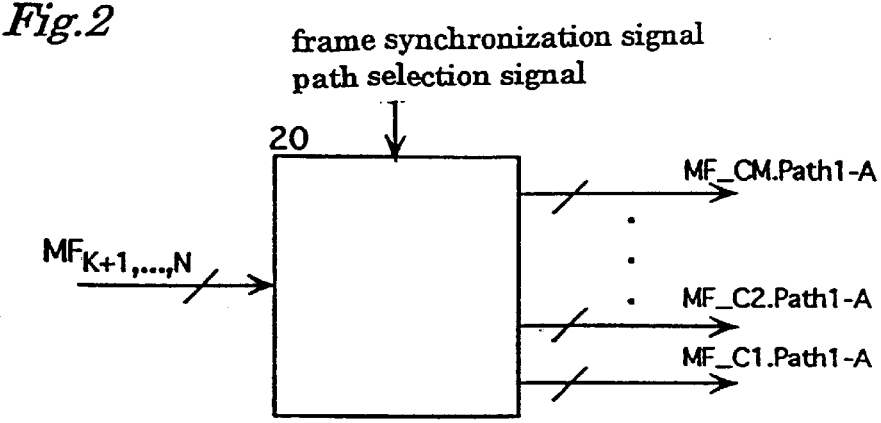
FIG. 2 is a block diagram of a path selection portion for a traffic channel.

FIG. 2 shows input and output signals of the path section portion 20. The outputs of matched filter 14K+1 to 14N are input to the portion 20 which selects a plurality of paths of higher signal power from the maximum power to the Ath power according to the path selection signal for each code.

Figure 3:
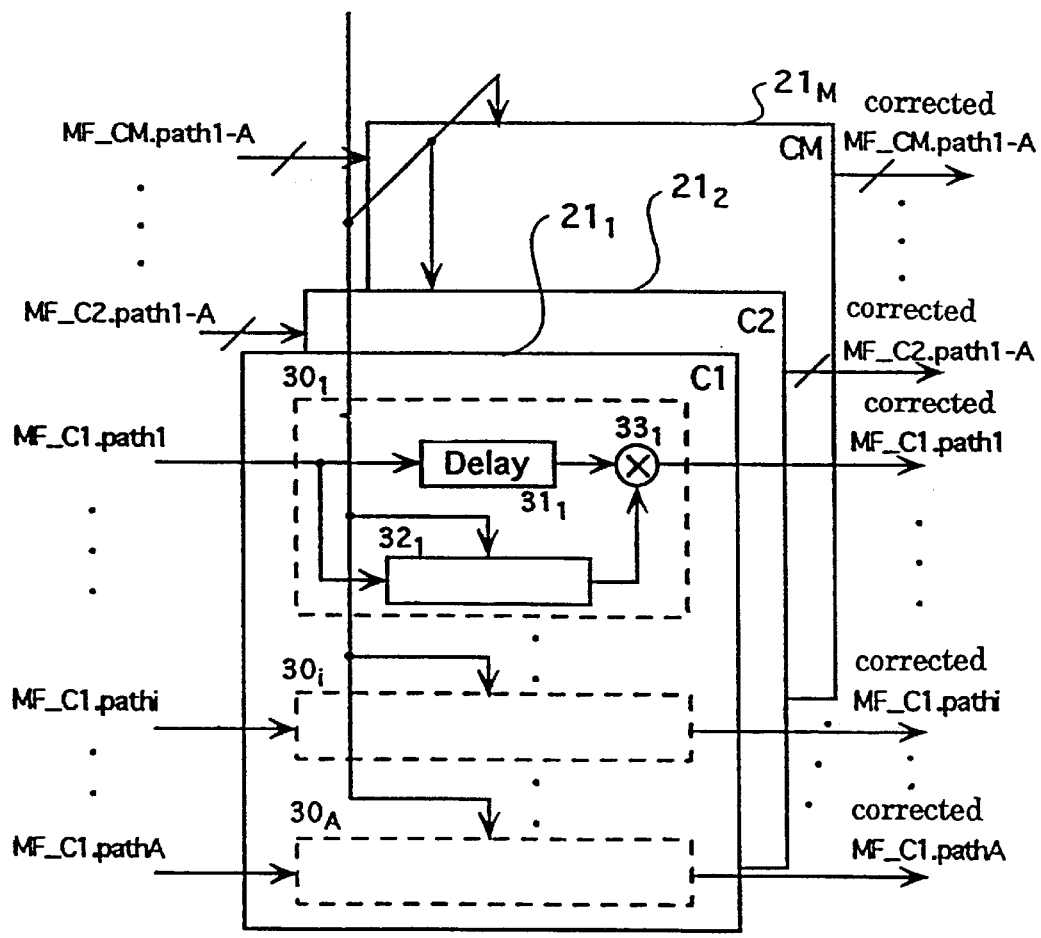
FIG. 3 is a block diagram of a phase correction portion for a traffic channel.

As shown in FIG. 3, the phase correction portion 211 includes a plurality of phase correction means 301 to 30A corresponding to the maximum to Ath paths. Each communication channel has a predetermined pilot signal of predetermined cycle. The phase correction value is obtained by detecting a phase of the pilot symbol. The received signal is multiplied by a conjugate complex of the phase error so as to be corrected in phase. In the phase correction means 301, a phase error prediction portion 321 calculates the phase error from the pilot symbol of the received signal so as to generate the phase corrected signal. A delay circuit 311 delays the received signal by a time equivalent to the process time of the phase error prediction portion 321. A received signal is corrected in phase by multiplying the output of the delay circuit 311 in a multiplication circuit 331 by the phase correction signal of the prediction portion 321. The phase correction means 302 to 30A are similar to 301, and the phase correction portions 212 to 21M are similar to 211.

Figure 4:
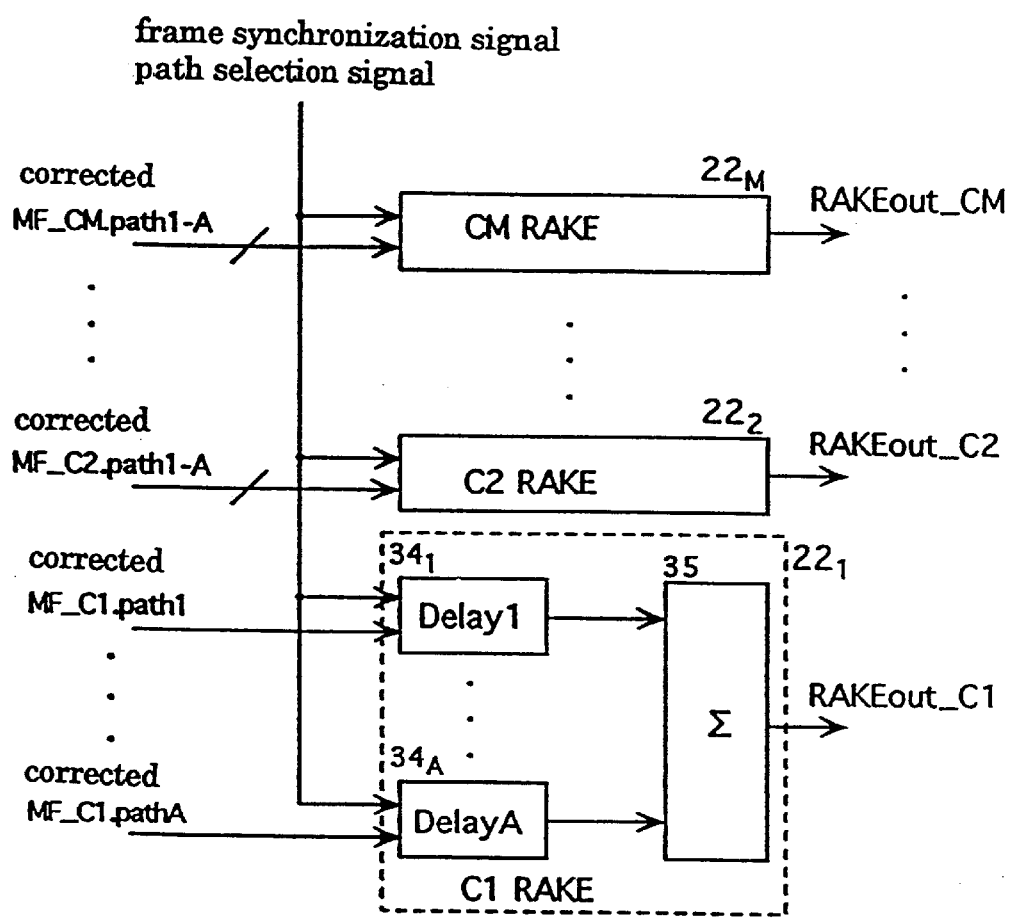
FIG. 4 is a block diagram of a rake combiner for the traffic channel.

In FIG. 4, the rake combiner 221 combines the multi-path signals of the received signal corrected in phase with code C1. The rake combiners 222 to 22M combine the received signals of code C2 to CM. The rake combiner 221 includes delay circuits 341 to 34A and an adder 35 for adding outputs of the circuits 341 to 34A. The rake combiners 222 to 22M are similar to 221. The outputs RAKEout_C1 to REKEout_CM from the rake combiners 221 to 22M are converted by a parallel to serial converter 23 ( FIG. 1) into a serial signal so as to be input to a signal processing portion.

As mentioned above, a plurality of matched filters are adaptively used according to the working condition for improving the cell search speed and the efficiency of multi-rate transfer. The total number N of matched filters, D, to be switched and the number M of multi-code filters are changeable.

Figure 5:
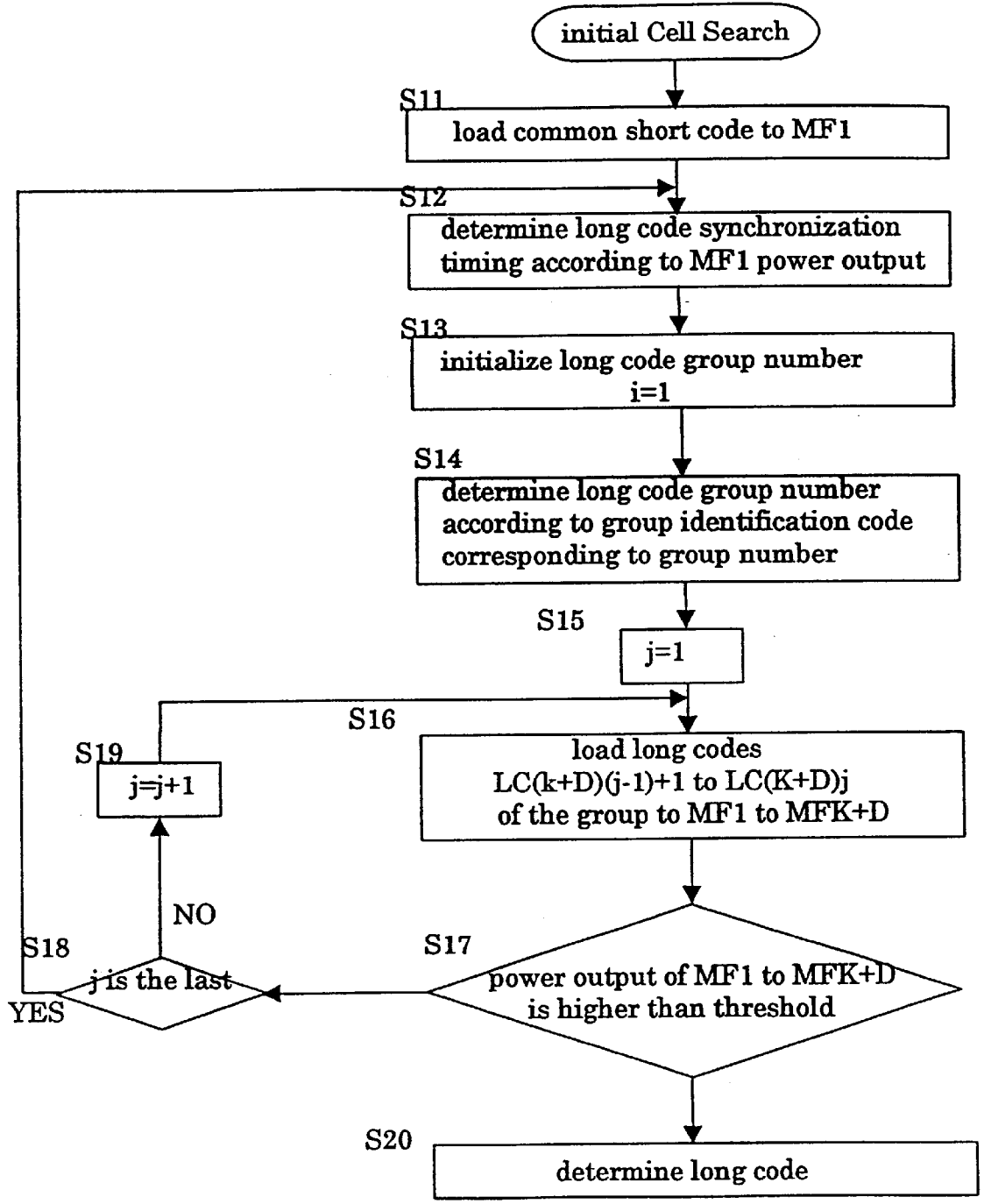
FIG. 5 is a flow chart of the initial cell search in the receiver in FIG.1.

FIG. 5 is a flow chart of the initial cell search by the receiver.

The multiplexer 15 is controlled so that the outputs of the matched filters 14K+1 to 14K+D are introduced to the path selection portion 16. The initial cell search is performed by these matched filters. In the step S11, a common short code SC0 common to all of the cells is loaded to a PN register of the matched filter 141. The first matched filter 141 calculates a correlation between received spread signal and the short code during one long code period. In the step S12, a maximum peak in the correlation is found so that a base station of a cell is identified to which the receiver (mobile station) belongs. An initial number "1" of a long code group number "i" is set in a counter (step S13). Short codes GIC1 to GICK+D are loaded to the spread code register of the matched filters 141 to 14K+D, and the power outputs of the matched filters are compared with a predetermined threshold. When there is an output exceeding the threshold, a long code group is identified corresponding to the short code loaded in the matched filter (step S14).

In step 15, an initial number "1" of a long code number "j" within the long code group "i" is set in a counter (step 15). A segment of "B" chips of the long codes LC(K+D)j-1) to LC(k+D)j as the spread code replica included in the long code group are loaded (step S16). The matched filter 141 to 14K+D calculate in parallel the correlation by the long codes.

The signal processing portion stores the long code numbers and the power, and compares the power with a threshold (step 17). When there is a power higher than the threshold, the long code number is taken as the long code number of the base station from which the signal is to be received step 20). When there is not power higher than the threshold, it is judged whether the code is the last code in the long code. When it is not the last, the j in the counter is increased by "1" (step S19), then the steps from S16 are repeated until a long code is found higher than the threshold. Steps S16 to S19b are repeated. If the step S17 does not judge "Yes" with respect to codes up to the last code, the process is restarted from the step S12.

A rapid initial cell search is possible by the parallel identification using K+D matched filters.

For the information communication or for the hand-over process, the multi-plexer 15 is switched so as to feed the outputs of the matched filters 14K+1 to 14K+D to the path selection portion 20. The processing portion for the common control channel receives only the outputs from the matched filters 141 to 14K. The common control channel is received by the matched filters 141 to 14K. The processing portion for the traffic channel receives the outputs from all other matched filters 14K+1 to 14N.

When only one code C1 is used, that is, a signal spread by the code C1 in the base station BS1, the matched filters 14K+1 and 14K+2 are used if the diversity hand-over does not take place. The selectors 13K+1 and 13K+2 are switched so as to feed the received signal of the first antenna branch from the terminal 11 to the matched filter 14K+1 and the received signal of the second antenna branch from the terminal 12 to the matched filter 14K+2. The code C1 is set as the spread code replica to the matched filters 14K+1 and 14K+2. Other matched filters 14K+3 to 14N are set to a sleep mode so that their electrical power consumption is decreased.

The correlation outputs of the matched filters 14K+1 and 14K+2 are input through the multi-plexer 15 to the path selection portion 20 for the path selection. At most, a number of "A" paths are selected from the signals of two antenna branches. The received signals of the selected paths is input to the phase correction portion 211 corresponding to the code C1 for phase correction, then combined by the rake combiner 221. The output of the rake combiner 221 is input through the parallel serial converter to the signal processing portion. The phase correction portions 212 to 21M and rake combiners 222 to 22m are set to sleep mode.

When the receiver is near the boundary of the cell of base station BS1, the hand-over of "two-site diversity hand-over" takes place. Information on the peripheral cells are transferred to the receiver in advance. The long codes of the base stations BS and BS3 of the peripheral cells are set in the matched filters 141 to 14K for peripheral cell search. A cell with maximum power is selected as the cell to be used next after the hand-over. Then the long code and short code of the next cell is loaded in the matched filters 14K+3 and 14K+4.

The outputs of the matched filters 14K+1 to 14K+4 are input to the path selection portion 20 for the traffic channel. The phase correction portion 211 and the rake combiner 221 corresponding to the code C1 perform phase correction and the rake combining. The output of rake combiner is input through the parallel serial converter to the signal processing portion.

When codes of a number of "M" are used for multi-code transmission, each of codes C1 to CM are loaded to two matched filters. When N-M=8, the multi-code transfer of four codes is performed.

The selectors 131 to 13N can be omitted when a plurality of sampling and holding circuits correspond to a plurality of antenna branches and to the matched filters 141 to 14N. The outputs of the sampling and holding circuits are selectively input to the matched filters. The sampling and holding circuits in each matched filter is omitted to reduce the circuit size.

Other modulation such as BPSK can be implemented with the above circuit.

Figure 6:
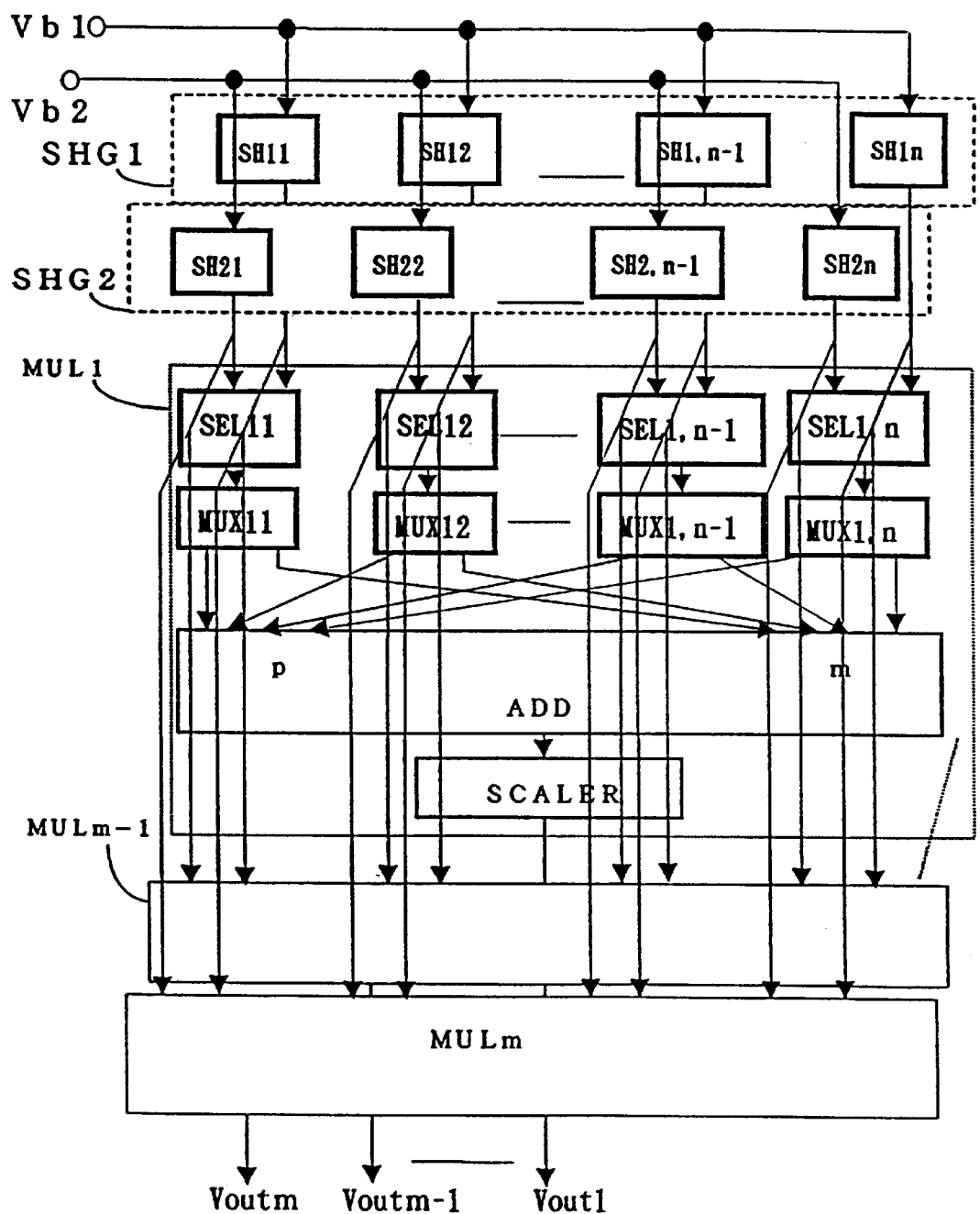
FIG. 6 is a block diagram of a matched filter in the second embodiment of a receiver for a spread spectrum communication system.

FIGS. 6 to 18 show a second embodiment for the receiver. In FIG. 6, a matched filter for the diversity reception of two antenna branches includes two sampling and holding circuit groups SHG1 and SHG2 corresponding to signals Vb1 and Vb2 of the branches. SHGL and SHG2 include a plurality of sampling and holding circuits SH11 to SH1n and SH21 to SH2n, respectively. SHG1 and SHG2 are commonly connected to a plurality of matched filters MUL1 to MULm, which selectively read data of one of the groups. Since the matched filters are commonly used for the data of SHG1 and SHG2, the circuit size is remarkably decreased.

The sampling and holding circuits of each group successively take data without transferring data between the sampling and holding circuits. The transfer error is prevented.

A plurality of selectors SEL11 to SEL1n are provided in the matched filter MUL1 corresponding to the sampling and holding circuits in SHG1 and SHG2. For example, SEL11 receives the outputs from SH11 and SH21. SEL11 selects one of these outputs.

MUL1 includes a plurality of multi-plexers MUX11 to MUX1,n corresponding to the selectors SEL11 to SEL1,n, each for dividing the corresponding output of the selector into two outputs. The multi-plexers are controlled by the spread codes so as to switch the outputs. An adder ADD is connected to the outputs of the multi-plexers MUX11 to MUX1,n. The adder has two group inputs corresponding to each of the two outputs of the multi-plexers. In FIG. 6, these groups are designated by p (positive) and n(negative). An output of the adder ADD is input to a scaler (SCALER) for adjusting an output level. The matched filters MUL2 to MULm are similar to MUL1. Vout1 to Voutm are outputs of the matched filters MUL1 to MULm.

Figure 7:
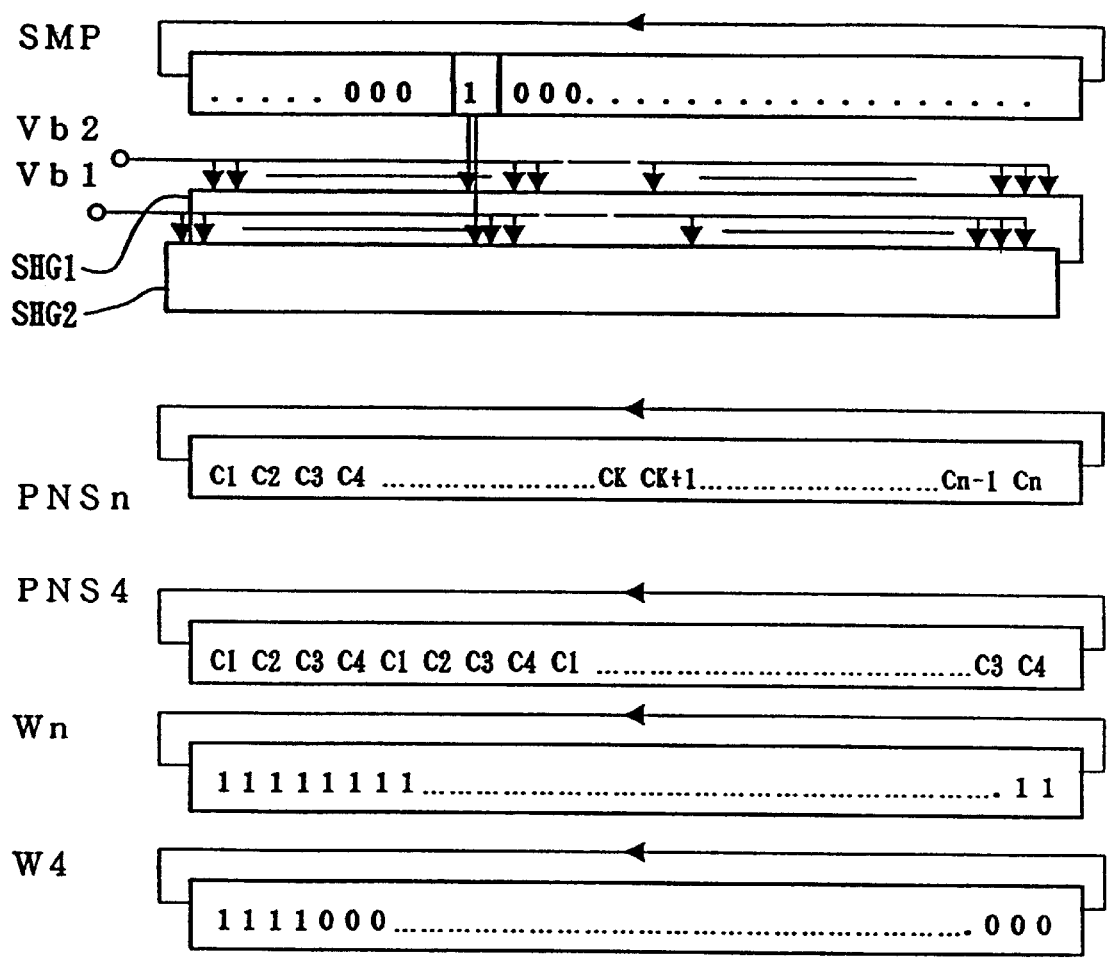
FIG. 7 is a block diagram of a register for controlling the matched filter.

FIG. 7 shows a register for controlling the matched filters. The sampling and holding circuits SH11 to SH1n and SH21 to SH2n are controlled by a shift register SMP which stores "n" number of one-bit data corresponding to SH11 to SH1n and SH21 to SH2n, respectively. These consists of one "1" and n−1"0". The last stage of the shift register is fed back to its first stage, so SMP circulates the bit "1" in a cycle of "n". The sampling and holding circuits takes Vb1 and Vb2 when bit "1" is input.

Spread code C1 to Cn are stored in a register PNSn which circulates the spread code. Since the sampling and holding circuits does not transfer the data, the register has to circulate the spread code. When a fewer number of of spread codes of a divisor of "n" are used, these spread codes are repeatedly stored as shown in the register PNS4. For example, n=256 and the divisor is 4. When the total stages of the register PNSn are used, the total "n" outputs are added. However, when fewer spread codes are used only the last 4 data are added. The outputs of the multi-plxers are limited to a narrower width by windows Wn and W4. Wn has "n" bits of "1" corresponds to a spread ratio of "n" for outputting the total "n" outputs. W4 has four bits of "1" and (n−4) bits of "0" corresponds to a spread ratio of "4". Data is output when the corresponding bit is "1".

Figure 8:
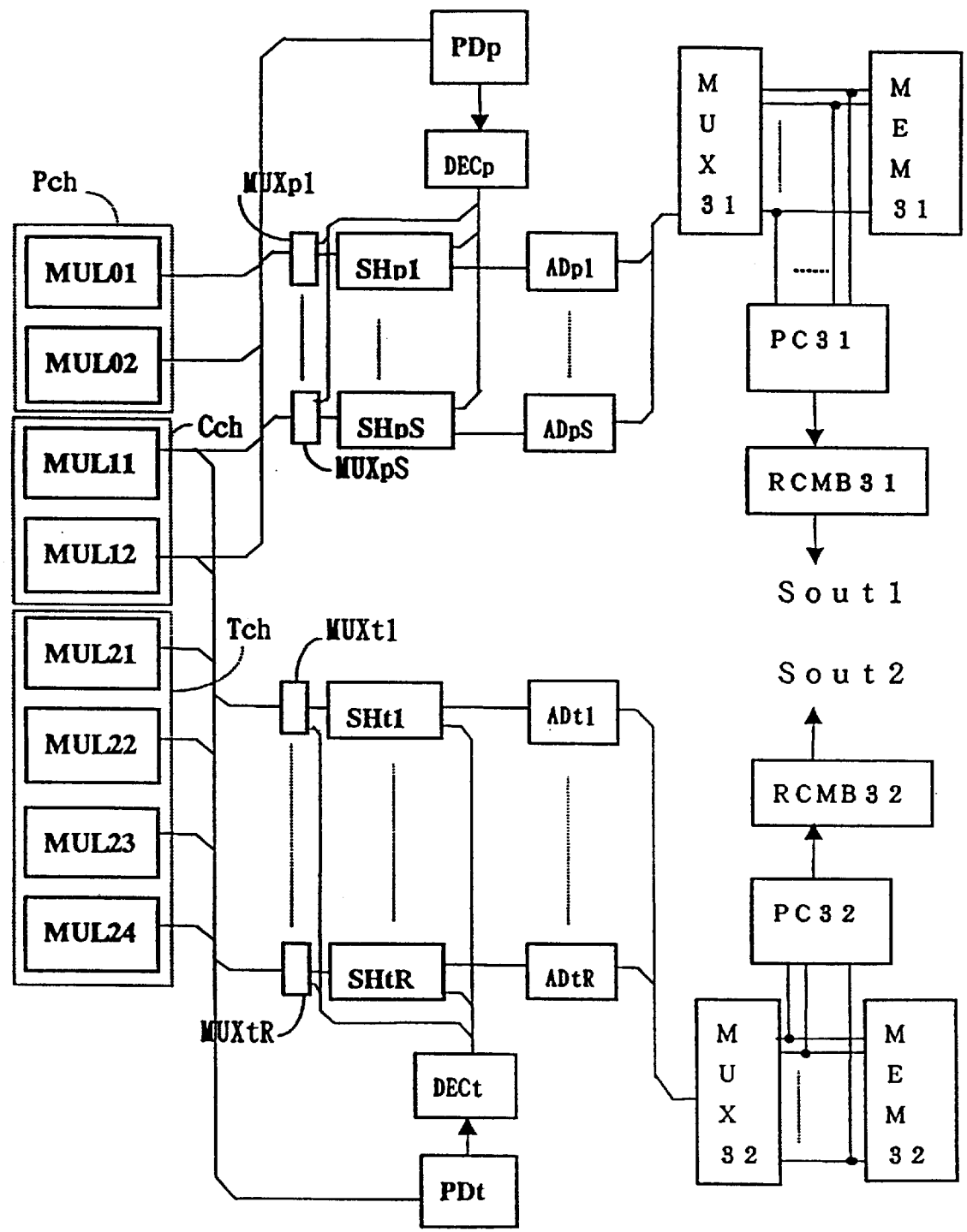
FIG. 8 is a block diagram of circuits following the matched filter and showing the matched filter.

FIG. 8 shows the circuits following the matched filters. The number of matched filters is "8" for easy understanding. Two matched filters MUL01 and MUL02 are for the perch channel group Pch (common control channel), four matched filters MUL21 to MUL24 are for the traffic channel group Tch and two matched filters MUL11 and MUL12 are for a common channel Cch.

Outputs of the groups Pch and Cch are input to multi-plexers MUXp1 to MUXps of four inputs and one output. The multi-plexer MUXp1 to MUXps selectively outputs one of the four outputs from MUL01, MUL02, MUL11 and MUL12. Sampling and holding circuits SHp1 to SHpS for multi-path are connected to the outputs of the multiplexers MUXp1 to MUXps. SHp1 to SHpS hold one of the peaks, respectively, occuring in Pch and Cch. An output of Pch is input to a peak detecting circuit PDp for sorting the power of the correlation outputs. A phase of peaks to be extracted is registered in PDp. PDp outputs a control signal for SHp1 to SHpS which is decoded by a decoder DECp is sampling signals of the sampling and holding circuits. The detection and selection of the peaks are performed for all of the four matched filters.

The six outputs of Tch and Cch are input to a multi-plexer MUXt1 to MUXtR of six inputs and one output for selectively outputting outputs of MUL21, MUL22, MUL23, MUL24, MUL11 and MUL12. Sampling and holding circuits SHt1 to SHtR for multi-path are connected to the outputs of the multi-plexers MUXt1 to MUXtR. SHt1 to SHtR hold one of the peaks, respectively, which appear in Tch and Cch. Outputs of Tch and Cch are input to a peak detecting circuit PDt for sorting the power of the correlation outputs. A phase of peaks to be extracted is registered in PDt. PDt outputs a control signal for SHt1 to SHtR which is decoded by a decoder DECt as a sampling signal of the sampling and holding circuits. The detection and selection of the peaks are performed for all of the six matched filters.

Cch is applicable for both of Pch and Tch. Pch has 2 to 4 channels and Tch has 4 to 6 channels.

A/D converters ADp1 to ADpS and ADt1 to ADtR are connected to SHp1 to SHpS and SHt1 to SHtR, respectively, where the analog outputs of the sampling and holding circuits are converted into digital signals. Outputs of ADp1 to ADpS are input to a multi-plexer MUX31 for multi-path, and outputs of ADt1 to ADtR are input to a multi-plexer MUX32 for multi-path. These multi-plexers MUX31 and MUX32 alternatively output the data of the sampling and holding circuits for time-division processing of the fading correction and rake combining. The circuit therefor is small in size due to the time-division processing. ADp1 to ADpS can be substituted by one A/D converter used in a time-division manner. ADt1 to ADtR can be also substituted by one A/D converter.

MUX31 successively inputs the correlation outputs at the phase of peak power in the perch channel to a memory MEM31. I- and Q- components of the outputs are corrected by a fading correction circuit PC31. Then, the signal is input to the rake combiner RCMB31 and a rake combiner output Sout1 is output. MUX32 successively input the correlation outputs at the phase of peak power in the traffic channel to a memory MEM32. I- and Q-components of the outputs are corrected by a fading correction circuit PC32. Then, the signal is input to the rake combiner RCMB32 and a rake combiner output Sout2 is output.

Figure 9:
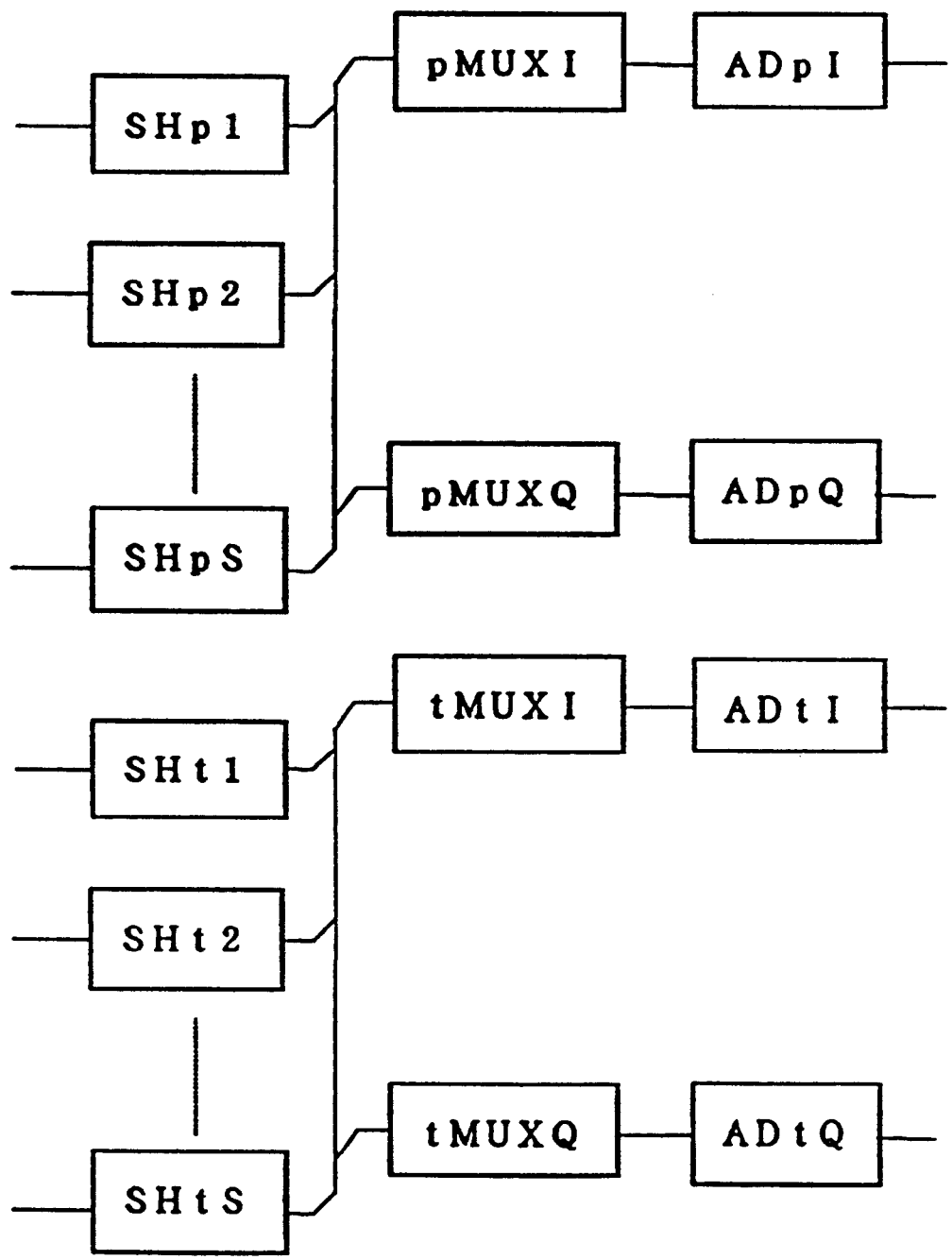
FIG. 9 shows an alternate embodiment of the A/D converter shown in FIG. 3.

FIG. 9 shows a variation of the A/D converter ADp1 to ADpS and ADt1 to ADtR. At the perch channel, only two A/D converters ADpI and ADpQ are provided. At the traffic channel, only two A/D converters ADtI and ADtQ are provided. ADpI and ADpQ are connected through multi-plexers pMUXI and pMUXQ to all the sampling and holding circuits SHp1 to SHpS of the perch channel. ADtI and ADtQ are connected through multi-plexers tMUXI and tMUXQ to the total sampling and holding circuits SHt1 to SHtR of the traffic channel. ADpI converts the I- component of SHp1 to SHpS in a time-division manner. ADpQ converts the Q-component of SHp1 to SHpS in time-division manner. The number of A/D converters is decreased by this embodiment. ADtI and ADtQ are similar to ADpI and ADpQ.

Figure 10:
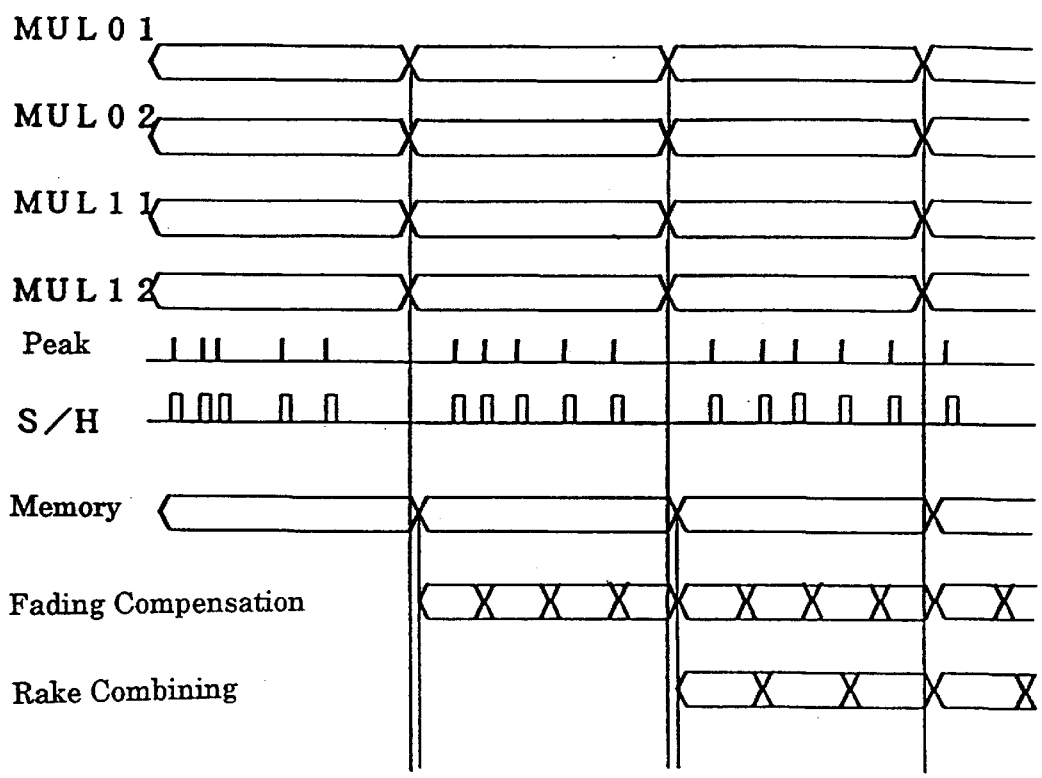
FIG. 10 is a timing chart of the matched filter and the circuit following thereto.
Figure 16:
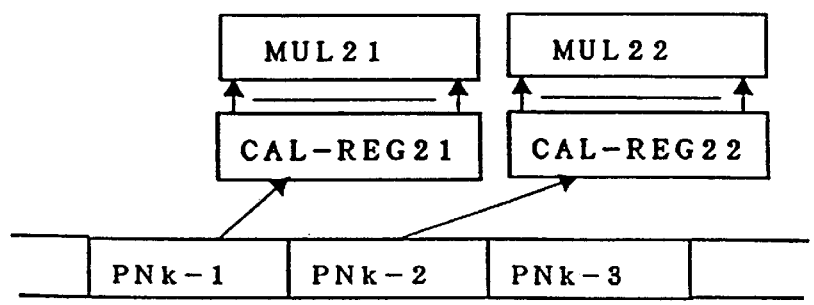
FIG. 16 is a block diagram of circuits for setting a spreading code sequence applicable for a long delay multi-pass signal.

FIG. 10 is a timing chart of the circuit in FIG. 8, showing the process by MUL01, MUL02, MUL11 and MUL12 for the perch channel. If five peaks of multi-path occur during one symbol period, five sampling and holding circuits among SHp1 to SHpS are used. Here, the peaks are shown in the chart as "peak" and the sampling and holding timing is shown in the chart as "S/H". The sampled data are successively stored in the memory MEM31 as shown in the chart "memory". The fading correction is performed after one symbol period, then the rake combining is performed further one symbol period delayed.

Figure 11:
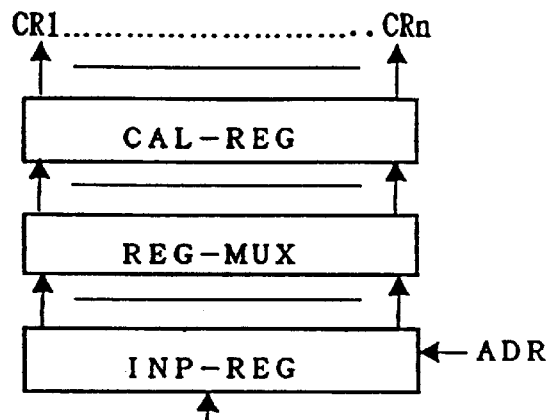
FIG. 11 is a block diagram of a calculation register for storing a spreading code sequence.

As shown in FIG. 11, the spread codes for the multi-plexers MUX11 to MUX1n are stored in a calculation register CAL-REG for generating control signals CR1 to CRn for the multi-plexers. When the spread codes are changed to the next codes instantaneously at the end of one symbol period, the next codes are stored in an input register INP-REG. When a code shorter than the total stages of the shift register is repeatedly used, a switch circuit REG-MUX is used for transferring the code from INP-REG to CAL-REG. Code for one symbol is stored in INP-REG and the code is repeatedly reproduced in CAL-REG.

Figure 12:
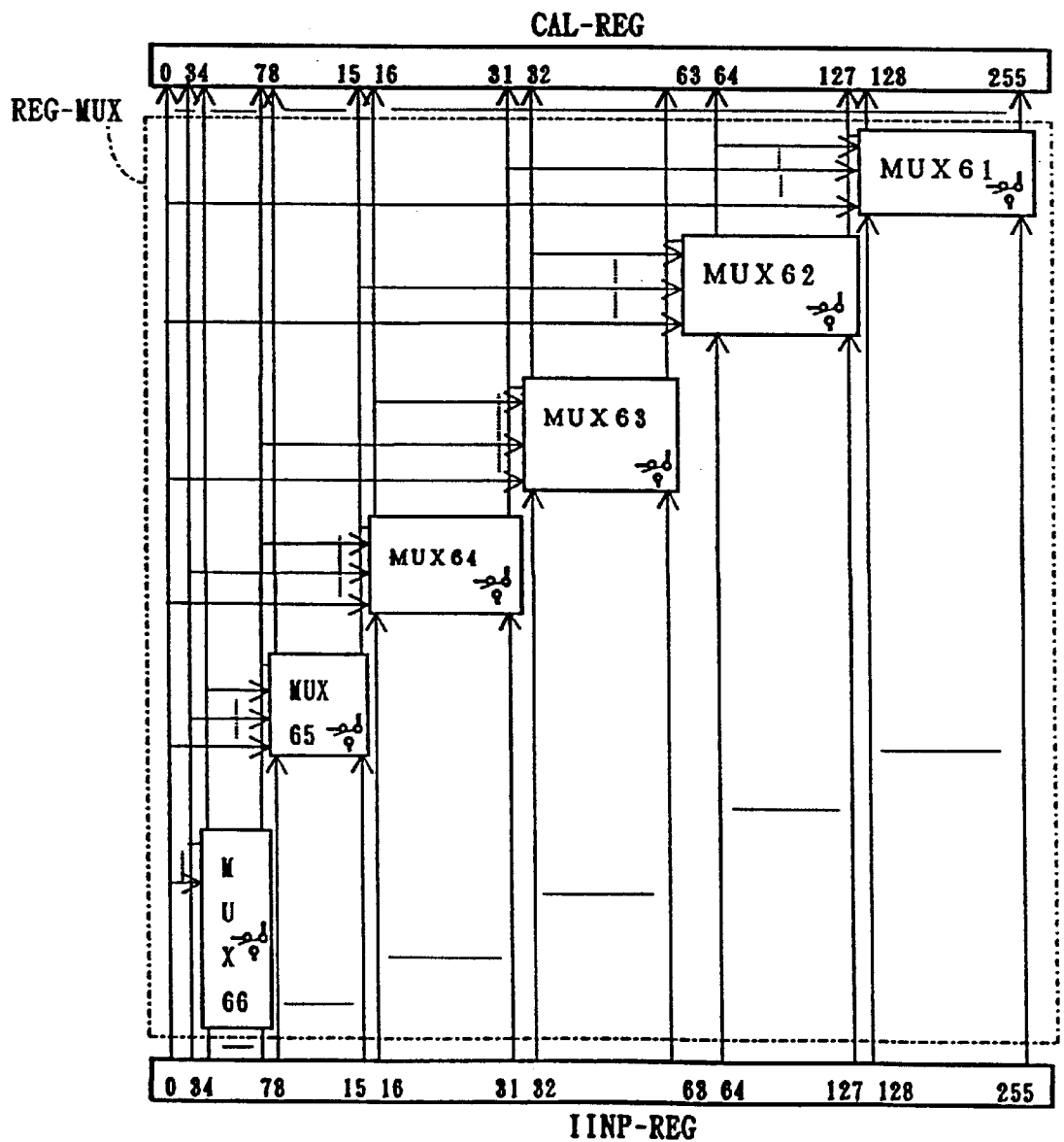
FIG. 12 is a block diagram of a switch circuit of register multiplexerREG-MUX in FIG. 11

FIG. 12 shows the switch circuit REG-MUX for n=256 bits. The vertical lines are lines from INP-REG (at the bottom) to CAL-REG (at the top). The lines are designated by numbers 0 to 255. A multi-plexer 61 consisting of 128 two inputs and one output multiplexer is connected to the lines 128 to 255. The multi-plexer MUX61 introduces outputs 128 to 255 of INP-REG to inputs 128 to 255 of CAL-REG or introduces outputs 0 to 127 of INP-REG to inputs 128 to 255 of CAL-REG. When MUX61 is connected to the outputs 0 to 127 of INP-REG, these outputs are input to the inputs 0 to 127 as well as 128 to 255 of CAL-REG.

A multi-plexer 62 consisting of 64 two-input and one output multiplexer is connected to the lines 64 to 127 at a position nearer to INP-REG than MUX61. The multi-plexer MUX62 introduces outputs 64 to 127 of INP-REG to inputs 64 to 127 of CAL-REG or introduces outputs 0 to 63 of INP-REG to inputs 64 to 127 of CAL-REG. When MUX62 is connected to the outputs 0 to 63 and MUX61 is connected simultaneously to the outputs 0 to 127 of INP-REG, the outputs 0 to 63 are input to the inputs 0 to 63, 64 to 127, 128 to 191 and 192 to 255 of CAL-REG.

A multi-plexer 63 consisting of 32 two inputs and one output multiplexer is connected to the lines 32 to 63 at a position nearer to INP-REG than MUX62. The multi-plexer MUX63 introduces outputs 32 to 63 of INP-REG to inputs 32 to 63 of CAL-REG or introduces outputs 0 to 31 of INP-REG to inputs 32 to 63 of CAL-REG. When MUX63 is connected to the outputs 0 to 31, MUX62 is connected to the outputs 0 to 63 and MUX61 is connected to the outputs 0 to 127 of INP-REG, the outputs 0 to 31 are input to the inputs 0 to 31, 32 to 63, 64 to 95, 96 to 127, 128 to 159, 160 to 191, 192 to 223 and 224 to 255 of CAL-REG.

A multi-plexer 64 consisting of 16 two inputs and one output multiplexer is connected to the lines 16 to 31 at a position nearer to INP-REG than MUX63. The multi-plexer MUX64 introduces outputs 16 to 31 of INP-REG to inputs 16 to 31 of CAL-REG or introduces outputs 0 to 15 of INP-REG to inputs 16 to 31 of CAL-REG. When MUX64 is connected to the outputs 0 to 15, MUX63 is connected to the outputs 0 to 31, MUX62 is connected to the outputs 0 to 63 and MUX61 is connected to the outputs 0 to 127 of INP-REG, the outputs 0 to 15 are input to the inputs 0 to 15, 16 to 31, 32 to 47, 48 to 63, 64 to 79, 80 to 95, 96 to 111, 112 to 127, 128 to 143, 144 to 159, 160 to 175, 176 to 191, 192 to 207, 208 to 223, 224 to 239 and 240 to 255 of CAL-REG.

A multi-plexer 65 consisting of 8 two inputs and one output multiplexer is connected to the lines 8 to 15 at a position nearer to INP-REG than MUX64. The multi-plexer MUX65 introduces outputs 8 to 15 of INP-REG to inputs 8 to 15 of CAL-REG or introduces outputs 0 to 7 of INP-REG to inputs 8 to 15 of CAL-REG. When MUX65 is connected to the outputs 0 to 7, MUX64 is connected to the outputs 0 to 15, MUX63 is connected to the outputs 0 to 31, MUX62 is connected to the outputs 0 to 63 and MUX61 is connected to the outputs 0 to 127 of INP-REG, the outputs 0 to 7 are input to the inputs 0 to 7, 8 to 15, 16 to 23, 24 to 31, 32 to 39, 40 to 47, 48 to 55, 56 to 63, 64 to 71, 72 to 79, 80 to 87, 88 to 95, 96 to 103, 104 to 111, 112 to 119, 120 to 127, 128 to 135, 136 to 143, 144 to 151, 152 to 159, 160 to 167, 168 to 175, 176 to 183, 184 to 191, 192 to 199, 200 to 207, 208 to 215, 216 to 223, 224 to 231, 232 to 239, 240 to 247 and 248 to 255 of CAL-REG.

A multi-plexer 66 consisting of 4 two-input and one output multiplexer is connected to the lines 4 to 7 at a position nearer to INP-REG than MUX65. The multi-plexer MUX66 introduces outputs 4 to 7 of INP-REG to inputs 4 to 7 of CAL-REG or introduces outputs 0 to 3 of INP-REG to inputs 4 to 7 of CAL-REG. When MUX66 is connected to the outputs 0 to 3, MUX65 is connected to the outputs 0 to 7, MUX64 is connected to the outputs 0 to 15, MUX63 is connected to the outputs 0 to 31, MUX62 is connected to the outputs 0 to 63 and MUX61 is connected to the outputs 0 to 127 of INP-REG, the outputs 0 to 3 are input to the inputs 0 to 3, 4 to 7, 8 to 11, 12 to 15, 16 to 19, 20 to 23, 24 to 27, 28 to 31, 32 to 35, 36 to 39, 40 to 43, 44 to 47, 48 to 51, 52 to 55, 56 to 59, 60 to 63, 64 to 67, 68 to 71, 72 to 75, 76 to 79, 80 to 83, 84 to 87, 88 to 91, 92 to 95, 96 to 99, 100 to 103, 104 to 107, 108 to 111, 112 to 115, 116 to 119, 120 to 123, 124 to 127, 128 to 131, 132 to 135, 136 to 139, 140 to 143, 144 to 147, 148 to 151, 152 to 155, 156 to 159, 160 to 163, 164 to 167, 168 to 171, 172 to 175, 176 to 179, 180 to 183, 184 to 187, 188 to 191, 192 to 195, 196 to 199, 200 to 203, 204 to 207, 208 to 211, 212 to 215, 216 to 219, 220 to 223, 224 to 227, 228 to 231, 232 to 235, 236 to 239, 240 to 243, 244 to 247, 248 to 251 and 252 to 255 of CAL-REG.

By switching the multi-plexers to the lines including the 0th line, shorter codes are distributed and reproduced to a lot of groups input to CAL-REG.

Figure 13:
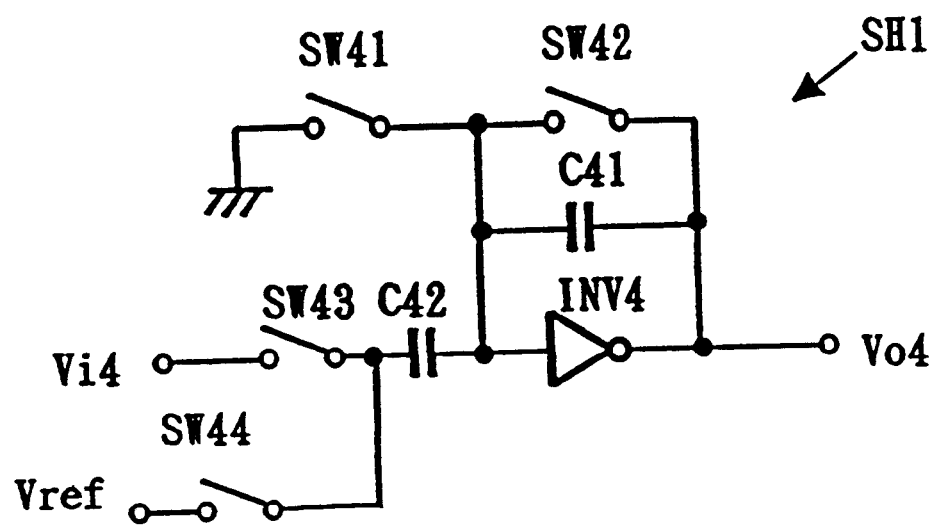
FIG. 13 is a circuit diagram of one sampling and holding circuit in FIG. 1.

FIG. 13 shows that the sampling and holding circuit SH1 has a switch SW43 connected to an input voltage Vi4 equivalent to the signals Vb1 and Vb2. A input capacitance C42 is connected to SW43, and an inverting amplifier INV4 is connected to an output of the capacitance C42. An output of INV4 is connected through a feedback capacitance C41 to its input. When SW43 is switched from a closed position to an open position, SH1 holds Vi4. A refresh switch SW42 is connected parallelly to C41 to INV4, and a refresh switch SW44 is connected to an input of C42 for connecting a reference voltage Vref. Vref is equal to a threshold voltage of INV4 and the input of INV4 is always Vref. When SW44 is closed, the voltages at the opposite terminals of C42 are equal to each other. A residual charge of C42 is cancelled. C41 is short-circuited when SW42 is closed, so the charge in C41 is cancelled. A switch SW41 connected to the ground is connected to the input of INV4. When SW41 is closed and SW42 is opened, the input of INV4 is connected to the ground. Then, INV4 becomes saturated and electrical power consumption is prevented. Other sampling and holding circuits are similar to the above.

Figure 14:
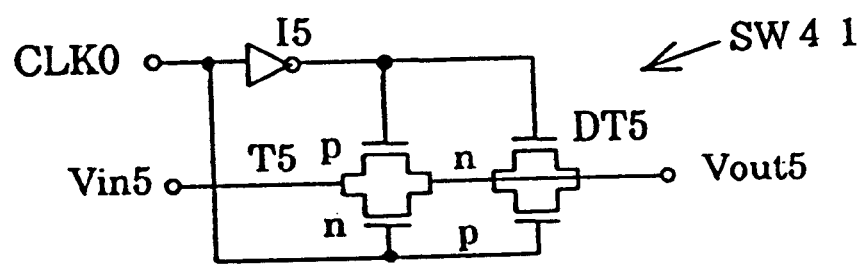
FIG. 14 is a circuit diagram of the switch shown in FIG. 6.

FIG. 14 shows the switch SW41 having a transistor circuit T5 consisting of pMOS and nMOS parallelly connected to an input voltage Vin5. A dummy transistor circuit DT5 is connected to an output of T5 consisting of pMOS and nMOS parallelly connected to T5 and short-circuited at its input and output. A clock CLK0 and its inversion by an inverter 15 are input to gates of T5 and DT5 as control signals. The control signal is inverted with respect to nMOS and pMOS of T5 and DT5, and the relationship between control signal for T5 and Dt5 are inverted to each other.

Figure 15:
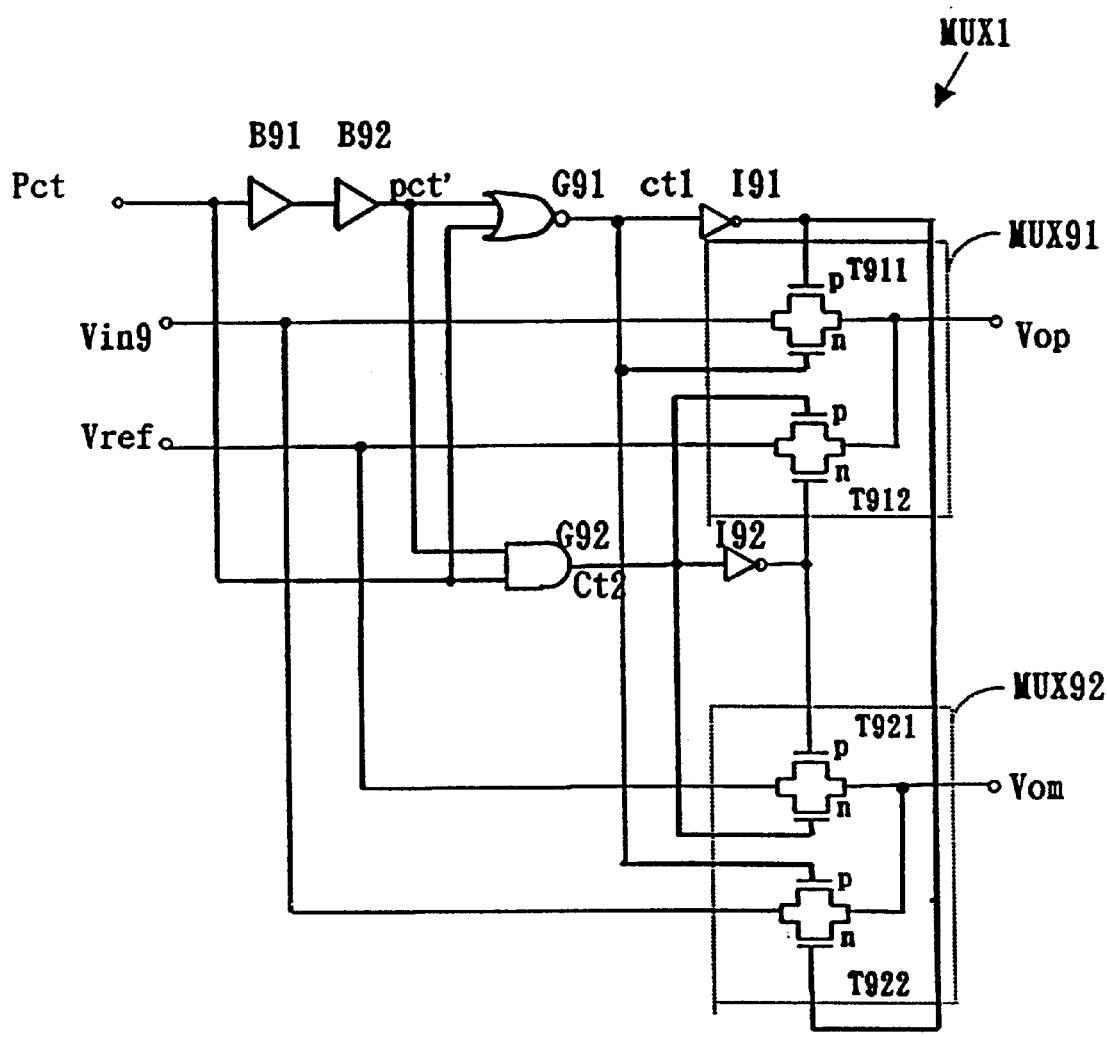
FIG. 15 is a circuit diagram of the multi-plexer shown in FIG. 6.

FIG. 15 shows the multi-plexer MUX1 which includes multi-plexers MUX91 and MUX92. MUX91 consists of a pair of CMOS switches T911 and T912 connected to an input voltage Vin9 ( the output of the sampling and holding circuit SH1) and the reference voltage Vref, respectively. MUX92 consists of a pair of CMOS switches T922 and T921 connected to an input voltage Vin9 and the reference voltage Vref, respectively. The control signals for MUX91 and MUX92 are generated from a pre-control signal Pct. Pct is input to a buffer circuit consisting of buffers B91 and B92 and a delayed pre-control signal pct' is generated. An input and output of the buffer circuit are input to a NOR gate G91 and a AND gate G92. Outputs of G91 and G92 are input to inverter circuits I91 and I92, respectively.

In T911, the output of G91 is input to a gate of nMOS and the output of I91 is input to a gate of pMOS. In T912, the output of I92 is input to a gate of nMOS and the output of G92 is input to a gate of pMOS. The first control signal ct1 for introducing Vin9 to an output Vop of positive side is generated from G91. The second control signal ct2 for introducing Vref to an output Vop of positive side is generated from G92.

In T922, the output of G91 is input to a gate of pMOS and the output of I91 is input to a gate of nMOS. In T921, the output of I92 is input to a gate of pMOS and the output of G92 is input to a gate of nMOS. The first control signal ct1 for introducing Vin9 to an output Vom of negative side is generated from G91. The second control signal ct2 for introducing Vref to an output Vom of negative side is generated from G92. MUX91 and MUX92 have inverted connection to each other so that Vom=Vref when Vop=Vin2 and Vom=Vin9 when Vop=Vref.

FIG. 11 shows setting of a spread code while the multi-path delay exceeds one symbol period. A spread code PNk−1 of (k−1)th symbol period of a composite code is loaded to a calculation register CAL-REG21, and a spread code PNk−2 of (k−2)th symbol period of a composite code is loaded to a calculation register CAL-REG22. One matched filter can detect a multi-path symbol with one symbol period. The detection of two symbol periods is possible by the two matched filters shown in FIG. 16. The detection of longer periods is possible by more matched filters with spread codes successively delayed.

Figure 17:
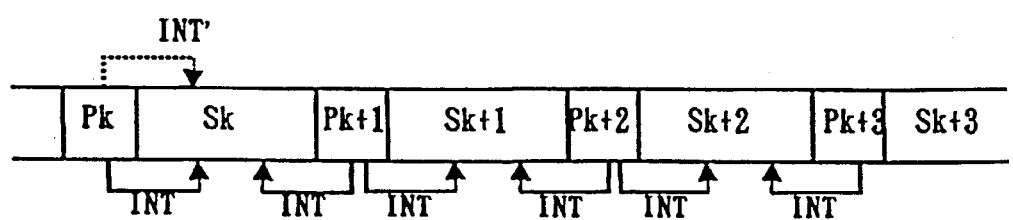
FIG. 17 is signal sequence during fading correction.

FIG. 17 shows a received signal to be corrected for fading. The pilot symbols Pk, Pk+1, Pk+2, . . . are attached before data signals Sk, Sk+1, Sk+2 . . . An interpolation shown by a solid line is performed performed for fading correction. However, when the signal to interference ratio (SIR), the power control bit, or other information in the data signal should be quickly processed, the extrapolation is performed by only one pilot symbol Pk before the data signal Sk, as shown by a broken line.

The SIR is calculated as follows. The pilot symbol after the rake combining is shown in the formula (1), where α(i):a fixed symbol pattern,
A(i): amplitude,
n(i): component of noise and interference and
θ(I):initial residual error, $$Pc(i)=A(i) \cdot e^{j(\alpha(i)+\theta)}+n(i) \quad (1)$$

An averaged signal AV is calculated in the formula (2) by deleting modulation influence of the pilot symbol according to the fixed pilot symbol. I- and Q-components AVi and AVq are obtained as in the formula (2). The signal power Ps and interference power PI are obtained as in the formulae (3) and (4). SIR is a ratio of Ps and PI and is expressed by the formula (5).

$$AV = \frac{1}{Np}\sum_{i=1}^{Np} Pc(i) \cdot e^{-j\alpha(i)} = AVi + jAVq \quad (2)$$

$$Ps=|AV|^2=(AVi)^2+(AVq)^2 \quad (3)$$

$$PI = \frac{1}{Np}\sum_{i=1}^{Np} |P(i) \cdot e^{-j\alpha(i)} - AV|^2 \quad (4)$$

$$SIR = \frac{Ps}{PI} \quad (5)$$

These calculations are very complicated when the multi-path phase is changed because the pilot symbols before and after the data signal are quite different in transmission condition. While, the extrapolation above is simple and has rather good accuracy.

Figure 18:
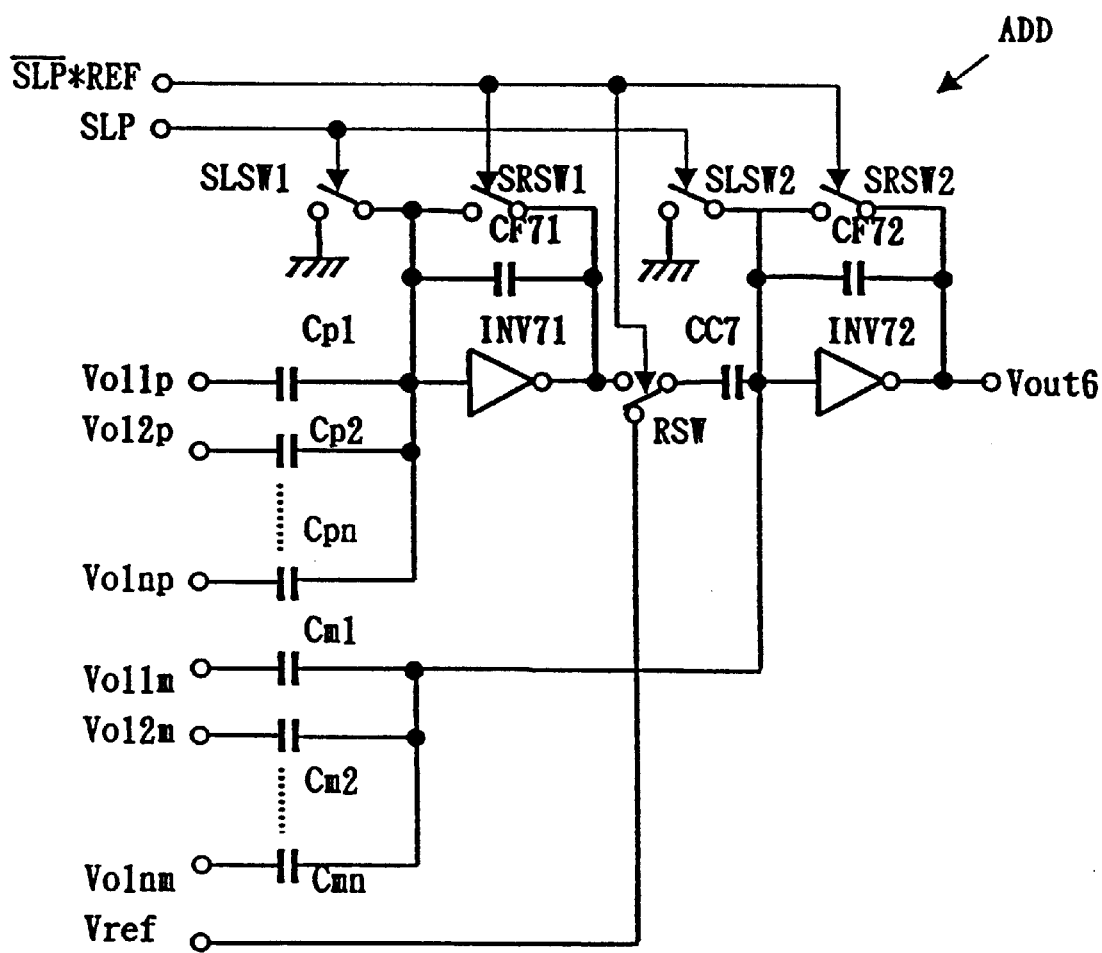
FIG. 18 is a circuit diagram of an addition circuit shown in FIG. 6.

FIG. 18 shows the adder ADD having capacitances Cp1 to Cpn fro receiving the positive inputs Vo11p to Vo1np and capacitances Cm1 to Cmn for receiving the negative inputs Vo1 1m to Vo1nm. The first and second capacitive couplings are constructed by Cp1 to Cpn and Cm1 to Cmn, respectively. An output of the first capacitive coupling is input to an inverter INV71 having odd number of CMOS inverters serially connected. An output of INV71 is connected through a feedback capacitance CF71 to its input. INV71 outputs an inversion of the output of the first capacitive coupling with good linearity. An output of the second capacitive coupling is input to an inverter INV72 having odd number of CMOS inverters serially connected. An output of INV72 is connected through a feedback capacitance CF72 to its input. INV72 outputs an inversion of the output of the second capacitive coupling with good linearity.

The output of INV71 is connected through an intermediate capacitance CC7 to the input of INV72. INV72 integrates the inversion of the outputs of the first capacitive coupling and the output of the second capacitive coupling. When CC7=CF71, the output of INV72 is given by the formula (6).

$$Vout6 = \frac{\sum_{i=1}^{n} Cpi \cdot Volip - \sum_{j=1}^{n} Cmi \cdot Volim}{CF72} + Vd \quad (6)$$

Figure 19:
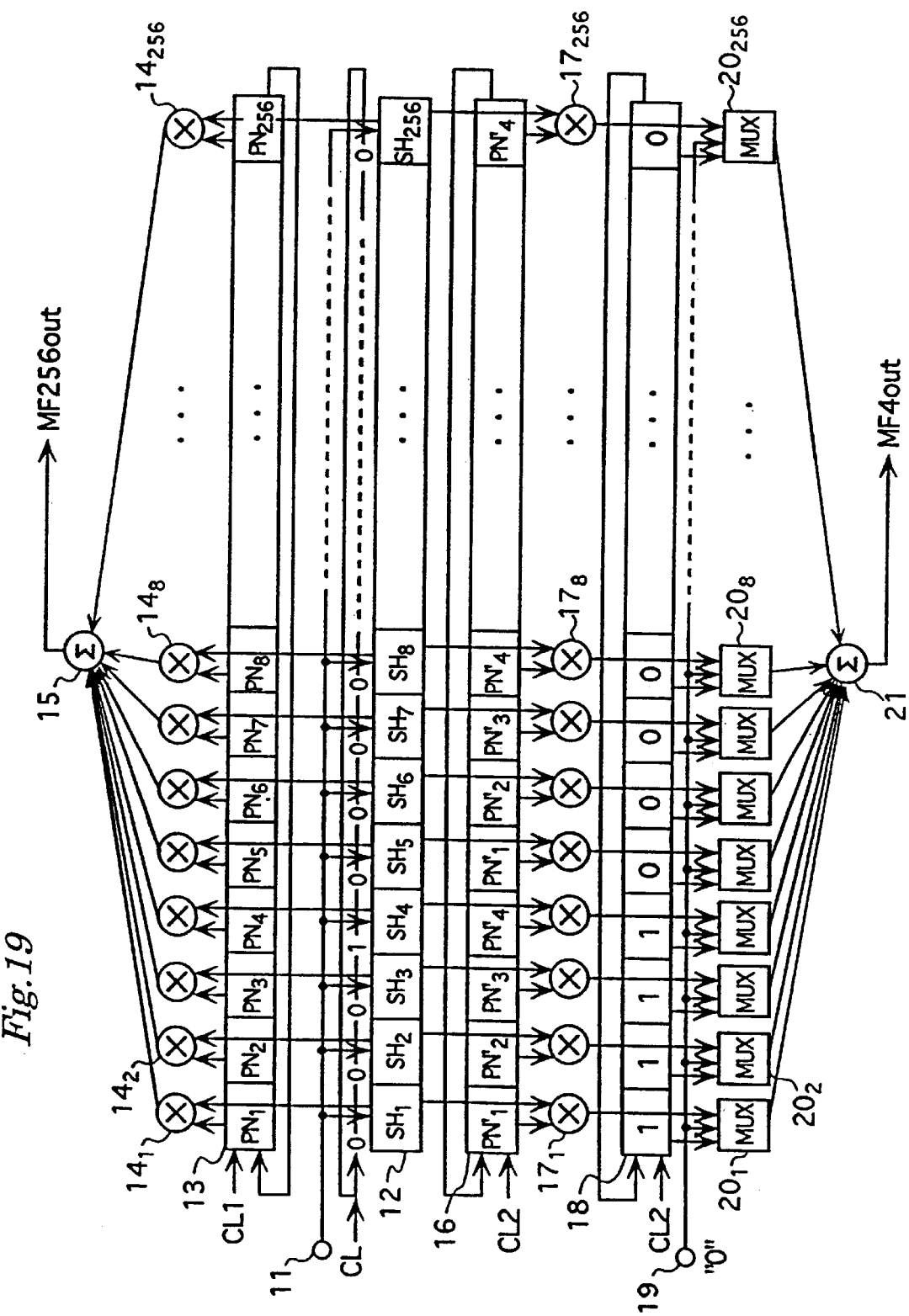
FIG. 19 is a block diagram of the third embodiment of a matched filter bank.

FIG. 19 shows a matched filter bank of the third embodiment. The reference designates an analog signal input terminal for receiving a base band signal obtained from a signal received from an antenna. The reference 12 designates a group of sampling and holding circuits SH1 to SH256 which are parallelly connected to the terminal 11. The sampling and holding circuits are controlled by a control signal shown by "0" and "1" at the upper adjacent area of the sampling and holding circuits in FIG. 19. When the control signal is "1", the sampling and holding circuit takes new data. The control signal is shifted in response to a sampling clock CL.

The initial condition of the control signal for SH1 is "1" and SH1 takes the analog signal from the terminal 11. In the next timing, the control signal for SH2 is "1" and for others are "0", so SH2 takes the signal. Then, SH3, SH4, . . . take the signal successively. After the sampling by SH256, the sampling cycle from SH1 is restarted.

The reference 13 designates a PN code register for storing PN1 to PN256 of 256 chips. The register is a circulation type. The PN codes are shifted with circulation in response to a clock CL1 synchronous to CL. The reference 141 to 14256 are multipliers for multiplying outputs from stages of the register 13 and outputs from SH1 to SH256. PN codes in the register 13 are digital data and the multipliers 141 to 14256 are analog/digital multipliers.

The reference 15 is an analog adder for summing the outputs of the multi-pliers 141 to 14256 up. A correlation between the received signal and the PN codes is calculated.

The reference 16 is the second PN code register. This is a 256 stage shift register of the circulation type. Four chips PN code (PN'1 to PN'4) is repeatedly stored in the register 16. The PN code is shifted by a shift clock CL2.

The references 171 to 17256 designate multipliers for multiplying the input signal in the sampling and holding circuits by the PN codes in the register 16.

The reference 18 designates an addition control register of 256 stages. This is a shift register of circulation type. Four successive stages have data "1" and other stages have data "0". The data are control signals for multi-plexers 201 to 20256.

The reference 19 designates a signal input terminal of a constant "0" for receiving a signal corresponding to "0" from an adder 21. The multi-plexers 201 to 20256 selectively output the output of the multipliers 171 to 17256 or the signal corresponding to "0" controlled by the outputs from the register 18. When the control signal is "1", the output of the multipliers are selected, otherwise "0" is selected.

The reference 21 designates an adder for outputting a correlation of 4 sampled date and 4 PN codes.

Therefore, the sampling and holding circuits are commonly used for the matched filters for 256 chips and 4 chips and the circuit size becomes small.

Figure 20:
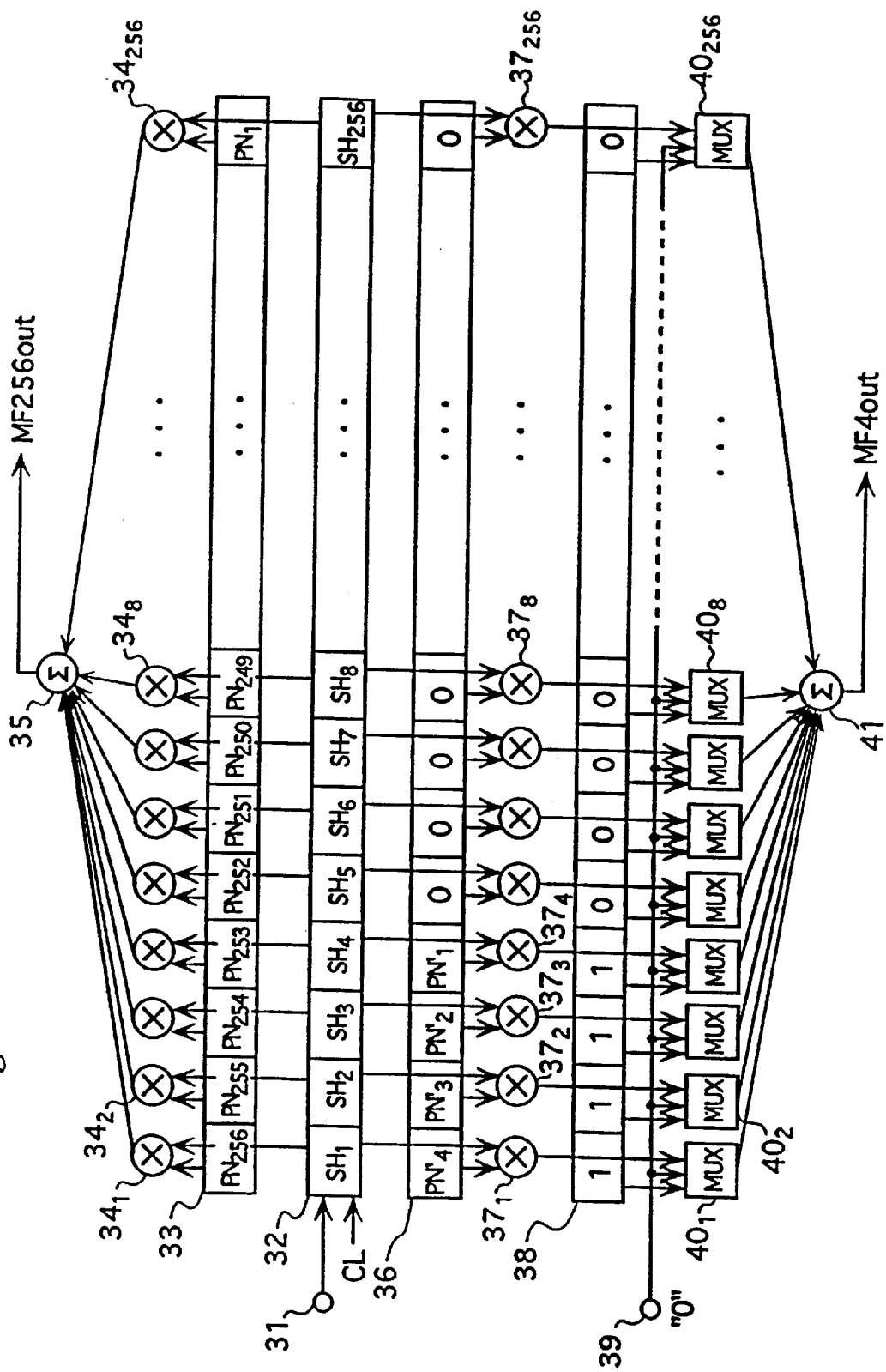
FIG. 20 shows another matched filter bank.

FIG. 20 shows another matched filter bank in which data is transferred between successive sampling and holding circuits one after another, 31 designates an analog signal input terminal and 32 designates an analog shift register for sampling the analog signal input from the terminal 31 and shifting the data in response to the clock CL. 33 designates the first PN register for storing the first PN codes of 256 chips from PN1 to PN256. 341 to 34256 are multipliers for multiplying the data in the register 32 by PN1 to PN256. 35 designates an adder for summing the outputs from the multipliers up.

36 designates the second PN code register of 256 stages having codes of PN'1 to PN'4 in the first to the fourth stages. "0" is stored in other stages. 371 to 37256 are multipliers for multiplying the sampled signal in SH1 to SH256 by the data in the register 36.

38 designates an addition control register for controlling the multi-plexers 401 to 40256. In the first to the fourth stages, "1" is stored, and "0" is stored in other stages. 39 designates "0" input terminal, 401 to 40256 designate multi-plexers for selectively outputting the outputs of the multi-pliers or the "0" signal.

Figure 21:
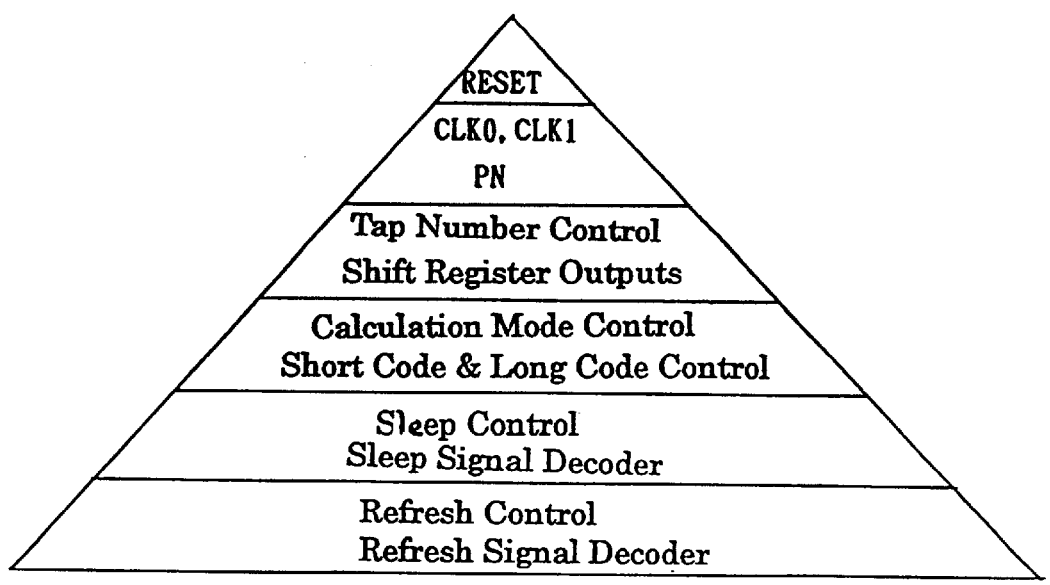
FIG. 21 is a conceptual diagram of a hierarchy of control for a fourth embodiment of a matched filter.

FIG. 21 shows a hierarchy of a matched filter of the fourth embodiment. In the hierarchy, "RESET" is the top, two system clocks "CLK0" and "CLK1" and "PN-CODE" are the second. The third is "TAP NUMBER CONTROL", the fourth includes "CACULATION MODE" and "SHORT-CODE AND LONG-CODE". The fifth is "SLEEP CONTROL" and the sixth is "REFRESH CONTROL". The upper layer is superior to the lower.

A circuit of a sleep mode is not necessary to be refreshed. It means that "SLEEP CONTROL" is superior to "REFRESH CONTROL". "TAP NUMBER CONTROL" is superior to both of "SLEEP CONTROL" and "REFRESH CONTROL". The hierarchy makes the control system simple and the circuit size small.

When a portable terminal is in a waiting condition, intermittent reception to save power takes place. The sampling and holding circuit and addition circuit work intermittently and is in sleep mode most of time.

For "TAP NUMBER CONTROL," feedback lines of a shift register are controlled so that a PN code sequence of a necessary length is circulated. When a part of sampling and holding circuit and addition circuit are unnecessary due to decrease of the number of taps, these circuits enter sleep mode.

Figure 22:
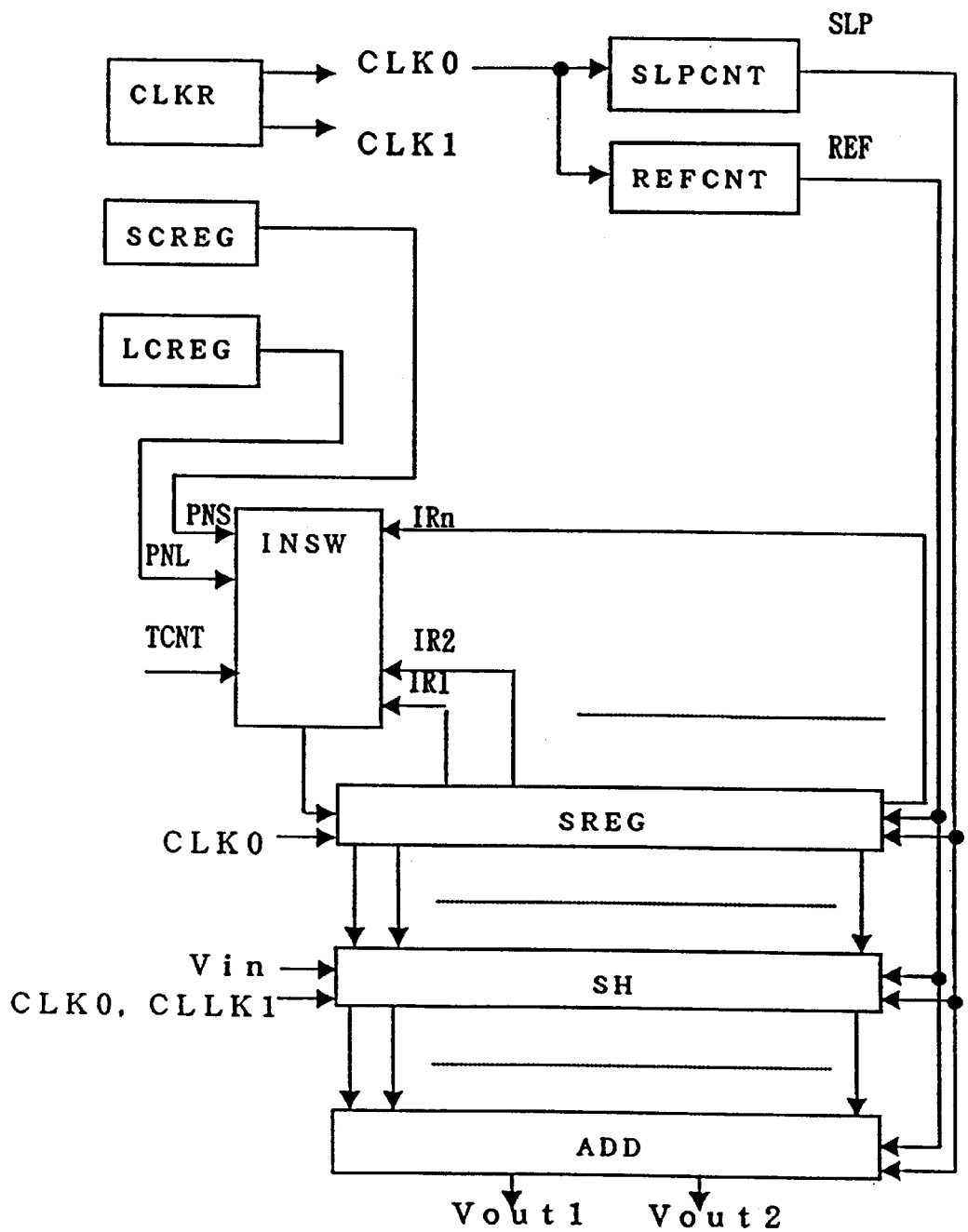
FIG. 22 shows the fourth embodiment of the matched filter.

FIG. 22 shows a matched filter having the hierarchy in FIG. 21. There is provided a clock generating circuit for generating clocks CLK0 and CLK1 inverted to each other. CLK0 is a system clock for the total system of the matched filter. CLK1 is a sampling signal of intermediate timing of CLK0 for a double sampling.

CLK0 is input to a sleep control circuit SLPCNT and to a refresh control circuit REFCNT. These circuits perform periodically sleep and refresh of circuits based on the clock CLK0.

CLK0 and CLK1 are input as timing signals to the sampling and holding circuit SH for receiving an input signal Vin. The sampling and holding circuit SH holds the input signal successively and multiplies the signal by a PN code sequence. There are provided a short code PNS and a long code PNL as the PN code sequence. PNS is supplied from a short code register SCREG and PNL is supplied from a long code register LCREG. The PN code sequences are input through a input switching circuit INSW to a shift register SREG.

The shift register SREG has a plurality of feedback outputs IR1, IR2, . . . , IRn at the intermediate stages and the last stage. The sampling and holding circuit receives the total data in the shift register so that the multiplication is controlled. The outputs of the sampling and holding circuit SH are input to an adder ADD which sums both of the double sampling data up so as to generate addition results Vout1 and Vout2.

A tap number control signal TCNT is input to INSW which selects one of the feedback outputs IR1 to IRn according to TCNT. The selected output is introduced to the input of the shift register. The circulation of PN code sequence of the predetermined number is executed.

Figure 23:
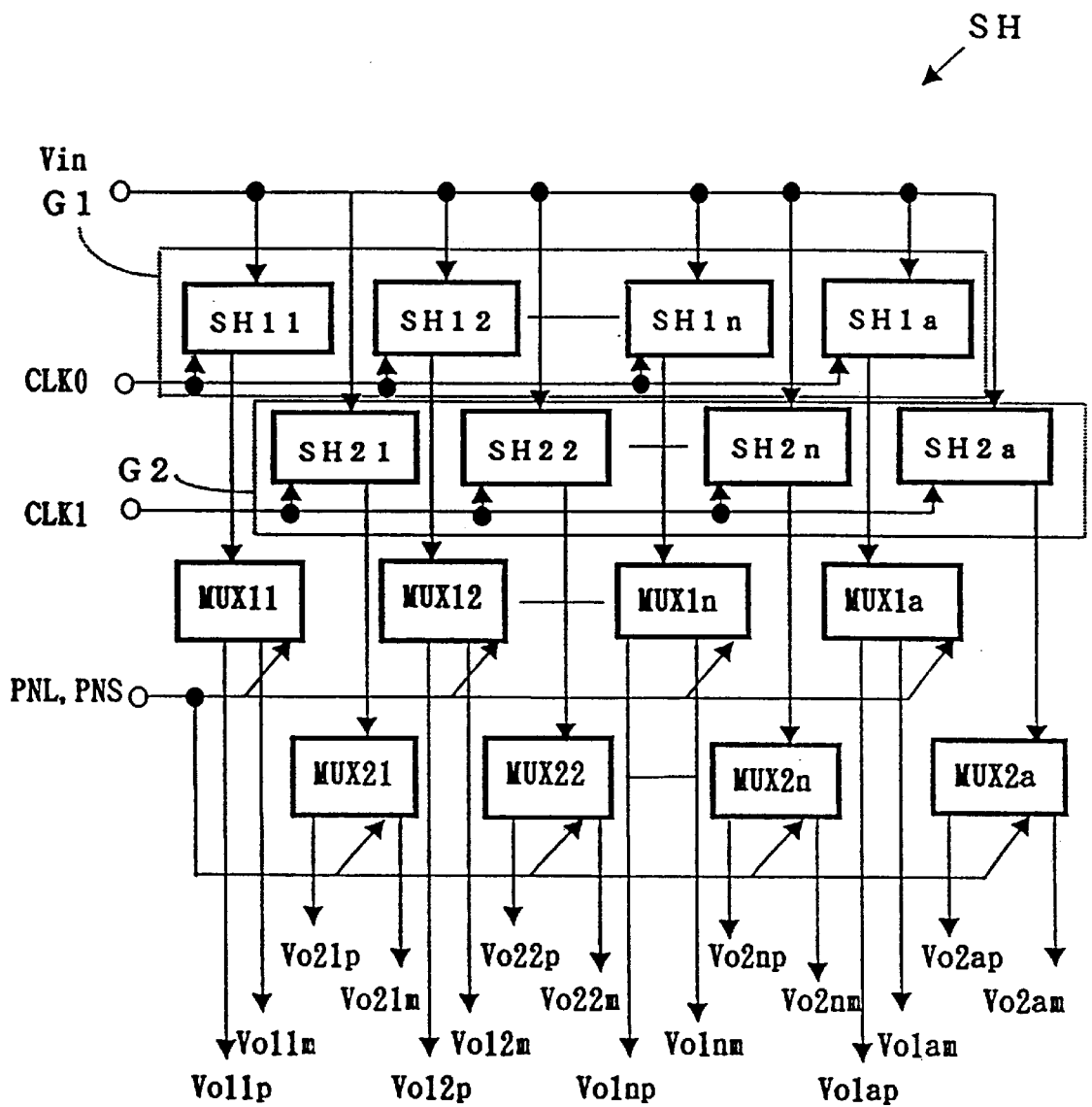
FIG. 23 is a block diagram of a sampling and holding circuit of the matched filter in FIG. 22.

As shown in FIG. 23, the sampling and holding circuit SH has the first and second groups G1 and G2 of sampling and holding circuits for receiving the analog input voltage Vin. G1 consists of sampling and holding circuits SH11, SH12, . . . , SH1n and G2 consists of sampling and holding circuits SH21, SH22, . . . , SH2n corresponding to each other. These groups are alternatively used. The sampling and holding circuits of the first group are successively refreshed in a cycle of (n+1) chip time. A sampling and holding circuit SH1$a$ is provided so as to be used when one of the sampling and holding circuits SH11 to SH1n refreshed. SH1$a$ is refreshed when all of the SH11 to SH1n are used. The sampling and holding circuits of the second group are successively refreshed similarly to the first group. A sampling and holding circuit SH2$a$ is provided for a refreshed sampling and holding circuit among SH21 to SH2n. SH2$a$ is refreshed when all of the SH21 to SH2n are used. The refresh control is independent from the tap number control. Unused sampling and holding circuits are refreshed when the number of taps is decreased for simplifying the control.

Figure 26:
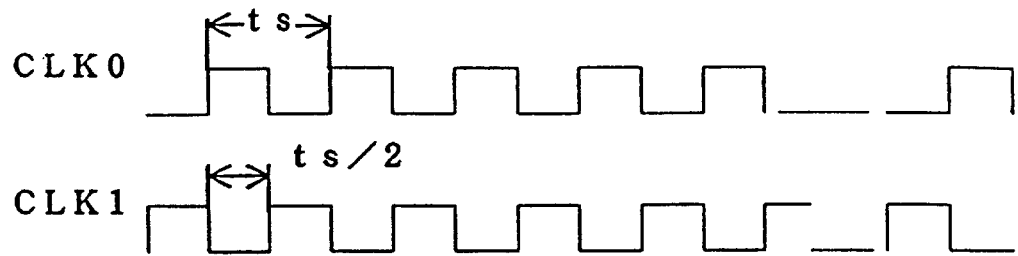
FIG. 26 is a timing chart of clocks CLK0 and CLK1 in FIG. 22.

G1 and G2 have a timing based on CLK0 and CLK1, respectively. CLK0 and CLK1 have a cycle of the chip time and are shifted by a half of the chip time from each other, as shown in FIG. 26. The sampling and holding of Vin is performed by SH11, SH21, SH12, SH22, . . . , SH1n, SH2n on every ½ chip time.

A plurality of multi-plexers MUX11 to MUX1n and MUX1a corresponding to SH11 to SH1n and SH1a, and a plurality of multi-plexers MUX21 to MUX2n and MUX2a corresponding to SH21 to SH2n and SH2a are provided. The multi-plexer MUX1i outputs a positive output Vo1ip when the PN code is "1" and a negative output Vo1im when the PN code is "0".

Figure 24:
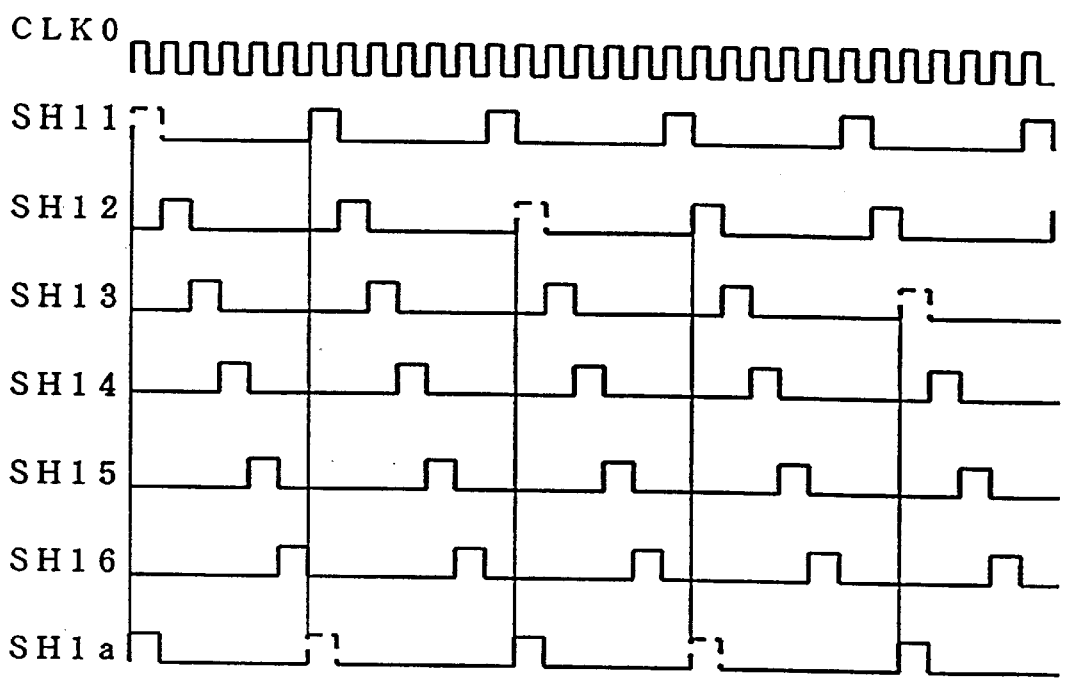
FIG. 24 is a timing chart showing refresh timing of the sampling and holding circuit in FIG. 23.

FIG. 24 is a timing chart of the refresh timing when the total number of the sampling and holding circuits is "6" for easy understanding. In the figure, the sampling and holding is performed at pulses of solid line and the refresh is performed at pulses of broken line. At first, SH11 is refreshed and is substituted by SH1a. The data held by SH1a is kept until the next sampling timing of SH1 is finished, they SH1a is refreshed. SH12 is refreshed just after the refreshment of SH1a, then a new data is held by SH1a. Similarly, SH13 and other sampling and holding circuits are used for sampling and refreshing.

Figure 25:
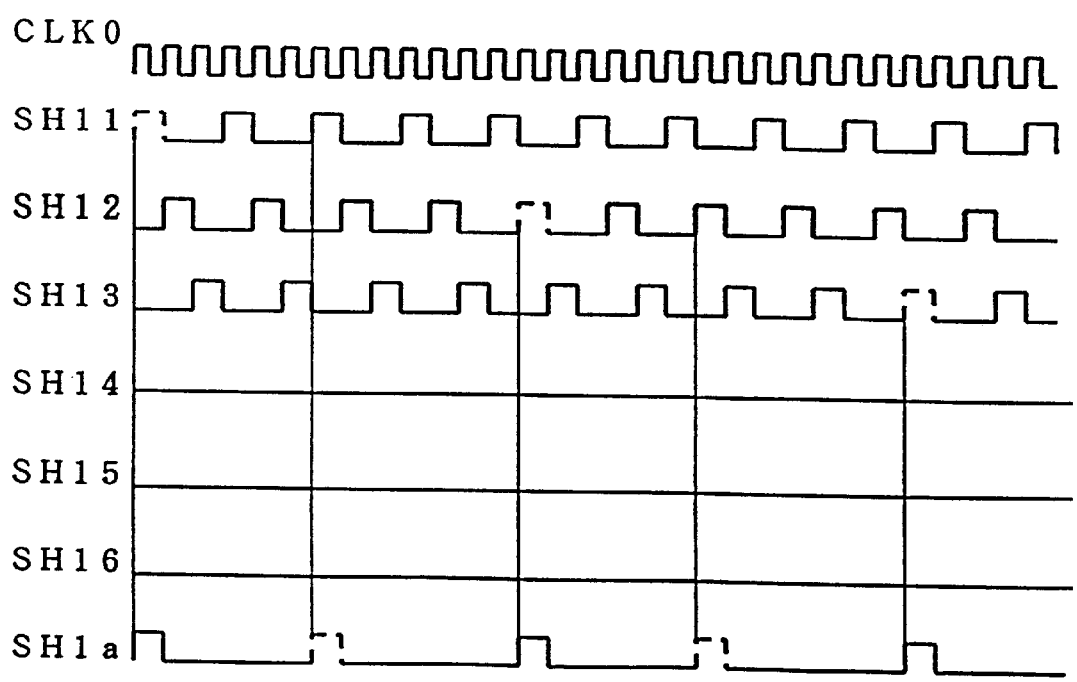
FIG. 25 is a timing chart showing a refresh timing of another sampling and holding circuit.

As shown in FIG. 25, the refresh timing is the same as in FIG. 24 when the number of taps is decreased to "3" in spite of that the frequency of the sampling and holding is twice as in FIG. 24. This simplifies the control.

The number of sampling and holding circuits for substitution can be more for more frequent refreshment.

Figure 27:
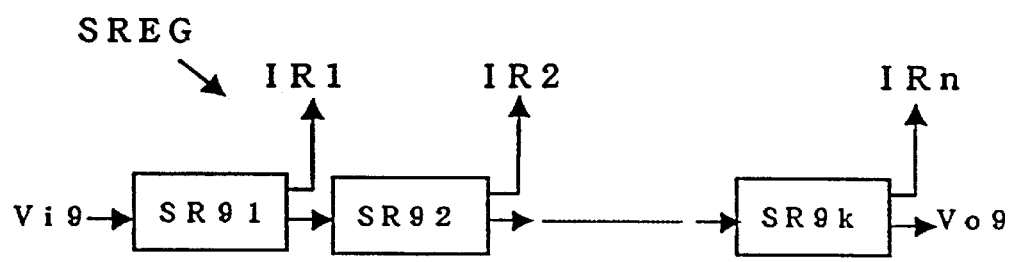
FIG. 27 is a block diagram of a shift register in FIG. 22.

FIG. 27 shows the shift register SREG, which consists of a plurality of small shift registers SR91, SR92, . . . , SR9k serially connected. The feedback outputs IR1, IR2, . . . , IRn are output from the registers SR1, SR2, . . . , SRn, respectively. By the selection of outputs by INSW, the shift register is rather simple.

Figure 28:
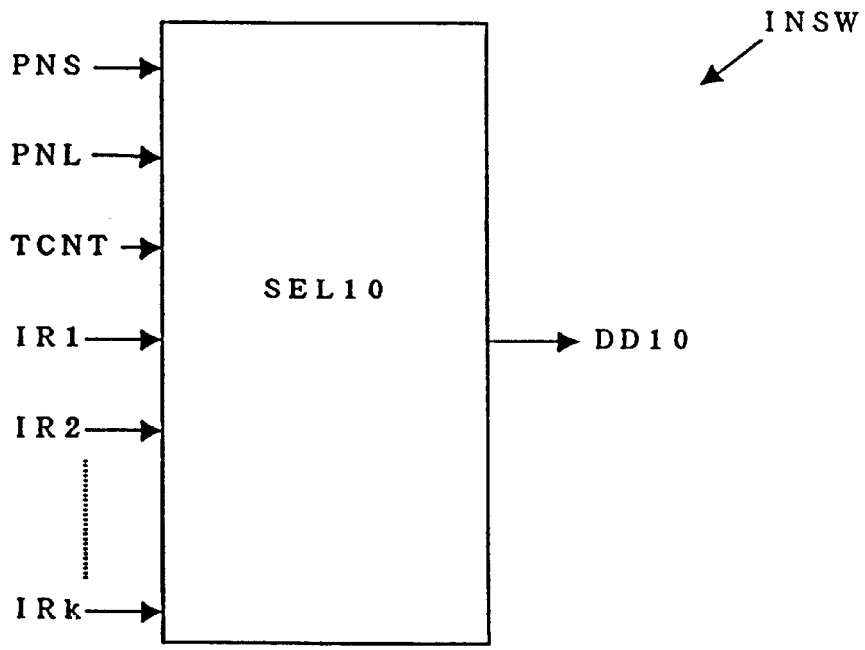
FIG. 28 is a block diagram of an input switching circuit in FIG. 22.

FIG. 28 shows INSW, which consists of a selector SEL10. The above PNS, PNL, TCNT, IR1 to IRn are input to SEL10, and SEL10 selectively outputs one of these inputs as an output DD10.

Figure 29:
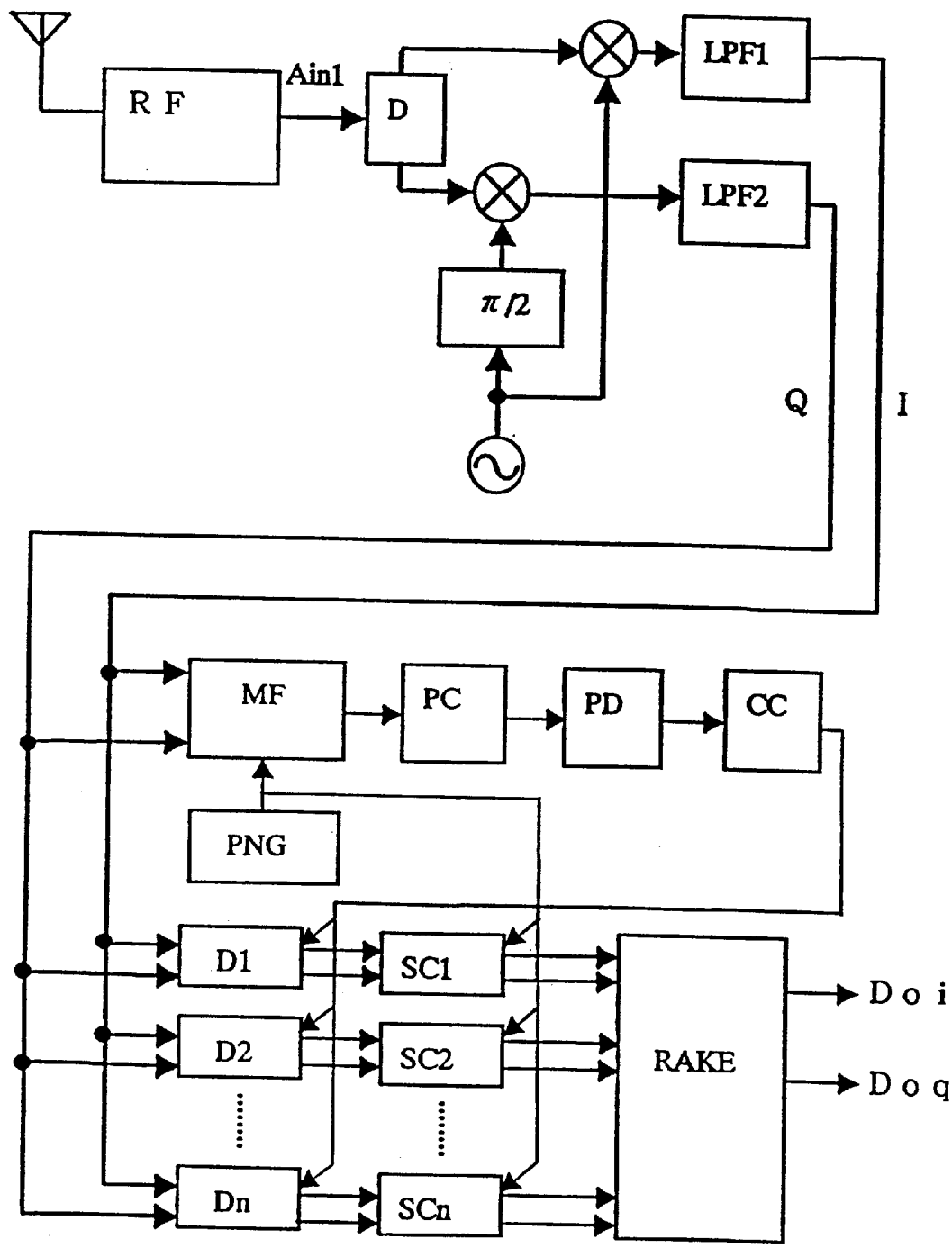
FIG. 29 is a block diagram of the fifth embodiment of a receiver.

FIG. 29 shows the fifth embodiment of the receiver. The received signal of the intermediate frequency Ain1 is divided into I- and Q-components by the quadrature detection and passed through low-pass filters LPF1 and LPF2, respectively. The I- and Q-components I and Q from LPF1 and LPF2 are input to a matched filter MF as well as to a plurality of delay circuits D1, D2, . . . , Dn. A plurality of sliding correlators SC1 to SCn corresponding to D1 to Dn are connected to outputs of the corresponding delay circuits, respectively. The initial acquisition and phase change detection of the multi-path are performed by MF in high speed. SC1 to SCn perform data demodulation. The sliding correlators consume much less electrical power than the matched filters. The receiver has high performance of acquisition and phase change detection with low power consumption.

An output of MF is input to a power calculation portion PC for calculating the power of the correlation output. The calculated power is recurrently integrated by a path detection portion PD fro a predetermined time length. A plurality of paths of higher power from the maximum power are selected. An output of PD is input to a correlation control portion CC which controls delay time of the delay circuits D1 to Dn so that the selected signals are synchronized with one another for the rake combining by a rake combiner RAKE. RAKE outputs combined demodulated data Doi and Doq for I- and Q-components. The phase change is detected by MF, so any circuits such as a delay locked loop (DLL) for tracking are not necessary.

The circuit size and the electrical power consumption are minimized.

In the "two-stages rapid long code acquisition method", a short code common to all the base stations and long codes for each base station independent from one another are defined. These code are demodulated by two stages despread and demodulation. A control channel is transmitted modulated only by the short code. The receiver detects the timing of the long code by despread of the short code. The long code acquisition becomes of high speed.

Figure 30:
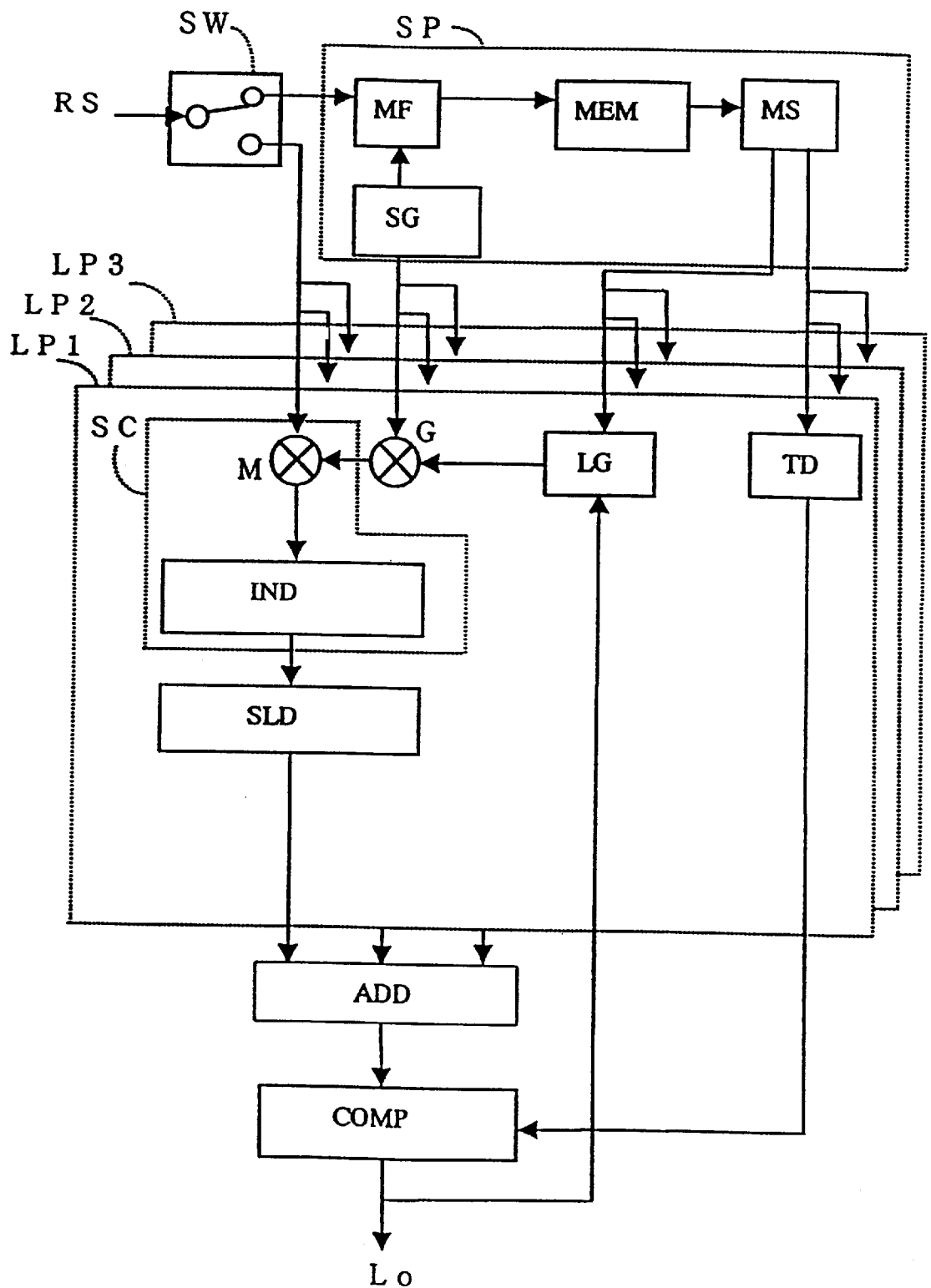
FIG. 30 is a block diagram of a variation of a receiver.

In FIG. 30, a received signal RS after the low-pass filter is input to a switch SW which output RS to one of two outputs. The first output is input to a short code processing portion SP and the other is input to a plurality of long code processing portions LP1 to LP3. LP1 to LP3 correspond to paths detected by MF, for example, LP1 corresponds the path of maximum power, LP2 corresponds the second power and LP3 corresponds the third. The number of long code processing portions is determined by a predicted number of multi-paths. SP includes MF and a short code generating portion SG for calculating the correlation of RS with the short code and for detecting the long code timing used in the initial acquisition and peripheral cell search. LP1 includes the sliding correlator SC and a long code generating portion LG for calculating the correlation of RS with the long code, that is, for despread. LP2 and LP3 are similar to LP1.

The output of MF is input to a memory MEM for storing a plurality of powers of the output. The maximum of the power is detected by a maximum detecting portion MS output of which is input to LG. MS determines a timing of the correlation calculation between SC and RS and generation of the long code according to the cell search. The short code is composed with the long code by an exclusive-or gate G. An output of G is input to a multiplication portion M.

An output of M is input to a integrator IND for accumulating the multiplication result. An output of IND is input to a square-law detector SLD. Outputs of SLDs of LP1 to LP3 are added by an adder ADD. An output ADD is input to a comparator COMP. Since the outputs of the correlation power of a plurality of the sliding correlators are integrated, the influence of noise is reduced and the judgment accuracy is improved.

The output of MS is further input to a threshold determining portion TD and the comparator COMP compares the outputs from ADD and TD. The correlation power by the short code is compared with the threshold determined by TD. Since TD determines the threshold according to the detected power by SP, the threshold is appropriate. A proper long code synchronization is obtained.

FIG. 31 shows the delay circuits and MF. MF which includes a plurality of sampling and holding circuits S1 to SN serially connected for successively holding a digital input signal Din. Outputs d1 to dN from S1 to SN are introduced to a multiplier MUL as well as a plurality of delay circuits DL1 to DLn. The delay circuits have N inputs one output multi-plexers MUX1 to MUXn. Each of the multi-plexers selects one input so that the correlation peak of the sliding correlators are adjusted in phase. The matched filter and sliding correlators may be of analog type in stead of the above.

In FIG. 32 the delay circuits are substituted by a memory MEM. The input signal Vi is successively input to predetermined areas in MEM. The oldest data is replaced by a new data. During a time interval between successive data inputs, read-out address ADD1 to ADDn corresponding to the delay are input to MEM. A timing signal is read out. The delay time is set by a more simple circuit.

Figure 33:
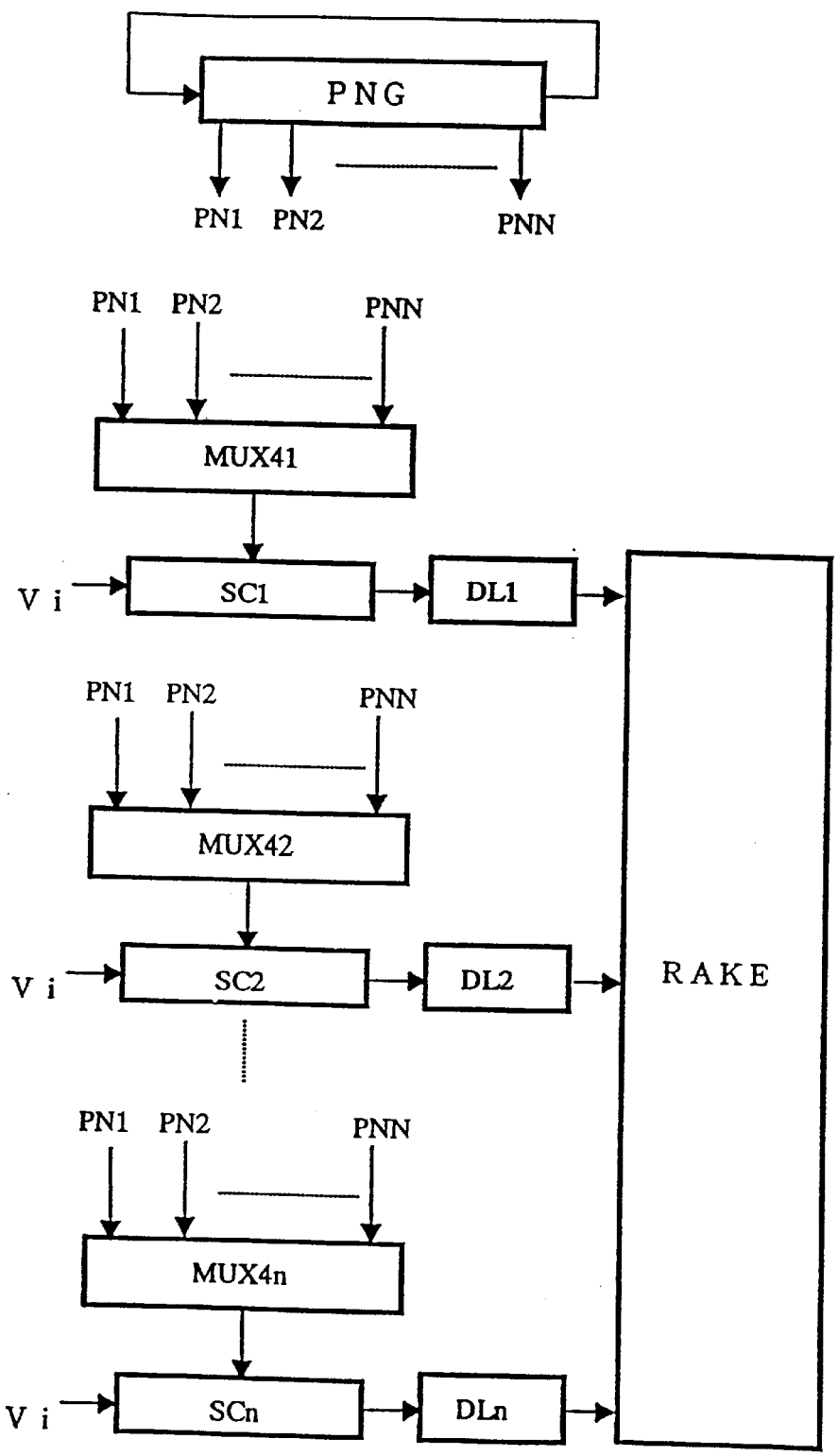
FIG. 33 is a block diagram of the sixth embodiment of a receiver.

FIG. 33 shows the sixth embodiment. The input signal is not delayed, but PN code is delayed. PN code is stored in a PN code generator PNG consisting of a shift register the last stage of which is fed back to the first stage. The PN code PN1 to PNN of all stages are parallelly output to multiplexers MUX41 to MUX4n connected to SC1 to SCn, respectively. MUX41 to MUX4n selects the inputs so as to generate a correlation peak. Since the one generator PNG is commonly used by a plurality of sliding correlators, the circuit size is small.

FIG. 34(a) shows a frame synchronization circuit for a spread spectrum communication. In the figure, 11 designates a one bit quantizing circuit for converting the I- and Q-components of the output of the complex matched filter into sign signals sgn(Di) and sgn(Dq). Then the analog despread signal is converted into a digital data of one bit. 12 designates a delay circuit for delaying an output of the circuit 11 by one symbol time.

13 designates a complex multiplication circuit for multiplying the output in formula (7) of the circuit 11 by a conjugate complex of an output of the circuit 12. As shown in the formulae (8) and (9), I- and Q-components Xi and Xq of delay detection is obtained.

$$Xi+j \cdot Xq=[sgn(Di^{(1)})+j \cdot sgn(Dq^{(1)})] \cdot [sgn(Di^{(2)})-j \cdot sgn(Dq^{(2)})] \quad (7)$$

$$Xi=sgn(Di^{(1)}) \cdot sgn(Di^{(2)})+sgn(Dq^{(1)}) \cdot sgn(Dq^{(2)}) \quad (8)$$

$$Xq=-sgn(Di^{(1)}) \cdot sgn(Dq^{(2)})+sgn(Dq^{(1)}) \cdot sgn(Di^{(2)}) \quad (9)$$

The calculation of the formulae are addition and subtraction of one-bit data and can be performed by a simple digital circuit.

An output of the multiplication circuit 13 is input to a delay circuit 14 and transferred to the delay circuits 15 and 16 serially connected to the circuit 15. When the pilot symbol sequence included in the slot is Pr(1) to Pr(4), the multiplication circuit 13 successively outputs a delay detection output of Pr(1) and Pr(2), Pr(2) and Pr(3), and Pr(3) and Pr(4). One symbol time later, the delay circuits 16, 15 and 14 output the delay detection outputs of of Pr(1) and Pr(2), Pr(2) and Pr(3), and Pr(3) and Pr(4). These delay detection outputs are input to multiplication circuits 17 to 19. A theoretical delay detection pattern calculated from known pilot symbols is input to the multiplication circuits 17 to 19. When the known pilot symbol sequence is Po(1), Po(2), Po(3) and Po(4), a multiplication of Po(1) and a conjugate complex of Po(2) is output from the multiplication circuit 19, a multiplication of Po(2) and a conjugate complex of Po(3) is output from the multiplication circuit 18, and a multiplication of Po(3) and a conjugate complex of Po(4) is output from the multiplication circuit 17.

The outputs of the multiplication circuits 17 to 19 are added by adder 20. An output of the adder is maximum when the delay detection is identical to the theoretical pattern. Practically, the output of the adder is compared with a threshold and is judged to be identical when the output is higher than the threshold.

FIG. 34(b) is an improvement of the embodiment in FIG. 34(a). A delayed symbol is quantized to be one bit, while the non-delayed symbol remains as is. A calculation of formula (10) is executed by this embodiment and Xi and Xq of the formulae (11) and (12) are obtained.

$$Xi+j \cdot Xq=(Di^{(1)}+j \cdot Dq^{(1)}) \cdot [sgn(Di^{(2)})-j \cdot sgn(Dq^{(2)})] \quad (10)$$

$$Xi=Di^{(1)} \cdot sgn(Di^{(2)})+Dq^{(1)} \cdot sgn(Dq^{(2)}) \quad (11)$$

$$Xq=-Di^{(1)} \cdot sgn(Dq^{(2)})+Dq^{(1)} \cdot sgn(Di^{(2)}) \quad (12)$$

When the non-delayed symbol is one bit and the delayed symbol remains as is, the calculation is similar to the above.

The second and third embodiments are described with reference to FIG. 35(a) and (b).

Figure 35A:
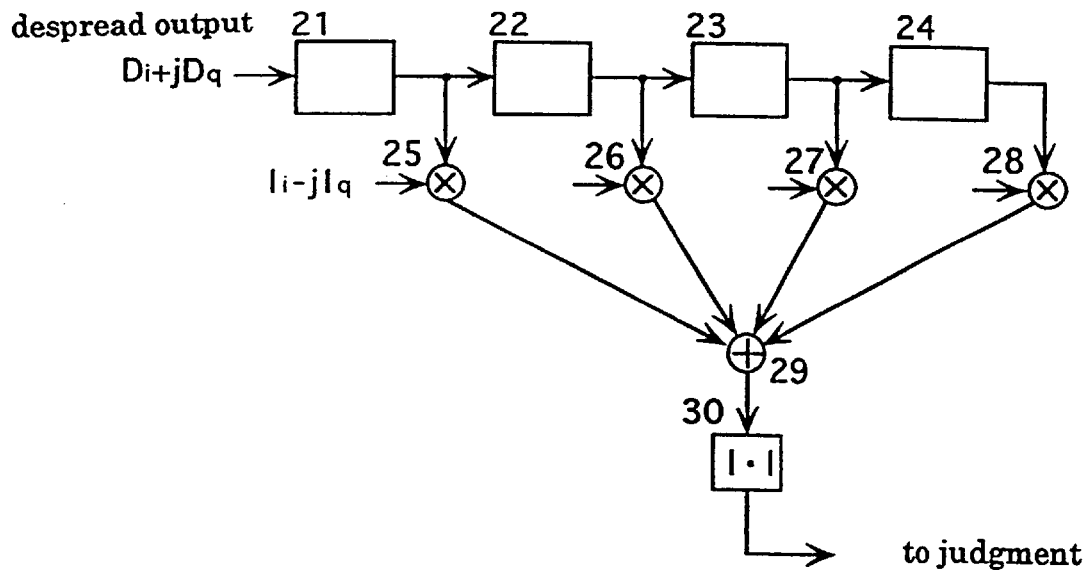
FIG. 35(a) is a block diagram showing the third embodiment of a frame synchronization detection circuit.

In FIG. 35(a), a symbol is successively delayed by delay circuits 21 to 24. Outputs of the delay circuits 21 to 24 are input to multiplication circuits 25 to 28, respectively. Outputs of the multiplication circuits 25 to 28 are added by an adder 29 and then input to an absolute circuit 30. A despread signal Di+jDq is input to the delay circuit 21, and a conjugate complex of a pilot symbol pattern is input to the multiplication circuits 25 to 28. When the received symbol is identical to the theoretical pattern, Di and Dq are expressed as in the formula (13) and (14). The formula (15) is obtained.

$$Di=Ii \cos \theta - Iq \sin \theta \quad (13)$$

$$Dq=Ii \sin \theta + Iq \cos \theta \quad (14)$$

$$(Di+j \cdot Dq) \cdot (Ii-j \cdot Iq)=(Di \cdot Ii+Dq \cdot Iq)+j \cdot (-Di \cdot Iq+Dq \cdot Ii)=(Ii^2+Iq^2)\cos \theta + j \cdot (Ii^2+Iq^2)\sin \theta \quad (15)$$

The pilot symbol is modulated by QPSK and Ii and Iq are "+1" and "−1", respectively. Then, an output of the absolute circuit is as in the formula (16).

$$x = \left| \left[ \sum_{n=1}^{4} (I_{in}^2 + I_{qn}^2) \right] \cdot \cos\theta + j \cdot \left[ \sum_{n=1}^{4} (I_{in}^2 + I_{qn}^2) \right] \cdot \sin\theta \right|$$
$$= \sqrt{2 \left[ \sum_{n=1}^{4} (I_{in}^2 + I_{qn}^2) \right]^2} \quad (16)$$

Figure 35B:
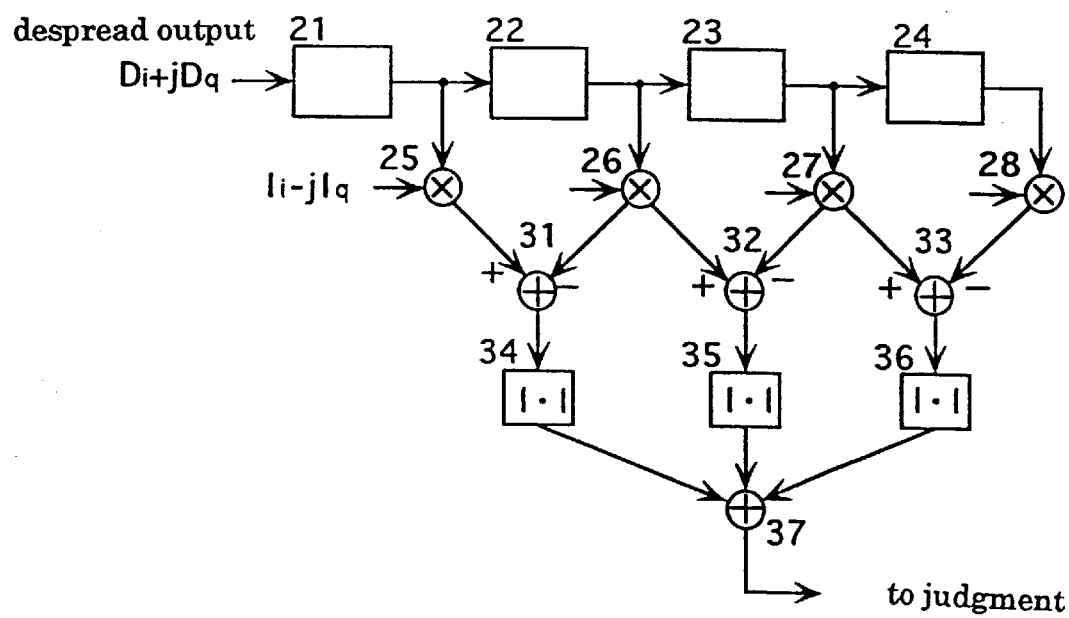
FIG. 35(b) is a block diagram showing the fourth embodiment of a frame synchronization detection circuit.

FIG. 35(b) shows the fourth embodiment in which thee outputs of the multiplication circuits 26, 27 and 28 are subtracted from the outputs 25, 26 and 27, respectively, by subtracters 31, 32 and 33. The outputs of the subtracters 31,32 and 33 are input to absolute circuits 34, 35 and 36 outputs of which are added by an adder 37. If the phase of the successive symbol are equal to each other, the outputs from the subtracters 31 to 33 are zero as shown in the formula (17)

$$(Di^{(1)}+j \cdot Dq^{(1)}) \cdot (Ii^{(1)}-j \cdot Iq^{(1)})-(Di^{(2)}+j \cdot Dq^{(2)}) \cdot (Ii^{(2)}-j \cdot Iq^{(2)})=0 \quad (17)$$

When an output of the circuit 37b a is minimum, the received symbol is identical to the theoretical symbol.

For frame synchronization, successive 16 slots of pilot symbols must be investigated. FIG. 36 shows a circuit for performing frame synchronization.

In FIG. 36(a), delay circuits 41 to 52 for 16 slots are serially connected. A plurality of multiplication circuits 61 to 72 corresponding to the delay circuits are connected to the corresponding delay circuits. The outputs of the multiplication circuits are added by an adder 73. The output of the adder is input to an absolute circuit 74. This embodiment is similar to the embodiment of FIG. 35(a). The output of the absolute circuit 74 is expressed as in the formula (18).

$$x = \left| \left[ \sum_{n=1}^{64} (I_{in}^2 + I_{qn}^2) \right] \cdot \cos\theta + j \cdot \left[ \sum_{n=1}^{64} (I_{in}^2 + I_{qn}^2) \right] \cdot \sin\theta \right|$$
$$= \sqrt{2 \left[ \sum_{n=1}^{64} (I_{in}^2 + I_{qn}^2) \right]^2} \quad (18)$$

FIG. 36(b) shows clock signal CLK input to the delay circuits 41 to 52. The clock is synchronous to the pilot symbols P1 to P4, P5 to P8, . . . , P13 to P16.

Figure 37:
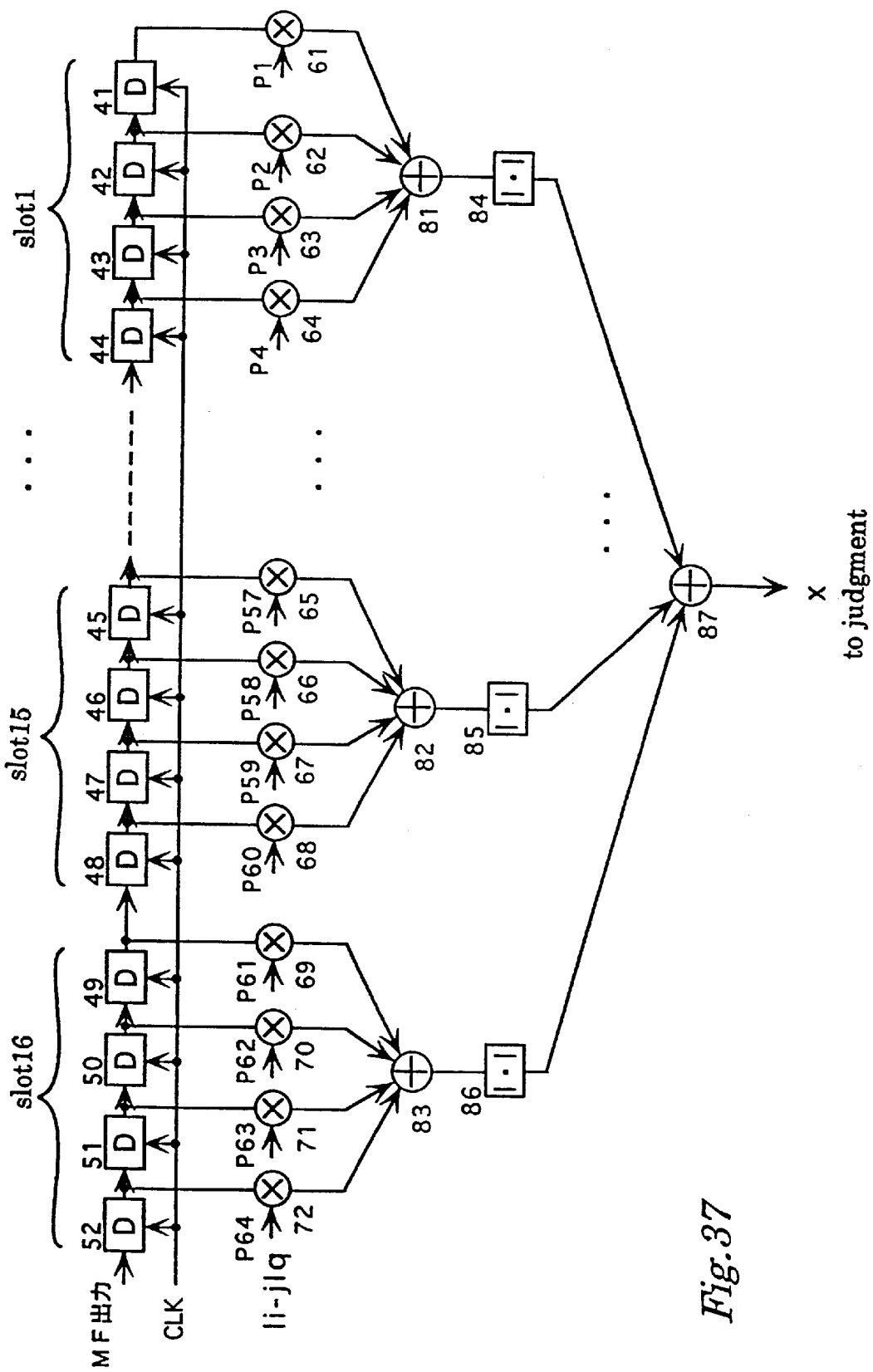
FIG. 37 is a block diagram showing the sixth embodiment of a frame synchronization detection circuit.

FIG. 37 shows another circuit for the frame synchronization.

In FIG. 37(a), delay circuits 41 to 52 for 16 slots are serially connected. A plurality of multiplication circuits 61 to 72 corresponding to the delay circuits are connected to the corresponding delay circuits. The outputs of the multiplication circuits of each slot are added using adders 81, 82, . . . ,86. The output of the adders are input to respective absolute circuits 84 to 86. Then the outputs of the absolute circuits are added by an adder 87. The output of the adder 87 is as in the formula (19).

$$x = \left| \left[ \sum_{n=1}^{4} (I_{in}^2 + I_{qn}^2) \right] \cdot \cos\theta_1 + j \cdot \left[ \sum_{n=1}^{4} (I_{in}^2 + I_{qn}^2) \right] \cdot \sin\theta_1 \right| + \ldots + \left| \left[ \sum_{n=61}^{64} (I_{in}^2 + I_{qn}^2) \right] \cdot \cos\theta_{16} + j \left[ \sum_{n=61}^{64} (I_{in}^2 + I_{qn}^2) \right] \cdot \sin\theta_{16} \right|$$

$$= \sqrt{2 \left[ \sum_{n=1}^{4} (I_{in}^2 + I_{qn}^2) \right]^2} + \ldots + \sqrt{2 \left[ \sum_{n=61}^{64} (I_{in}^2 + I_{qn}^2) \right]^2} \quad (19)$$

Figure 38:
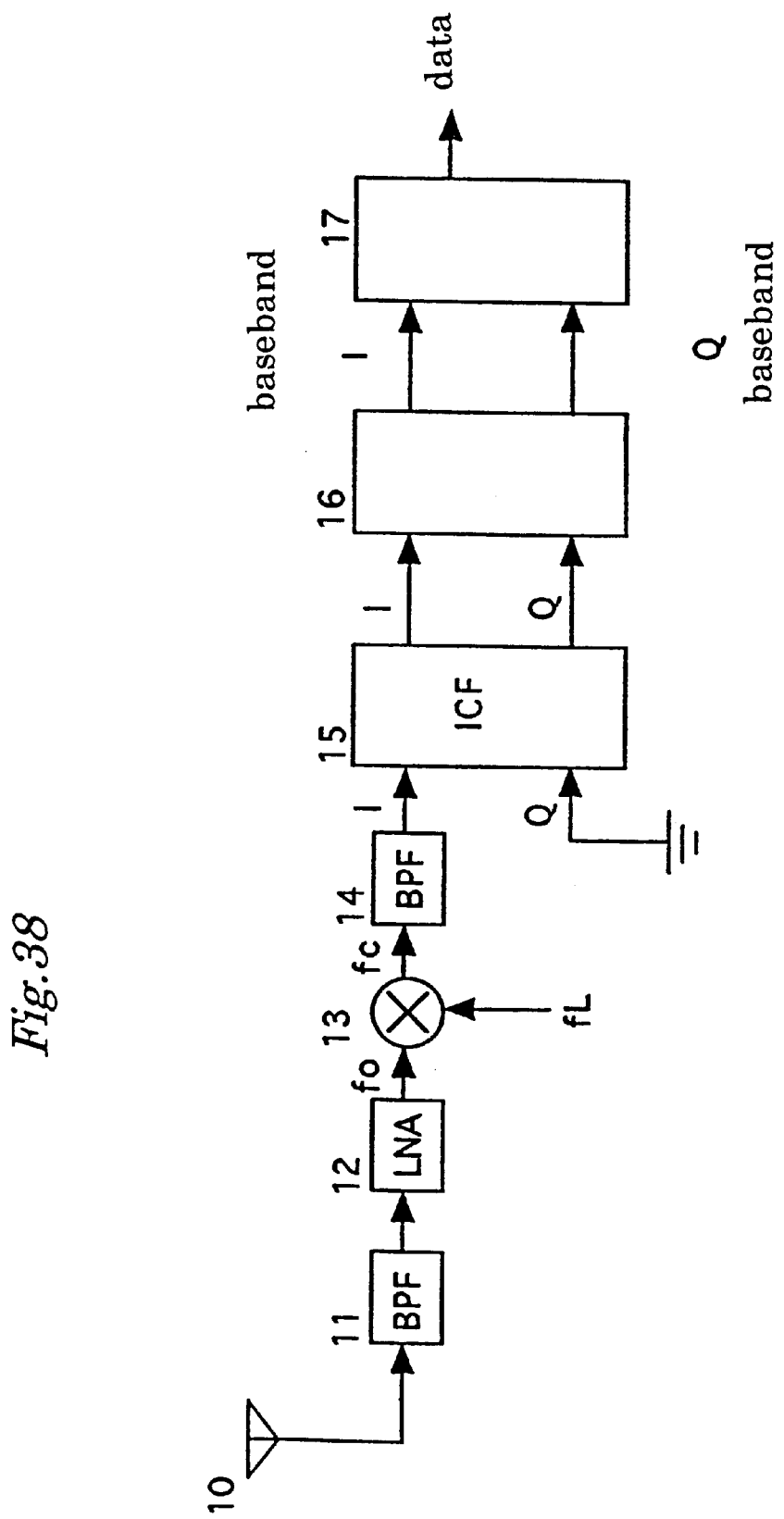
FIG. 38 is a block diagram of the seventh embodiment of the receiver.

FIG. 38 shows the seventh embodiment of the receiver having an antenna 10, a band-pass filter (BPF) 11 and 14, a low-noise amplifier (LNA) 12, a frequency converter 13, an interference filter of adjacent channel (ICF) 15, a demodulator 16 and a data judgment portion 17. The receiver is a type of semi-direct conversion. The frequency fL of the local oscillation signal input to the frequency converter 13 should be determined so that the interference component is not included. The difference fL has difference 3B from the center frequency fo of the signal received by the antenna when the band width of the received signal is 2B.

The output of BPF 14 is input to a real input of ICF15, and the imaginary input of ICF15 is grounded. The real and imaginary outputs are input to the demodulator 16 so that the I- and Q-components of the base band signal are obtained. The data judgment portion generates the data transmitted. Since the imaginary input of ICF15 is "0", a Hilbert transformation means can be omitted, and circuit is simplified.

The interference filter of adjacent channel (ICF) 15 works as follows.

The signal received by the antenna is expressed as in the formula (20).

$$r(t) = \cos(2\pi f_o t + \theta_o(t)) + \sum_{i=1}^{M} \cos(2\pi f_i t + \theta_i(t)) \quad (20)$$

Here, fo: the center frequency of the signal to be received,

θo: phase due to data modulation of the signal to be received, fi (i=1,2, . . . , M): the center frequency of the interference wave of the adjacent channel, and θi(t) (i=1,2, . . . , M): phase due to data modulation of the interference wave of the adjacent channel.

The center frequency of the interference wave is symmetrically distributed centering fo with constant frequency difference. Then, the formula (21) and (22) are given.

$$f_i = f_o - i \cdot 2B \, (i=1,2,\ldots,M/2) \quad (21)$$

$$f_i = f_o + (i-M/2) \cdot 2B \, (i=M/2+1,\ldots,M) \quad (22)$$

In the formula (21), the term of the phase is omitted for simplification. Then, the formula (23) of the received signal r(t) is obtained.

$$r(t) = \cos 2\pi \, f_o t + \sum_{i=1}^{M} \cos 2\pi \, f_i t \quad (23)$$

$$= (e^{j2\pi f_o t} + e^{-j2\pi f_o t})/2 +$$

$$\sum_{i=1}^{M} (e^{j2\pi(f_o + i \cdot 2B)t} + e^{-j2\pi(f_o + i \cdot 2B)t} + e^{j2\pi(f_o - i \cdot 2B)t} + e^{-j2\pi(f_o - i \cdot 2B)t})/2$$

For example, when M=2, r(t) is expressed by the formula (24).

$$r(t) = (e^{j2\pi f_o t} + e^{-j2\pi f_o t})/2 + (e^{j2\pi(f_o + 2B)t} + e^{-j2\pi(f_o + 2B)t} + e^{j2\pi(f_o 2B)t} + e^{-j2\pi(f_o 2B)t})/2 \quad (24)$$

FIG. 39(a) is a spectrum of r(t) in the formula (24). The interference wave of the adjacent channel exists at the frequency of fo+2B and fo-2B. The frequency converter 13 outputs a intermediate frequency signal with a center frequency fc. The frequency fc is selected to be minimum under the condition that the positive and negative frequency components do not interfere with each other. As shown in the formula (25), fc=3B.

$$f_c = 3B \quad (25)$$

The output of the frequency converter 13 passed through BPF14 is as in the formula (26).

$$r(t) = (e^{j2\pi(3B)t} + e^{-j2\pi(3B)t} + e^{j2\pi Bt} + e^{-j2\pi Bt} + e^{j2\pi(5B)t} + e^{-2\pi(5B)t})/2 \quad (26)$$

The spectrum of r(t) of the formula (26) is shown in FIG. 39(b). The signal to be received has a center frequency 3B and the frequencies of the interference wave of the adjacent channel are B and 5B. The real and imaginary inputs xI(t) and xQ(t) of ICF15 are as in the formulae (27) and (28).

$$x_I(t) = \cos(2\pi Bt) + \cos(2\pi(3B)t) + \cos(2\pi(5B)t) \quad (27)$$

$$x_Q(t) = 0 \quad (28)$$

Figure 40:
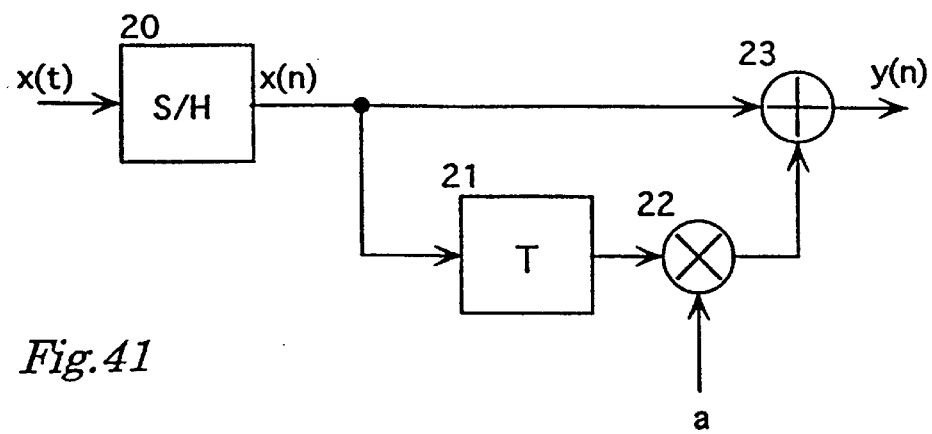
FIG. 40 is a block diagram of a complex coefficient filter.

ICF 15 is constructed by a plurality of serially connected notch filters. As shown in FIG. 40, one notch filter consists of a sampling and holding circuit 20, a delay circuit 21 connected to an output of the sampling and holding circuit, an addition circuit 23 connected to the circuit 20 parallel to the delay circuit 21, and a multiplication circuit for multiplying an output of the circuit 21 by a complex multiplier "a" and for inputting a multiplication result to the adder 23. When an input of the notch filter is x(t), the sampling cycle of the circuit 20 is T, fs=1/T and the channel interval is 2B x(t) is expressed by the formula (29).

$$x(t) = e^{j2\pi f_o t} + \sum_{i=1}^{M} (e^{j2\pi(f_o + i \cdot 2B)t} + e^{j2\pi(f_o - i \cdot 2B)t}) \quad (29)$$

$$a = e^{j\theta} \quad (30)$$

The multiplier "a" is as in the formula (30). An output y(t) is output from the adder 23. The discrete x(t) and y(t) due to intermittent sampling are x(n) and y(n).

Here the frequency response of the filter H(f) is as in the formula (31).

$$H(f) = Y(f)/X(f) \quad (31)$$

X(f) and Y(f) are Fourier transformation of x(t) and y(t). The formula (31) is rewritten as below.

$$H(f)=1+a\cdot e^{-j2\pi fT} \quad (32)$$

From the formula (30), $|H(f)|^2$ is expressed by the formula (33).

$$|H(f)|^2=|1+a\cdot e^{-j2\pi fT}|^2=2(1+\cos(2\pi fT-\theta)) \quad (33)$$

Amplitude of the frequency response is a periodic function of a period of 1/T with a center frequency of one period and is given by formula (34).

$$fc_c=(\theta/(2\pi))\cdot f_s+j\cdot f_s (j:\text{ integer}) \quad (34)$$

The null point of the frequency response is as in the formula (35).

$$f_n=((\theta+(2\cdot k-1)\cdot\pi)/(2\pi))\cdot f_s=((\theta-\pi)/(2\pi))\cdot f_s+k\cdot f_s=(\theta/(2\pi))\cdot f_s-f_s/2+k\cdot f_s(k:\text{integer}) =f_c\pm f_s/2 \quad (35)$$

The amplitude at the peak point and null point are shown in the formula (36) and (37).

$$|H(f_c)|^2=4 \text{(peak point)} \quad (36)$$

$$|H(f_n)|^2=0 \text{(null point)} \quad (37)$$

Figure 41:
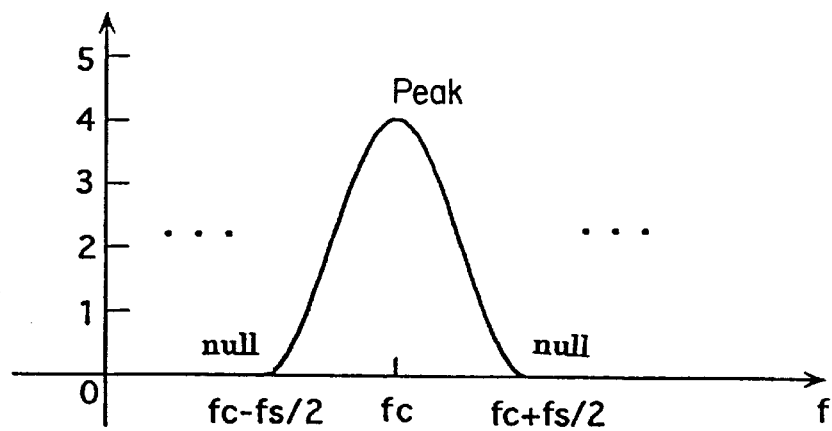
FIG. 41 shows an example of frequency response of the filter in FIG. 40.

FIG. 41 shows one period of the frequency response of the notch filter. When the null point frequency is adjusted to be equal to the interference frequency of adjacent channels, the interference of the adjacent channel is reduced.

Figure 42:
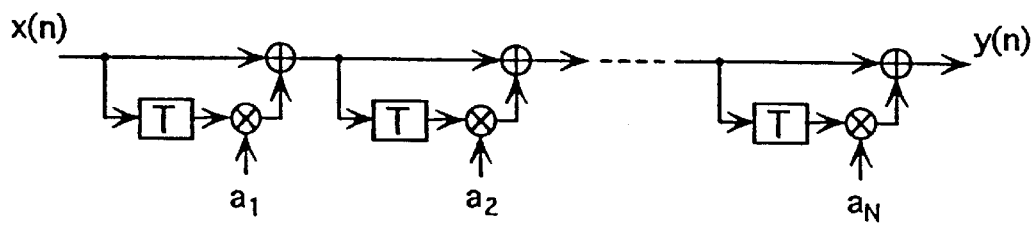
FIG. 42 shows a frequency response of a cascaded filter.

FIG. 42 shows cascaded notch filters for reducing a a lot of interference of adjacent channels. The frequency response is shown in the formulae (38) and (39).

$$H_c(f) = \prod_{i=1}^{N}(1+a_i\cdot e^{-j2\pi fT}) \quad (\prod: \text{series of multiplication}) \quad (38)$$

$$a_i=e^{j\theta i}(i=1,2,\ldots,N) \quad (39)$$

θ i should be adjusted so that the null point frequency and center frequency are appropriate.

Figure 43:
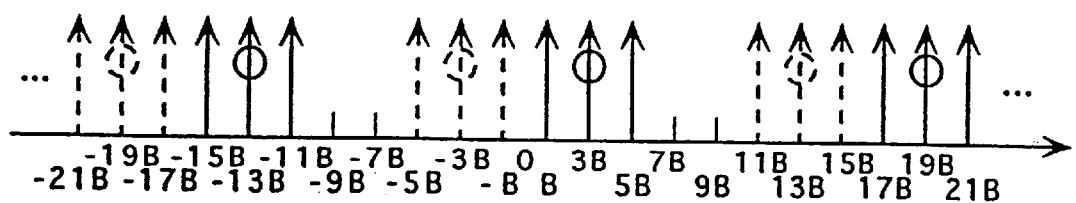
FIG. 43 shows an example of a spectrum of sampled intermediate signal in FIG. 39(b).

If the signal of FIG. 39(b) (fo=3B) is sampled by a frequency of fs=16B, the sampled signal has a frequency spectrum of FIG. 43. In FIG. 43, the negative portion in FIG. 39(b) is shown by broken arrows.

TABLE 1

The followings are examples of cascaded notch filters.

| EX. | θ | fc | fn | Interference to be Reduced |
|---|---|---|---|---|
| 1 | −3π/8 | −3B | −11B, 5B | −11B, 5B |
| 2 | −π/8 | −B | −9B, 7B | −9B, 7B |
| 3 | π/8 | B | −7B, 9B | −9B, 7B |
| 4 | 3π/8 | 3B | −5B, 11B | −5B, 11B |
| 5 | 5π/8 | 5B | −3B, 13B | −3B, 13B |
| 6 | 7π/8 | 7B | −B, 15B | −B, 15B |
| 7 | 9π/8 | 9B | B, 17B | B, 17B |

In the table 1, −11B is a symmetrical point of 5B, while 11B, 13B, 15B, and 17B are symmetrical points of −5B, −3B, −B and B. The output y(t) has only a component of $e^{j2\pi(3B)t}$ (including I and Q) because −3B of the signal to be received is also reduced as an interference.

Figure 44:
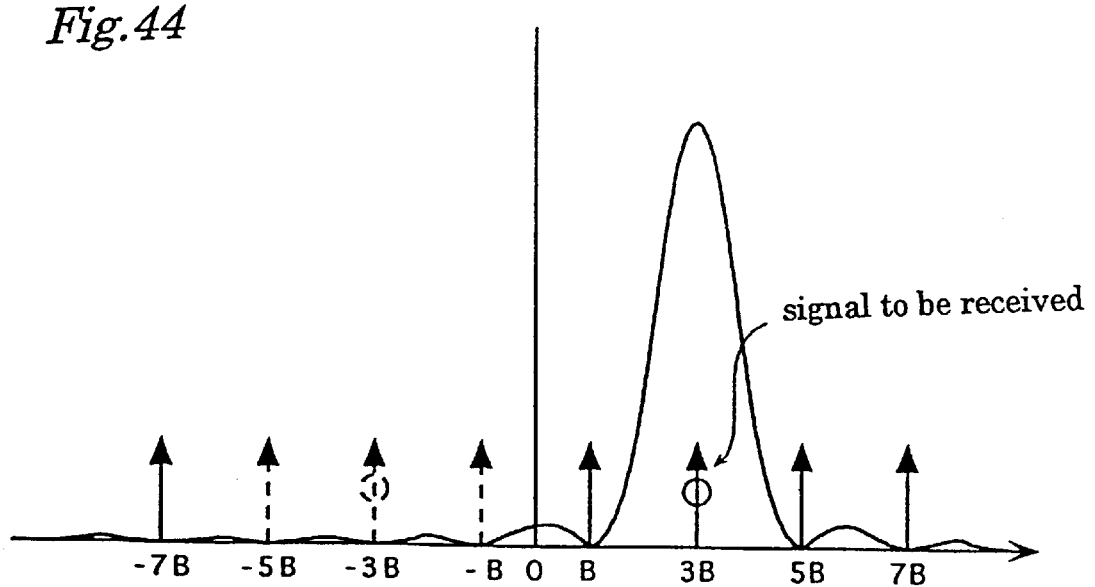
FIG. 44 shows a frequency response of seven stages cascaded filter.
Figure 45:
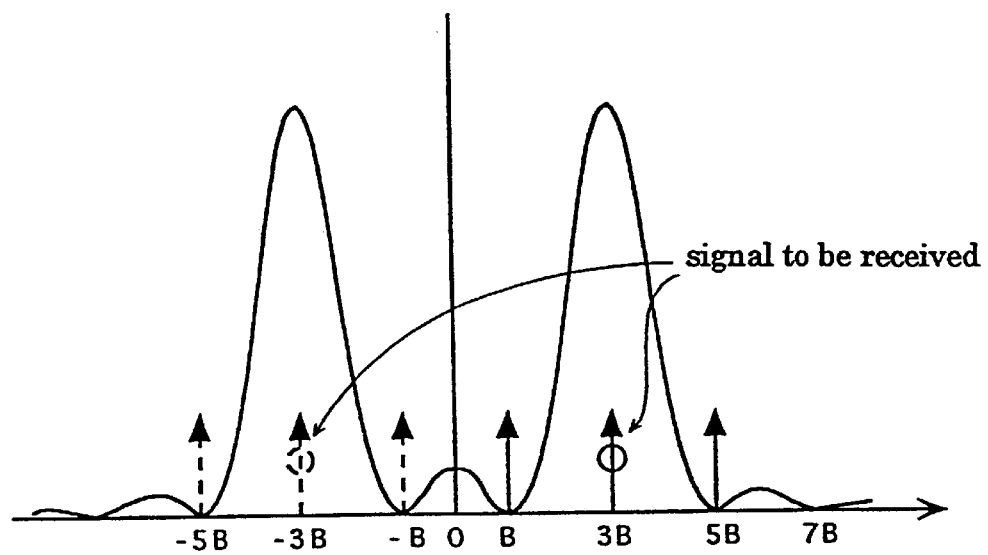
FIG. 45 shows a frequency response of six stages cascaded filter.

The frequency response of the example 4 of seven stages is shown in FIG. 44. The examples 1 to 4, 6 and 7 of six stages may have frequency response without a reduced negative component. The components of real part $COS(2\pi(3B))$ remains. The frequency response of one period is shown in FIG. 45.

Figure 46A:
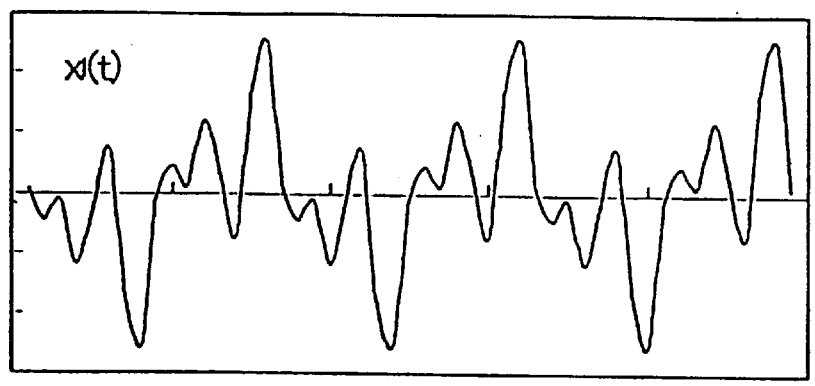
FIG. 46 shows simulation data of input and output signals of a interference rejection filter, showing an input signal in FIG. 46(a), an output signal of a seven stages cascaded filter in FIG. 46(b) and an output signal of six stages cascaded filter in FIG. 46(c).
Figure 46B:
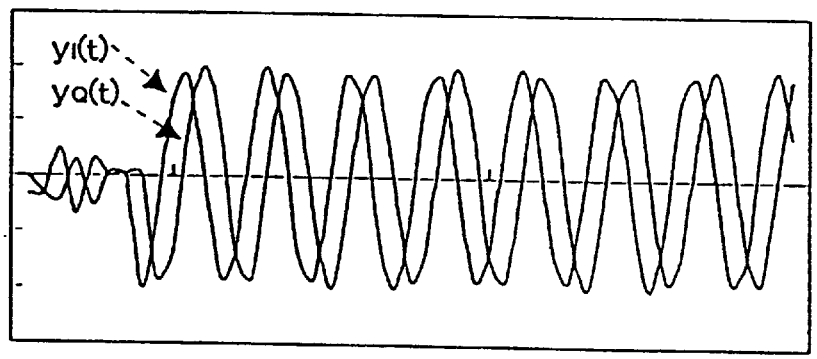
Figure 46C:
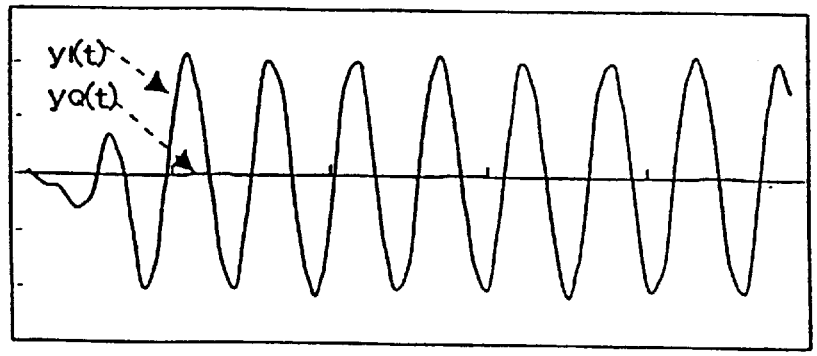
Figure 47:
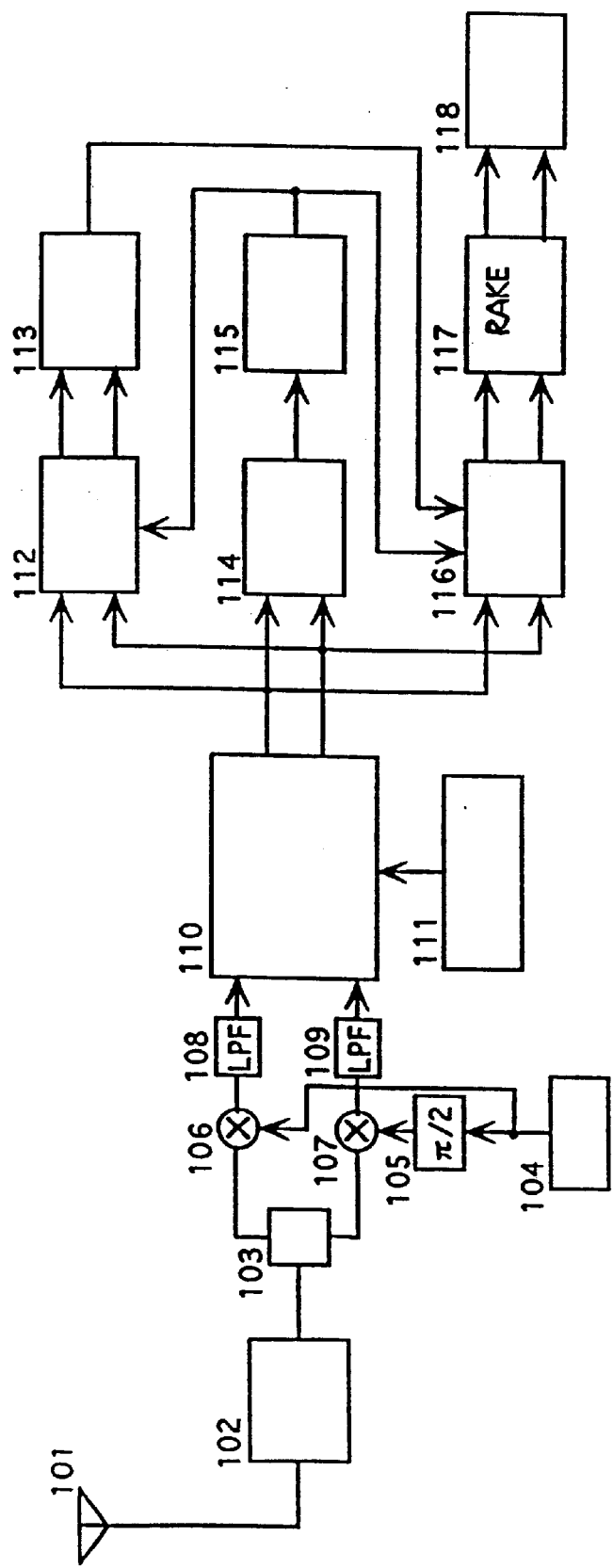
FIG. 47 shows a conventional circuit for frame synchronization detection.
Figure 48:
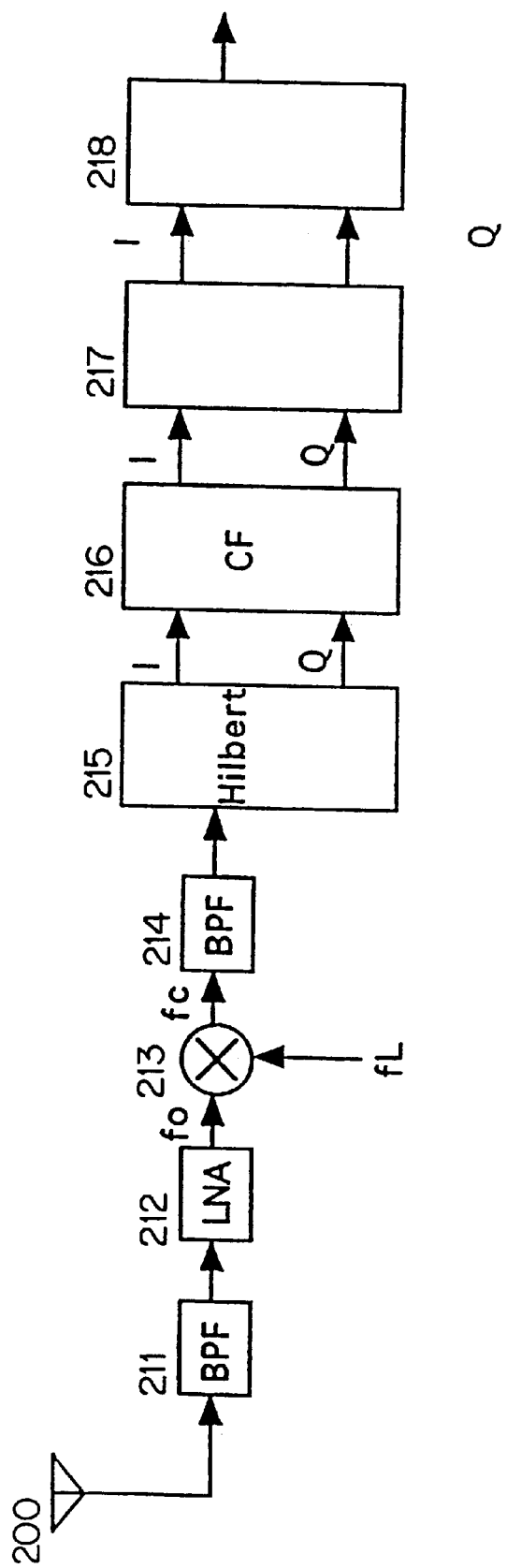
FIG. 48 is block diagram of a conventional semi-direct conversion receiver.

Simulation data of the filter of seven stages of an example of fc=3B, M=2, fs=16B and B=32 kHz is shown in FIG. 46(b). FIG. 46(a) is an input signal x(t), and FIG. 46(c) is a comparison data of the filter shown in FIG. 45.

An N stages cascaded filter has a Z transfer function of formula (40) which is expanded to be the formula (41).

$$H_c(Z) = \prod_{i=i1}^{N}(1+a_i\cdot z^{-1}) \quad (40)$$

$$H_c(z) = \sum_{j=0}^{N}(b_j\cdot z^{-j}) \quad (41)$$

$$b_0 = 1,$$

$$b_1 = \sum_{i=1}^{N} a_i,$$

$$\vdots$$

$$b_N = \prod_{i=1}^{N} a_i$$

What is claimed is:

1. A DS-CDMA cellular mobile radio of a spread spectrum communication system having a plurality of different long code sequences corresponding to all cells in the communication system, one or more short code sequences for a common control channel common to the cells and a plurality of different short codes corresponding to mobile stations for traffic channels, a transmission signal being spread by said codes, a receiver comprising:

one or more of first matched filters for calculating correlation of a received signal with said long code sequences and for despreading said received signal spread by said long code sequences;

one or more of second matched filters for calculating correlation of said received signal with said short code sequences for said common control channel and for despreading said received signal spread by said short code sequences; and one or more of third matched filters for calculating correlation of said received signal with said short code sequences for said traffic channel and for despreading said received signal spread by said short code sequences; and one or more of fourth matched filters for calculating correlation of said received signal selectively with said long code sequences, said short code sequences for said common control channel for said short code sequences for said traffic channel.

2. A DS-CDMA cellular mobile radio as claimed in claim 1, wherein said fourth matched filters calculate correlation with said short code sequences for said common control channel when an initial cell search is performed.

3. A DS-CDMA cellular mobile radio as claimed in claim 1, wherein said fourth matched filters calculate correlation with said long code sequences so that said long code sequences of a current base station and said long code sequences of a peripheral base station are parallelly calculated when peripheral cell search is performed before a hand-over.

4. A DS-CDMA cellular mobile radio as claimed in claim 1, wherein said fourth matched filters calculate correlation with said short for said traffic channel so that said short code sequences of a current base station and a peripheral base station are parallelly calculated during a hand-over.

5. A DS-CDMA cellular mobile radio as claimed in claim 1, wherein said fourth matched filter calculates correlation with said short code sequences for said traffic channel cooperatively with said third matched filters for a multi-code signal.

6. A DS-CDMA cellular mobile radio as claimed in claim 1, wherein said fourth matched filter calculates correlation with said short code sequences for said traffic channel and said common control channel cooperatively with said second and third matched filters so that outputs of said matched filters are used for path selection of rake combining of multi-path signal.

7. A DS-CDMA cellular mobile radio as claimed in claim 1, wherein a plurality of antenna branches are provided and said first to fourth matched filters are selectively used for each branch.

8. A DS-CDMA cellular mobile radio as claimed in claim 7, wherein a plurality of groups of sampling holding circuits corresponding to said branches and a plurality of selectors each corresponding to one of said matched filters are provided, each said selector selectively inputting said received signal of one of said branches to said corresponding matched filter.

9. A DS-CDMA cellular mobile radio as claimed in claim 1, wherein a plurality of antenna branches are provided and said first to fourth matched filters are selectively used for each branch.

10. A DS-CDMA cellular mobile radio as claimed in claim 1, further comprising a predetermined pilot symbol inserted every predetermined period in said transmission signal and a transmission power control (TPC) signal, said transmission signal being separated into a plurality of slots by said pilot symbols, said receiver judging TPC and a signal power to interference power ratio (SIR) of each said slot according to one of said pilot symbol just before said slot.

11. A DS-CDMA cellular mobile radio as claimed in claim 10, wherein composite code sequences are generated by composing said long code sequences and said short code sequences for said traffic channel, said pilot symbol being inserted into said transmission signal, said receiver despreading said received signal by said short code sequences for said traffic channel so as to generate a despread signal.

12. A DS-CDMA cellular mobile radio as claimed in claim 11, said despread signal being processed for a phase detection of multi-path, a fading compensation, a rake combining, said TPC and SIR being judged by said signal after said rake combining.

13. A DS-CDMA cellular mobile radio as claimed in claim 11, said despread signal being processed successively for a phase detection of multi-path, for a fading compensation and for a rake combining, said TPC and SIR being judged by said signal after said rake combining, said fading compensation and said rake combining of one of said slots being processed according to pilot symbols just before and just behind said slot.

14. A DS-CDMA cellular mobile radio as claimed in claim 13, wherein said fading compensation and said rake combining of one of said slots is processed according to pilot symbols just before and just behind said slot further comprising a predetermined pilot symbol inserted every predetermined period in said transmission signal and a transmission power control (TPC) signal, said transmission signal being separated by into a plurality of slots by said pilot symbols, said receiver judging TPC and a signal power to interference power ratio (SIR) of each said slot according to one of said pilot symbol just before said slot.

15. A DS-CDMA cellular mobile radio as claimed in claim 13, wherein said fading compensation and said rake combining of one of said slots are processed according only to a pilot symbol just before said slot when said multi-path changes in phase for a predetermined period of time after said change, then said fading compensation and said rake combining of one of said slots are processed according to pilot symbols just before and just behind said slot.

16. A DS-CDMA cellular mobile radio of spread spectrum communication system, a receiver therefor having a plurality of branches comprising:
a plurality of groups of sampling and holding circuits corresponding to said branches;
a perch channel (common control channel) group of matched filters comprising a plurality of matched filters each selectively connected to one of said groups of sampling and holding circuits;
a traffic channel group of matched filters comprising a plurality of matched filters each selectively connected to one of said groups of sampling and holding circuits;
a common channel group of matched filters comprising a plurality of matched filters each selectively connected to one of said groups of sampling and holding circuits;
a plurality of first multi-plexers for selectively outputting outputs of one of said perch and common groups of matched filters;
a plurality of second multi-plexers for selectively outputting outputs of one of said traffic and common groups of matched filters;
a plurality of first multi-path sampling and holding circuits corresponding to said first multi-plexer;
a plurality of second multi-path sampling and holding circuits corresponding to said first multi-plexer;
a first peak detection circuit for calculating power of said outputs of said matched filters of said perch and common groups and for controlling said first multi-plexer and said first multi-path sampling and holding circuits according to said power; and
a second peak detection circuit for calculating power of said outputs of said matched filters of said traffic and common groups and for controlling said second multi-plexer and said second multi-path sampling and holding circuits according to said power.

17. A DS-CDMA cellular mobile radio as claimed in claim 1, said receiver further comprising:
first multi-path multiplexers for selectively outputting one of said outputs of said first multi-path sampling and holding circuits;
second multi-path multiplexers for selectively outputting one of said outputs of said second multi-path sampling and holding circuits;
a first A/D converter for converting an output of said first multi-path multiplexers into a digital output;
a second A/D converter for converting an output of said second multi-path multiplexers into a digital output;
a first memory for storing said output of said first A/D converter;
a second memory for storing said output of said second A/D converter;
a first fading compensation circuit for fading compensation of said outputs stored in said first memory; and
a second fading compensation circuit for fading compensation of said outputs stored in said first memory.

18. A DS-CDMA cellular mobile radio as claimed in claim 16, said receiver further comprising:
a plurality of calculation registers corresponding to said matched filters for storing said code sequences, each said calculation register consisting of a shift register of a number of stages equal to a number of sampling and holding circuits of each branch, a last stage of said shift register being connected to its first stage for circular shifting; and a plurality of window circuits corresponding to said matched filters, each said window circuit having a window passing partial code sequence of said code sequence in said corresponding calculation register, said window shifting synchronously to sampling of said sampling and holding circuits, said corresponding, matched filter calculating said correlation by said partial sequence.

19. A DS-CDMA cellular mobile radio as claimed in claim 18, wherein said calculation register has stages of an integer power of "2" from a first stage to a Nth stage, said receiver further comprising an input register having stages corresponding to stages of said calculation register, said input register connected through switching circuits to said calculation register, said switching circuit comprising a plurality of multiplexers from a first to kth, said first multiplexer having stages of N/2 for alternatively connecting upper half stages or lower half stages of said input register to said upper half stages of said calculation register, said second multplexer having stages of $N/2^2$ for alternatively connecting upper half stages or lower half stages of said lower half stages of said input register to said upper half stages of said lower half stages of said calculation register, said ith multiplexer having $N/2^i$ stages for alternatively connecting said first to $(N/2^{i+1})$th stages or said $(N/2^{i+1}+1)$th to $(N/2^i)$th stages of said input register to said $(N/2^{i+1}+1)$th to $(N/2^i)$th stages of said calculation register, said kth multi-plexer having $N/2^k$ stage for alternatively connecting said first to $(N/2^{k+1})$th stages or said $(N/2^{k+1}+1)$th to $(N/2^k)$th stages of said input register to said $(N/2^{k+1}+1)$th to $(N/2^k)$th stages of said calculation register.

20. A DS-CDMA cellular mobile radio as claimed in claim 18, wherein said number of sampling and holding circuits is N, said calculation registers of a number of n are provided, each said matched filters have n number of groups of multipliers corresponding to said calculation registers, n number of adders corresponding to said groups of said multipliers are provided and corresponding to different codes, each said adder adding a predetermined number of outputs of said corresponding multiplier according to a code length of said corresponding codes.

21. A DS-CDMA cellular mobile radio as claimed in claim 18, wherein said sampling and holding circuits have capacitances for sampling and holding analog voltage data and said adders have capacitive couplings for addition, said receiver further comprising:

an input switching circuit for receiving data of said last stage and intermediate stages of said calculation register and for selectively outputting one of said data to said first stage of said calculating register for controlling a number of taps of said matched filter;

a sleep control circuit for stopping power supply to unnecessary circuits; and a refresh control circuit for canceling electrical charge in said capacitances and said capacitive couplings, a control of said input switching circuit being superior to a control of said refresh control circuit, and said control of said refresh control circuit being superior to a control of said sleep control circuit.

22. A DS-CDMA cellular mobile radio of spread spectrum communication system, a receiver comprising:

matched filters comprising (a) sampling and holding circuits for holding successively an input signal, (b) a plurality of multipliers for multiplying said input signal by a PN code sequence and (c) an adder for adding outputs of said multipliers for successive input signals;

a plurality of multiplexers, each for receiving signals held in said sampling and holding circuits and for selectively outputting one of said signals;

a plurality of sliding correlators corresponding to said multiplexers for receiving an output of a corresponding multiplexer; and a plurality of rake demodulator corresponding to said sliding correlators, wherein said matched filter performs an acquisition, a multi-path detection and a phase detection and said multiplexers are controlled so that said sliding correlators are synchronized with said signals according to said multi-path detected by said matched filter.

23. A DS-CDMA cellular mobile radio of spread spectrum communication system, a receiver comprising:

matched filters comprising (a) sampling and holding circuits for holding successively an input signal, (b) a plurality of multipliers for multiplying said input signal by a PN code sequence and (c) an adder for adding outputs of said multipliers for successive input signals;

a plurality of sliding correlators correspondingly receiving said input signal in parallel;

a PN code generator for holding a PN code sequence and circulating and shifting said PN code sequence;

a multiplexer for selectively outputting one of said signals in said PN code generator;

a plurality of delay circuits corresponding to said sliding correlators, connected to outputs of corresponding to said sliding correlators; and a rake demodulator corresponding to said sliding correlators for rake combining and demodulation, wherein said matched filter performs an acquisition, a multi-path detection and a phase detection, and said multiplexers are controlled so that said sliding correlators are synchronized with said signals according to said multi-path detected by said matched filter.

24. A DS-CDMA cellular mobile radio of spread spectrum communication system, a receiver comprising:

a frame synchronization circuit comprising (a) a matched filter for despreading a received signal, (b) a quantizing circuit for quantizing an output of said matched filter, (c) a delay detection circuit for delay detection of an output of said quantizing circuit and (d) an identification detection circuit for detecting identification of an output of said delay detection circuit and a predetermined pattern.

25. A DS-CDMA cellular mobile radio of spread spectrum communication system, a receiver comprising:

a frequency converter for converting a received signal of a high frequency into an intermediate frequency signal so that a interference component is not included in a signal to be received;

an interference reduction filter having a plurality of complex coefficient filters for receiving an output of said frequency converter, said interference reduction filter having a real input and an imaginary input, said real input being connected to said output of said frequency converter, said imaginary input being connected to "0";

a demodulator for receiving an output of said interference reduction filter; and a data judgment circuit for receiving an output of said demodulator.

* * * * *